(12) United States Patent
Takahashi et al.

(10) Patent No.: US 9,759,840 B2
(45) Date of Patent: Sep. 12, 2017

(54) OPTICAL ELEMENT AND METHOD FOR MANUFACTURING OPTICAL ELEMENT

(75) Inventors: Hidetoshi Takahashi, Miyagi (JP); Fumihiko Iida, Miyagi (JP); Hiroyuki Kiso, Miyagi (JP); Yu Nomura, Miyagi (JP); Hiroshi Tazawa, Miyagi (JP); Ryo Nishimura, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 814 days.

(21) Appl. No.: 12/871,259

(22) Filed: Aug. 30, 2010

(65) Prior Publication Data

US 2011/0128629 A1 Jun. 2, 2011

(30) Foreign Application Priority Data

Sep. 2, 2009 (JP) .............................. P2009-203181
Aug. 2, 2010 (JP) .............................. P2010-174046

(51) Int. Cl.
*G02B 1/11* (2015.01)
*G02B 1/118* (2015.01)
*G02B 27/00* (2006.01)

(52) U.S. Cl.
CPC .......... *G02B 1/118* (2013.01); *G02B 27/0006* (2013.01)

(58) Field of Classification Search
CPC ....... G02B 27/0006; G02B 1/11–1/118; G02F 1/1335–1/133555
USPC ................................................ 359/577–614
See application file for complete search history.

(56) References Cited

U.S. PATENT DOCUMENTS

| 8,034,434 B2 * | 10/2011 | Sakuma ................. G02B 1/118 359/321 |
| 2008/0129188 A1 * | 6/2008 | Egi et al. ...................... 313/582 |
| 2008/0129933 A1 * | 6/2008 | Nishida ............. G02F 1/133502 349/96 |
| 2008/0144180 A1 * | 6/2008 | Nishida et al. ............... 359/601 |
| 2008/0265149 A1 * | 10/2008 | Endoh et al. ............. 250/237 R |
| 2008/0304155 A1 * | 12/2008 | Endoh et al. ................ 359/558 |

(Continued)

FOREIGN PATENT DOCUMENTS

CN 101320104 A 12/2008
CN 101356454 A 1/2009

(Continued)

OTHER PUBLICATIONS

The Engineering Toolbox, "Modulus of Elasticity—Young Modulus for some common Materials," available at http://www.engineeringtoolbox.com/young-modulus-d_417.html (Last visited Sep. 12, 2013).*

(Continued)

*Primary Examiner* — Bumsuk Won
*Assistant Examiner* — Jeffrey Madonna
(74) *Attorney, Agent, or Firm* — Oliff PLC

(57) ABSTRACT

An optical element with an antireflection function is provided with a substrate having a surface and a plurality of structures formed from convex portions or concave portions and arranged in large numbers on the surface of the substrate with a minute pitch less than or equal to the wavelength of the visible light, wherein the modulus of elasticity of the material forming the structures is 1 MPa or more, and 1,200 MPa or less, and the aspect ratio of the structure is 0.6 or more, and 1.5 or less.

21 Claims, 34 Drawing Sheets

(56) References Cited

U.S. PATENT DOCUMENTS

| | | | | |
|---|---|---|---|---|
| 2009/0061165 A1* | 3/2009 | Iwata | .................. | G02B 1/11 428/179 |
| 2009/0185276 A1* | 7/2009 | Matsuhira | .................. | 359/601 |
| 2009/0262431 A1* | 10/2009 | Asakura | .................. | G02B 1/04 359/601 |
| 2010/0238548 A1* | 9/2010 | Watanabe | .................. | G02B 1/04 359/488.01 |
| 2011/0310489 A1* | 12/2011 | Kajiya | .................. | G02B 3/0056 359/601 |
| 2012/0212825 A1* | 8/2012 | Nomura et al. | .................. | 359/580 |

FOREIGN PATENT DOCUMENTS

| | | |
|---|---|---|
| EP | 2056129 A1 | 5/2009 |
| EP | 2128659 A1 | 12/2009 |
| JP | 2000-071290 | 3/2000 |
| JP | 2004-074219 | 3/2004 |
| JP | 2007-004155 | 1/2007 |
| JP | 2007-053241 | 3/2007 |
| JP | 2007-298918 | 11/2007 |
| JP | 2008-158013 | 7/2008 |
| JP | 2008-209448 | 9/2008 |
| JP | 2008-250327 | 10/2008 |
| JP | 2008-304637 | 12/2008 |
| JP | 2009-020355 | 1/2009 |
| WO | 2007/139210 A1 | 12/2007 |
| WO | 2008-023816 | 2/2008 |
| WO | 2008/096872 A1 | 8/2008 |
| WO | 2008/120782 A1 | 10/2008 |

OTHER PUBLICATIONS

Japanese Office Action issued Mar. 6, 2012, for corresponding Japanese Appln. No. 2010-174046.
Japanese Office Action issued Apr. 17, 2012, for corresponding Japanese Appln. No. 2010-174046.
Chinese Patent Office, Notification of the Third Office Action mailed Jun. 14, 2013 in Chinese Patent Application No. 201010272052.6 w/English-language Translation.
Chinese Patent Office, Notification of the Second Office Action mailed Oct. 24, 2012 in Chinese Patent Application No. 201010272052.6 w/English-language Translation.
European Search Report dated Dec. 22, 2010, corresponding to European Appln. No. 10009086.9.
Office Action dated Dec. 17, 2013 issued in Taiwanese Patent Application No. 99128702 (with English translation).
Office Action dated Feb. 7, 2014 issued in Chinese Patent Application No. 201010272052.6 (with English Translation).
Aug. 18, 2014 Office Action issued in Russian Patent Application No. 2010135837/28(050929) (with English-language translation).
Jul. 3, 2014, Taiwanese Office Action issued in Taiwanese Patent Application No. 99128702 with an English translation.
May 28, 2015 Office Action issued in Chinese Application No. 201410349861.0.
Sep. 16, 2015 Office Action issued in Chinese Application No. 201010272052.6.

* cited by examiner

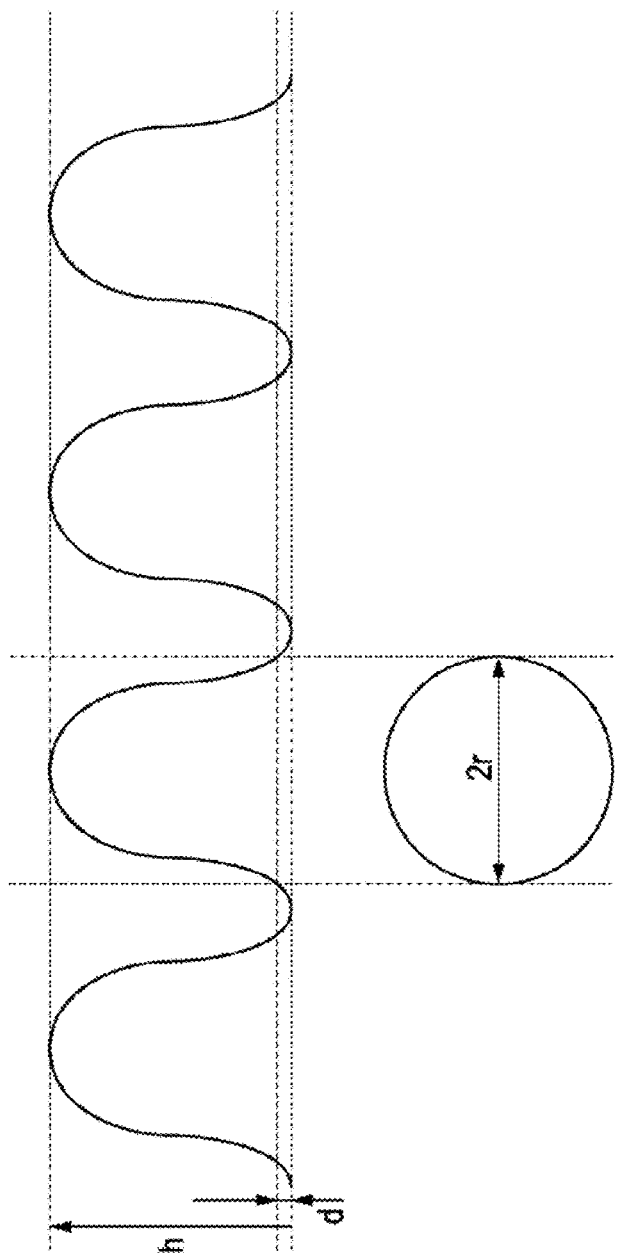

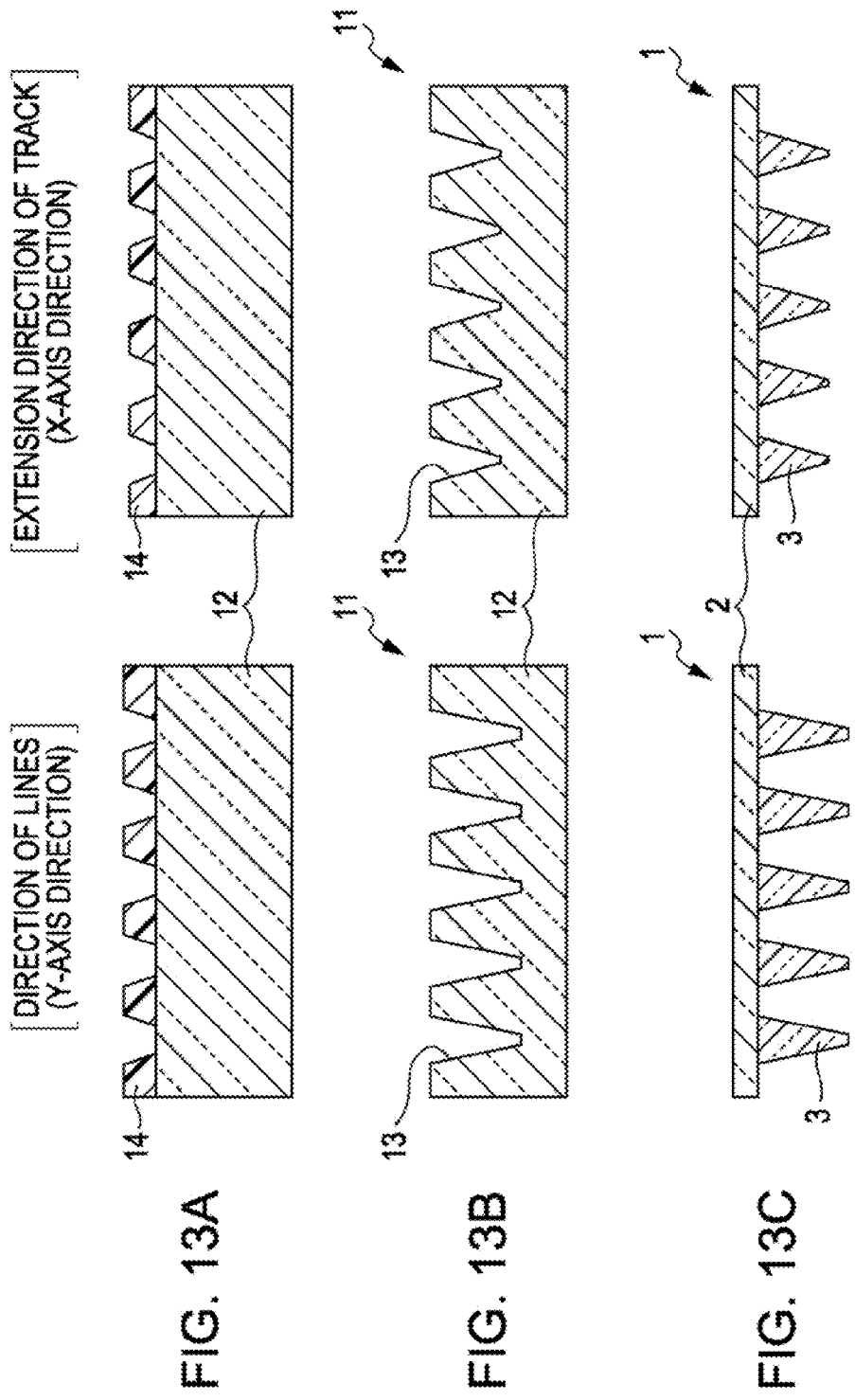

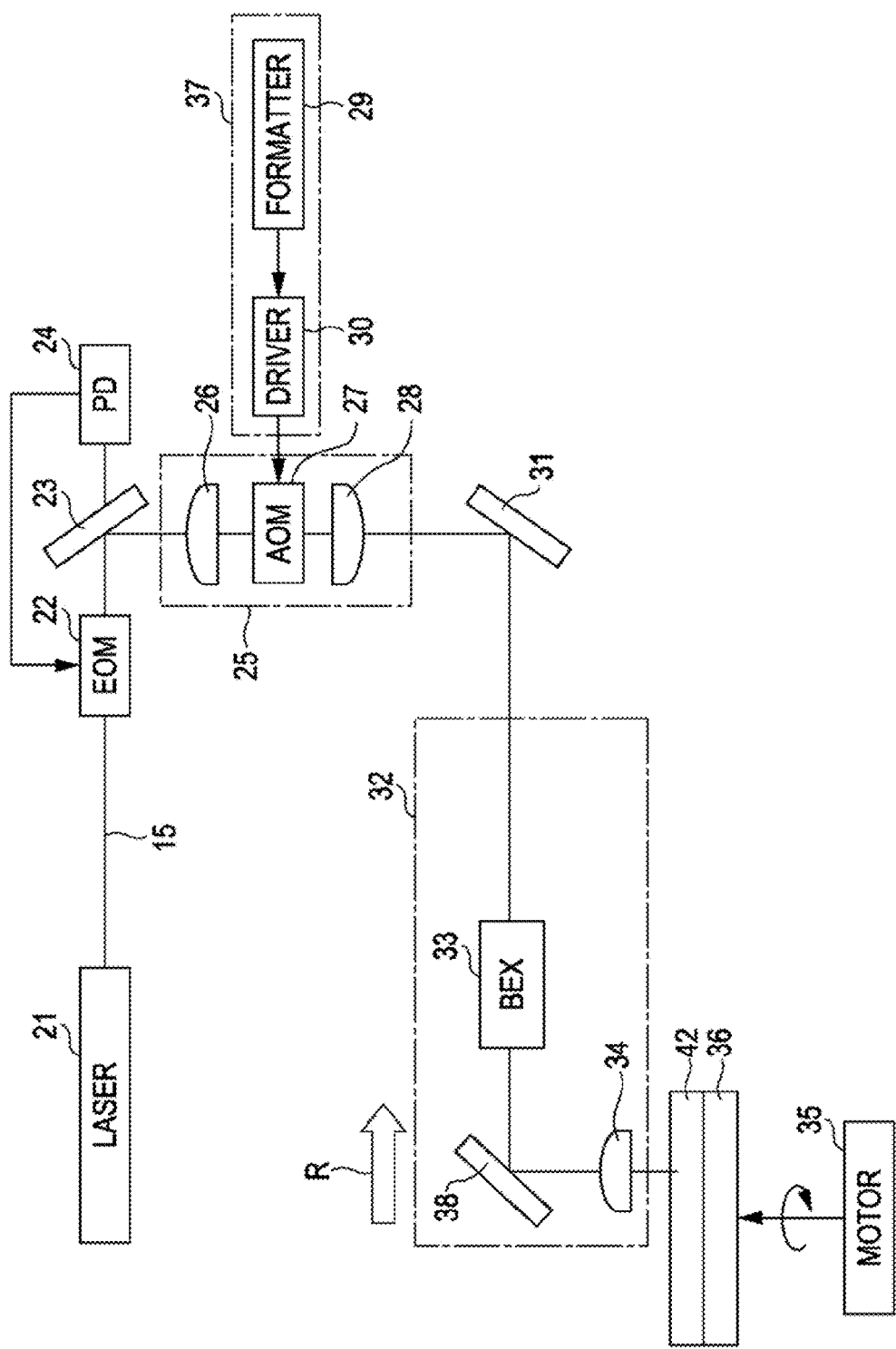

OPTICAL ELEMENT AND METHOD FOR MANUFACTURING OPTICAL ELEMENT

CROSS REFERENCES TO RELATED APPLICATIONS

The present application claims priority to Japanese Priority Patent Application JP 2009-203181 filed in the Japan Patent Office on Sep. 2, 2009 and JP-2010-174046 filed in the Japan Patent Office on Aug. 2, 2010, the entire contents of which are hereby incorporated by reference.

BACKGROUND

The present application relates to an optical element with an antireflection function and a method for manufacturing the optical element. More specifically, it relates to an optical element including structures formed from convex portions or concave portions and arranged in large numbers on the surface with a minute pitch smaller than or equal to the wavelength of the visible light, and a method for manufacturing the optical element.

Hitherto, regarding some optical elements by using light-transmitting substrates, e.g., glass and plastic, a surface treatment is performed to suppress surface reflection of light. As for this type of surface treatment, there is a treatment, in which fine and dense unevenness (moth-eye) is formed on an optical element surface (refer to "OPTICAL AND ELECTRO-OPTICAL ENGINEERING CONTACT", Vol. 43, No. 11 (2005), 630-637, for example).

In general, in the case where a periodic uneven shape is disposed on an optical element surface, diffraction occurs when light passes through there, and a straight-ahead component of the transmitted light is reduced significantly. However, in the case where the pitch of the uneven shape is smaller than the wavelength of the transmitting light, diffraction does not occur. For example, when the uneven shape is rectangular, as described later, an effective antireflection effect can be obtained with respect to a single-wavelength light corresponding to the pitch, the depth, and the like.

As for a moth-eye structure produced by using electron beam exposure, a moth-eye structure in the shape of fine tents (pitch of about 300 nm, depth of about 400 nm) has been disclosed (refer to NTT Advanced Technology Corporation, "Master mold for anti-reflective structure (moth-eye) independent from wavelength", [online], [searched on Feb. 27, 2008], internet <http://keytech.ntt-at.co.jp/nano/prd_0033.html>, for example). Regarding this moth-eye structure, a high-performance antireflection characteristic exhibiting a reflectance of 1% or less can be obtained.

Furthermore, as a moth-eye structure produced by using a method based on combination of an optical disk stamper producing process and an etching process, a moth-eye structure in the shape of a temple bell or the shape of an elliptical truncated cone have been disclosed (refer to International Patent Publication WO 08/023816, for example). Regarding this structure, an antireflection characteristic close to that based on the electron beam exposure is obtained.

SUMMARY

The above-described moth-eye structure is based on the principle that the refractive index is changed stepwise by disposing fine unevenness on the surface and, thereby, reflection is suppressed. Therefore, in the case where fingerprints are adhered to the structure, it is desired that the stains can be removed by dry cloth wiping. This is because if the stains, e.g., oil, contained in the fingerprints are filled in concave portions of the moth-eye structure, reflection is not suppressed.

When fingerprints are adhered to the moth-eye structure, stains are adhered following the pattern of the fingerprints. Thereafter, the adhered stains are sunk into the concave portions of the structure because of a capillary phenomenon. If dry cloth wiping is performed in this state, the stains are filled into merely the concave portions and, thereby, the reflection suppressing effect of the uneven structure is reduced, so that the reflectance increases.

Sinking into the concave portions of the structure is suppressed to some extent by coating the surface with a low-surface energy substance, e.g., fluorine. However, the sinking into the concave portions of the structure is not prevented by dry cloth wiping. This is because the concave portion of the structure is finer than a fiber used for the dry cloth wiping and, therefore, the power of stains to remain in the concave portion is larger than the power of a fiber to soak up the stains.

Accordingly, it is desirable to provide an optical element capable of wiping stains, e.g., fingerprints, and a method for manufacturing the optical element.

An optical element with an antireflection function, according to an embodiment, is provided with a substrate having a surface and a plurality of structures formed from convex portions or concave portions and arranged in large numbers on the surface of the substrate with a minute pitch less than or equal to the wavelength of the visible light, wherein the modulus of elasticity of the material forming the structures is 1 MPa or more, and 1,200 MPa or less, and the aspect ratio of the structure is 0.6 or more, and 1.5 or less.

An optical element with an antireflection function, according to an embodiment, is provided with a plurality of structures formed from convex portions and arranged in large numbers with a minute pitch less than or equal to the wavelength of the visible light, wherein lower portions of the adjacent structures are mutually joined, the modulus of elasticity of the material forming the structures is 1 MPa or more, and 1,200 MPa or less, and the aspect ratio of the structure is 0.6 or more, and 1.5 or less.

An optical element with an antireflection function, according to an embodiment, is provided with a substrate having a surface and a plurality of structures formed from convex portions or concave portions and arranged in large numbers on the surface of the substrate with a minute pitch less than or equal to the wavelength of the visible light, wherein the modulus of elasticity of the material forming the structures is 1 MPa or more, and 1,200 MPa or less, and the aspect ratio of the structure is 0.6 or more, and 5 or less.

A display device according to an embodiment is provided with any one of the above-described optical element.

In an embodiment, it is preferable that main structures are periodically arranged in the shape of a tetragonal lattice or the shape of a quasi-tetragonal lattice. Here, the tetragonal lattice refers to a lattice in the shape of a square. The quasi-tetragonal lattice refers to a lattice in the shape of a distorted square different from the lattice in the shape of a square.

For example, in the case where the structures are arranged on a straight line, the quasi-tetragonal lattice refers to a tetragonal lattice obtained by stretching a lattice in the shape of a square in the direction of the arrangement in the shape of the straight line (track direction), so as to distort.

In the case where the structures are arranged meanderingly, the quasi-tetragonal lattice refers to a tetragonal lattice obtained by distorting a lattice in the shape of a square on the basis of the meandering arrangement of the structures. Alternatively, the quasi-tetragonal lattice refers to a tetragonal lattice obtained by stretching a lattice in the shape of a square in the direction of the arrangement in the shape of the straight line (track direction), so as to distort and, in addition, distorting on the basis of the meandering arrangement of the structures.

In an embodiment, it is preferable that the structures are periodically arranged in the shape of a hexagonal lattice or the shape of a quasi-hexagonal lattice. Here, the hexagonal lattice refers to a lattice in the shape of a regular hexagon. The quasi-hexagonal lattice refers to a lattice in the shape of a distorted regular hexagon different from the lattice in the shape of a regular hexagon.

For example, in the case where the structures are arranged on a straight line, the quasi-hexagonal lattice refers to a hexagonal lattice obtained by stretching a lattice in the shape of a regular hexagon in the direction of the arrangement in the shape of the straight line (track direction), so as to distort. In the case where the structures are arranged meanderingly, the quasi-hexagonal lattice refers to a hexagonal lattice obtained by distorting a lattice in the shape of a regular hexagon on the basis of the meandering arrangement of the structures. Alternatively, the quasi-hexagonal lattice refers to a hexagonal lattice obtained by stretching a lattice in the shape of a regular hexagon in the direction of the arrangement in the shape of the straight line (track direction), so as to distort and, in addition, distorting on the basis of the meandering arrangement of the structures.

In embodiments of the present application, an ellipse includes not only a perfect ellipse defined mathematically, but also ellipses provided with distortion to some extent. A circle includes not only a perfect circle (complete round) defined mathematically, but also circles provided with distortion to some extent.

In embodiments of the present application, it is preferable that the arrangement pitch P1 of the structures in the same track is larger than the arrangement pitch P2 of the structures between adjacent two tracks. Consequently, the filling factor of the structures having the shape of an elliptical cone or an elliptical truncated cone is improved and, thereby, the antireflection characteristic is improved.

In embodiments of the present application, in the case where the individual structures form a hexagonal lattice pattern or a quasi-hexagonal lattice pattern on the surface of the substrate, it is preferable that the ratio P1/P2 satisfies the relationship represented by $1.00 \leq P1/P2 \leq 1.1$ or $1.00 < P1/P2 \leq 1.1$, where the arrangement pitch of the structures in the same track is assumed to be P1 and the arrangement pitch of the structures between adjacent two tracks is assumed to be P2. In the case where the above-described numerical range is employed, the filling factor of the structures having the shape of an elliptical cone or an elliptical truncated cone is improved and, thereby, the antireflection characteristic is improved.

In embodiments of the present application, in the case where the individual structures form a hexagonal lattice pattern or a quasi-hexagonal lattice pattern on the substrate surface, it is preferable that the individual structures are in the shape of an elliptical cone or an elliptical truncated cone, which has a major axis direction in the extension direction of the track and which is formed in such a way that the slope of the central portion is sharper than the slopes of the top portion and the bottom portion. In the case where such a shape is employed, the antireflection characteristic and the transmission characteristic is improved.

In embodiments of the present application, in the case where the individual structures form a hexagonal lattice pattern or a quasi-hexagonal lattice pattern on the substrate surface, it is preferable that the height or the depth of the structures in the extension direction of the track is smaller than the height or the depth of the structures in the direction of lines of the tracks. In the case where such a relationship is not satisfied, it is desirable to increase the arrangement pitch in the extension direction of the track, so that the filling factor of the structures in the extension direction of the track may be reduced. If the filling factor is reduced, as described above, degradation in antireflection characteristic is invited.

In embodiments of the present application, in the case where the structures form a tetragonal lattice pattern or a quasi-tetragonal lattice pattern on the substrate surface, it is preferable that the arrangement pitch P1 of the structures in the same track is larger than the arrangement pitch P2 of the structures between adjacent two tracks. Consequently, the filling factor of the structures having the shape of an elliptical cone or an elliptical truncated cone is improved and, thereby, the antireflection characteristic is improved.

In the case where the structures form a tetragonal lattice pattern or a quasi-tetragonal lattice pattern on the substrate surface, it is preferable that the ratio P1/P2 satisfies the relationship represented by $1.4 < P1/P2 \leq 1.5$, where the arrangement pitch of the structures in the same track is assumed to be P1 and the arrangement pitch of the structures between adjacent two tracks is assumed to be P2. In the case where the above-described numerical range is employed, the filling factor of the structures having the shape of an elliptical cone or an elliptical truncated cone is improved and, thereby, the antireflection characteristic is improved.

In the case where the individual structures form a tetragonal lattice pattern or a quasi-tetragonal lattice pattern on the substrate surface, it is preferable that the individual structures are in the shape of an elliptical cone or an elliptical truncated cone, which has a major axis direction in the extension direction of the track and which is formed in such a way that the slope of the central portion is sharper than the slopes of the top portion and the bottom portion. In the case where such a shape is employed, the antireflection characteristic and the transmission characteristic is improved.

In the case where the structures form a tetragonal lattice pattern or a quasi-tetragonal lattice pattern on the substrate surface, it is preferable that the height or the depth of the structures in the direction at 45 degrees or the direction at about 45 degrees with respect to the track is smaller than the height or the depth of the structures in the direction of lines of the tracks. In the case where such a relationship is not satisfied, it is desirable to increase the arrangement pitch in the direction at 45 degrees or the direction at about 45 degrees with respect to the track, so that the filling factor of the structures in the direction at 45 degrees or the direction at about 45 degrees with respect to the track is reduced. If the filling factor is reduced, as described above, degradation in antireflection characteristic is invited.

In embodiments of the present application, it is preferable that structures disposed in large numbers on the substrate surface with a minute pitch constitute a plurality of lines of tracks and form a hexagonal lattice pattern, a quasi-hexagonal lattice pattern, a tetragonal lattice pattern, or a quasi-tetragonal lattice pattern between adjacent three lines of tracks. Consequently, the packing density of the structures on the surface is increased and, thereby, an antireflection efficiency with respect to the visible light is increased, so that an optical element having an excellent antireflection characteristic and a high transmittance is obtained.

In embodiments of the present application, it is preferable that the optical element is produced by using a method based on combination of an optical disk stamper producing process and an etching process. A stamper for producing an optical element is produced in a short time with efficiency and, in addition, it is possible to respond to upsizing of the substrate. Consequently, the productivity of the optical element is improved. Furthermore, in the case where the fine arrangement of the structures are disposed on not only a light incident surface, but also a light emitting surface, the transmission characteristic can is further improved.

In embodiments of the present application, the modulus of elasticity of the material forming the structures is specified to be 1 MPa or more, and 1,200 MPa or less, and the aspect ratio of the structure is specified to be 0.6 or more, and 1.5 or less. Therefore, the structures are deformed during wiping and adjacent structures come into contact with each other. Consequently, stains sunk between the structures are pushed out.

As described above, according to embodiments of the present application, the stains, e.g., fingerprints, adhered to the optical element surface are wiped off.

Additional features and advantages are described herein, and will be apparent from the following Detailed Description and the figures.

BRIEF DESCRIPTION OF THE FIGURES

FIG. 7 is a diagram for explaining a method for setting a structure bottom in the case where boundaries of structures are not clear;

FIG. 13A to FIG. 13C are step diagrams for explaining the method for manufacturing an optical element according to the first embodiment;

FIG. 20 is a schematic diagram showing an example of the configuration of a disk stamper exposing apparatus;

DETAILED DESCRIPTION

Figure 1A:
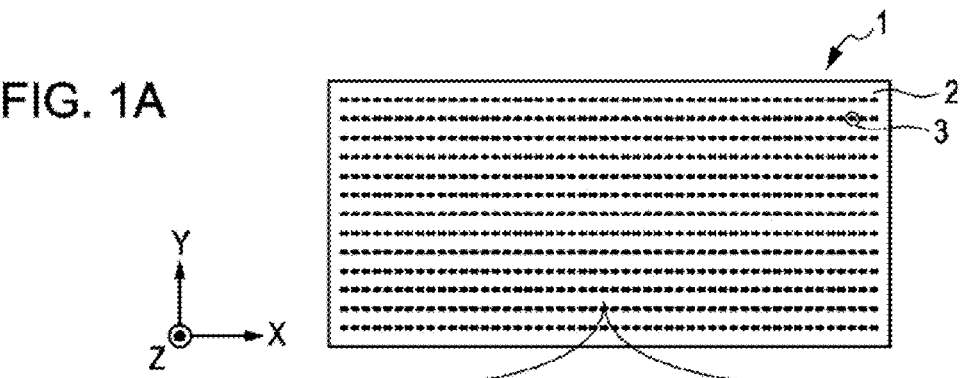
FIG. 1A is a schematic plan view showing an example of the configuration of an optical element according to a first embodiment.

The present application addresses the above-described problems, and other problems associated with the related art. An outline thereof will be described below.

The present inventors recognized that in the case where a material for forming structures was provided with the elasticity, the structures were deformed during wiping, stains sunk between the structures were pushed out, and substances having a contact angle of, for example, 90 degrees or less with respect to a flat film were able to be removed.

In order that the stains sunk between the structures are pushed out through deformation, it is desirable that adjacent structures come into contact with each other. In order that the structures are deformed and spaces between the structures are eliminated, the elasticity of the material for forming the structures and the aspect ratio of the structure are important. Then, the present inventors recognized on the basis of experiments that stains were removed when the modulus of elasticity and the aspect ratio were within predetermined ranges.

In the case where deformation of the structures is considered to be desirable, it is believed that even a material having high modulus of elasticity may be wiped off by increasing the pressure during wiping in theory. However, in the case where the material has poor elasticity, if wiping is performed with a pressure enough for deforming the structures, the structures may be broken or undergo plastic deformation. As a result, the reflectance after the wiping becomes higher than the reflectance before adhesion of fingerprints.

In the present application, the term "dry cloth wiping is performed" refers to that when stains are removed by a common wiping method, the reflectance before adhesion of fingerprints agree with or almost agree with the reflectance after wiping of the fingerprints.

The embodiments according to the present application will be described in the following order with reference to the drawings.

1. First embodiment (example of two-dimensional arrangement of structures into the shape of a straight line and, in addition, the shape of a hexagonal lattice: refer to FIG. 1)

2. Second embodiment (example of two-dimensional arrangement of structures into the shape of a straight line and, in addition, the shape of a tetragonal lattice: refer to FIG. 15)

3. Third embodiment (example of two-dimensional arrangement of structures into the shape of an arc and, in addition, the shape of a hexagonal lattice: refer to FIG. 18)

4. Fourth embodiment (example of meandering arrangement of structures: refer to FIG. 21)

5. Fifth embodiment (example of formation of concave structures on substrate surface: refer to FIG. 22)

6. Sixth embodiment (example of disposition of surface-treated layer: refer to FIG. 24)

7. Seventh embodiment (example of optical element without substrate: refer to FIG. 29)

8. Eighth embodiment (first example of application to display device: refer to FIG. 25)

9. Ninth embodiment (second example of application to display device: refer to FIG. 26)

10. Tenth embodiment (example in which both substrate and structure have flexibility)

1. First Embodiment

Configuration of Optical Element

Figure 1B:
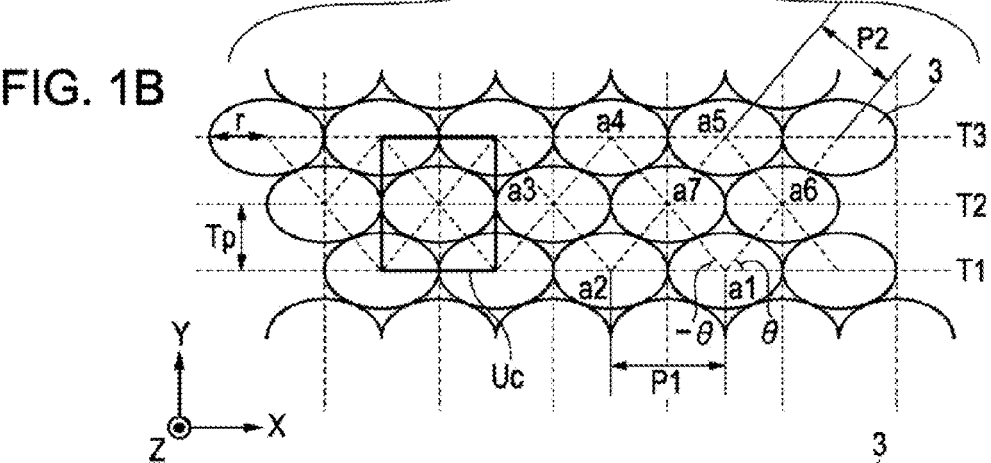
FIG. 1B is a magnified plan view illustrating a part of the optical element shown in FIG. 1A.
Figure 1C:
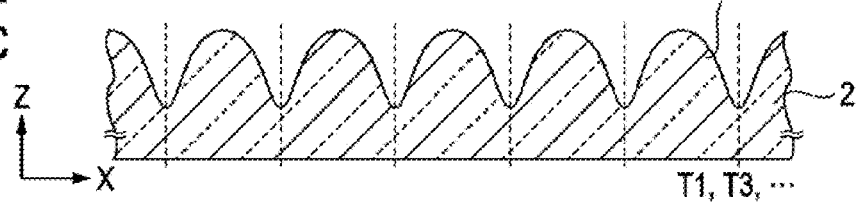
FIG. 1C is a sectional view along a track T1, T3, shown in FIG. 1B.
Figure 1D:
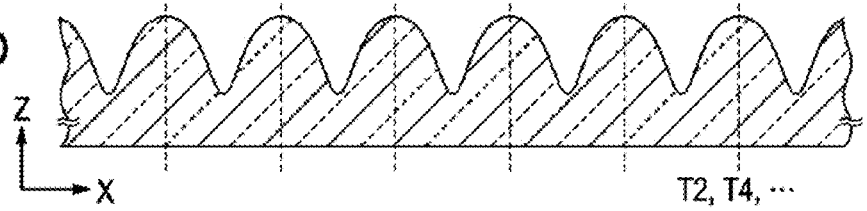
FIG. 1D is a sectional view along a track T2, T4, shown in FIG. 1B.
Figure 1E:
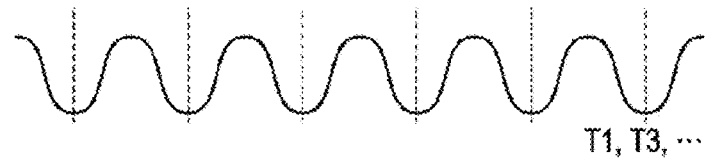
FIG. 1E is a schematic diagram showing a modulated waveform of the laser light used for forming a latent image corresponding to the tracks T1, T3, . . . shown in FIG. 1B.
Figure 1F:
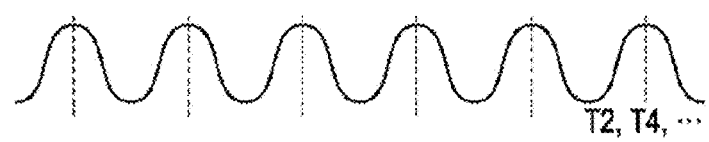
FIG. 1F is a schematic diagram showing a modulated waveform of the laser light used for forming a latent image corresponding to the tracks T2, T4, . . . shown in FIG. 1B.

FIG. 1A is a schematic plan view showing an example of the configuration of an optical element according to a first embodiment. FIG. 1B is a magnified plan view illustrating a part of the optical element shown in FIG. 1A. FIG. 1C is a sectional view along a track T1, T3, . . . shown in FIG. 1B. FIG. 1D is a sectional view along a track T2, T4, . . . shown in FIG. 1B. FIG. 1E is a schematic diagram showing a modulated waveform of the laser light used for forming a latent image corresponding to the tracks T1, T3, . . . shown in FIG. 1B. FIG. 1F is a schematic diagram showing a modulated waveform of the laser light used for forming a latent image corresponding to the tracks T2, T4, . . . shown in FIG. 1B. FIG. 2 and FIG. 4 to FIG. 6 are magnified perspective views illustrating a part of the optical element 1 shown in FIG. 1A. FIG. 3A is a sectional view of the optical element shown in FIG. 1A in the track extension direction (X direction (hereafter may be referred to as a track direction appropriately)). FIG. 3B is a sectional view of the optical element shown in FIG. 1A in the θ direction.

An optical element 1 is, for example, an optical sheet having an antireflection effect in accordance with the incident angle of incident light (sub-wavelength structure). This optical element 1 is favorably applied to optical apparatuses having various wavelength ranges (for example, optical apparatuses, e.g., cameras) and various optical devices, e.g., displays, optoelectronics, and telescopes.

The optical element 1 is provided with a substrate 2 having a principal surface and a plurality of structures 3, which are convex portions and which are disposed on the principal surface with a minute pitch smaller than or equal to the wavelength of the light, where reduction in reflection of the light is intended. This optical element 1 has a function to prevent reflection of light passing through the substrate 2 in the −Z direction shown in FIG. 2 at the interface between the structures 3 and the surrounding air.

The substrate 2 and the structures 3, which are provided in the optical element 1, will be sequentially described below.

(Substrate)

The substrate 2 is, for example, a transparent substrate having transparency. Examples of materials for the substrate 2 include materials containing transparent synthetic resins, e.g., polycarbonate (PC) and polyethylene terephthalate (PET), glass, and the like as primary components, although not specifically limited to these materials. Examples of shapes of the substrate 2 include the shape of a sheet, the shape of a plate, and the shape of a block, although not specifically limited to these shapes. Here, it is defined that the sheet includes a film. It is preferable that the shape of the substrate 2 is selected appropriately in accordance with the shapes of portions which have to have a predetermined antireflection function in optical apparatuses, e.g., cameras.

(Structures)

Structures 3 formed from convex portions are arranged in large numbers on a surface of the substrate 2. These structures 3 are periodically two-dimensionally arranged with a short pitch smaller than or equal to the wavelength band of the light, where reduction in reflection of the light is intended, for example, with the same level of arrangement pitch as the wavelength of the visible light. Here, the arrangement pitch refers to an arrangement pitch P1 and an arrangement pitch P2. The wavelength band of the light, where reduction in reflection of the light is intended, is the wavelength band of ultraviolet light, the wavelength band of visible light, the wavelength band of infrared light, or the like. Here, the wavelength band of ultraviolet light refers to the wavelength band of 10 nm to 360 nm, the wavelength band of visible light refers to the wavelength band of 360 nm to 830 nm, and the wavelength band of infrared light refers to the wavelength band of 830 nm to 1 mm. Specifically, it is preferable that the arrangement pitch is 175 nm or more, and 350 nm or less. If the arrangement pitch is less than 175 nm, production of the structures 3 tends to become difficult. On the other hand, if the arrangement pitch exceeds 350 nm, diffraction of the visible light tends to occur.

The individual structures 3 of the optical element 1 have an arrangement form constituting a plurality of tracks T1, T2, T3, . . . (hereafter may be generically referred to as "track T") on the surface of the substrate 2. In the present application, the track refers to a portion, in which the structures 3 are lined up while being aligned into the shape of a straight line. Furthermore, the direction of lines refers to a direction orthogonal to the extension direction of the track (X direction) on a forming surface of the substrate 2.

The structures 3 are arranged in such a way that positions in adjacent two tracks T are displaced a half pitch with respect to each other. Specifically, regarding the adjacent two tracks T, the structures 3 of one track (for example, T2) are arranged at midpoint positions (positions displaced a half pitch) of the structures 3 arranged in the other track (for example, T1). As a result, as shown in FIG. 1B, regarding the adjacent three lines of tracks (T1 to T3), the structures 3 are arranged in such a way as to form a hexagonal lattice pattern or a quasi-hexagonal lattice pattern, in which the centers of the structures 3 are located at individual points a1 to a7. In the present first embodiment, the hexagonal lattice pattern refers to a lattice pattern in the shape of a regular hexagon. Furthermore, the quasi-hexagonal lattice pattern is different from the lattice pattern in the shape of a regular hexagon and refers to a hexagonal lattice pattern stretched in an extension direction of the track (X axis direction), so as to distort.

In the case where the structures 3 are arranged in such a way as to form a quasi-hexagonal lattice pattern, as shown in FIG. 1B, it is preferable that the arrangement pitch P1 (the distance between a1 and a2) of the structures 3 in the same track (for example, T1) is larger than the arrangement pitch of the structures 3 in adjacent two tracks (for example, tracks T1 and T2), that is, the arrangement pitch P2 (for example, the distance between a1 and a7, a2 and a7) of the structures 3 in ±θ directions with respect to the extension direction of the track. It becomes possible to further improve the packing density of the structures 3 by arranging the structures 3 as described above.

It is preferable that the structure 3 has the shape of a cone or the shape of a cone, in which the shape of a cone is stretched or contracted in the track direction, from the viewpoint of ease in formation. It is preferable that the structure 3 has the shape of an axisymmetric cone or the shape of a cone, in which the shape of a cone is stretched or contracted in the track direction. In the case where adjacent structures 3 are joined, it is preferable that the structure 3 has the shape of an axisymmetric cone or the shape of a cone, in which the shape of a cone is stretched or contracted in the track direction except the lower portion joined to the adjacent structure 3. Examples of the shapes of a cone include the shape of a circular cone, the shape of a circular truncated cone, the shape of an elliptical cone, the shape of an elliptical truncated cone, the shape of a pyramid (for example, the shape of a three-sided pyramid, the shape of a four-sided pyramid, and the shape of a five-sided pyramid), and the shape of a truncated pyramid. Here, as described above, the shape of a cone is a concept including the shape of an elliptical cone, the shape of an elliptical truncated cone, and the shape of a truncated pyramid besides the shape of a circular cone, the shape of a circular truncated cone, and the shape of a pyramid. In this regard, the shape of a circular truncated cone refers to the shape, in which the top portion of the shape of a circular cone has been cut off, and the shape of an elliptical truncated cone refers to the shape, in which the top portion of the shape of an elliptical cone has been cut off. The shape of a truncated pyramid refers to the shape, in which the top portion of the shape of a pyramid has been cut off. Furthermore, the shape of the structure 3 is not limited to the above-described shapes, and the shapes, e.g., the shape of a needle, the shape of a circular column, the shape of a dome, and the shape of a tent, can be adopted. Here, the shape of a tent refers to the shape in which a conical surface of a pyramid or a truncated pyramid is dented concavely.

Figure 2:
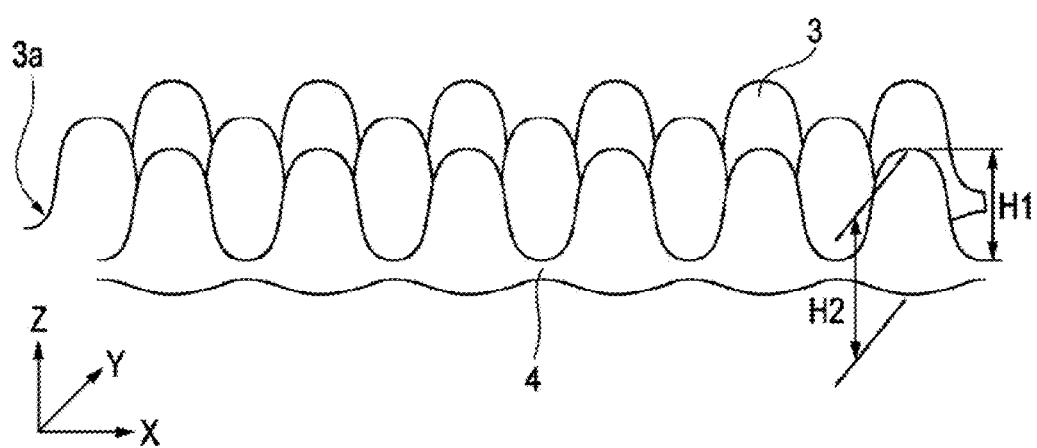
FIG. 2 is a magnified perspective view illustrating a part of the optical element shown in FIG. 1A.
Figure 3A:
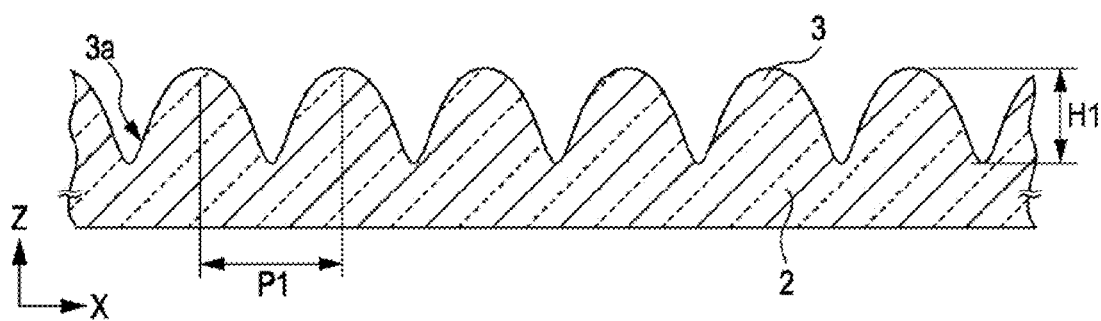
FIG. 3A is a sectional view of the optical element shown in FIG. 1A in the track extension direction and FIG. 3B is a sectional view of the optical element shown in FIG. 1A in the θ direction.
Figure 3B:
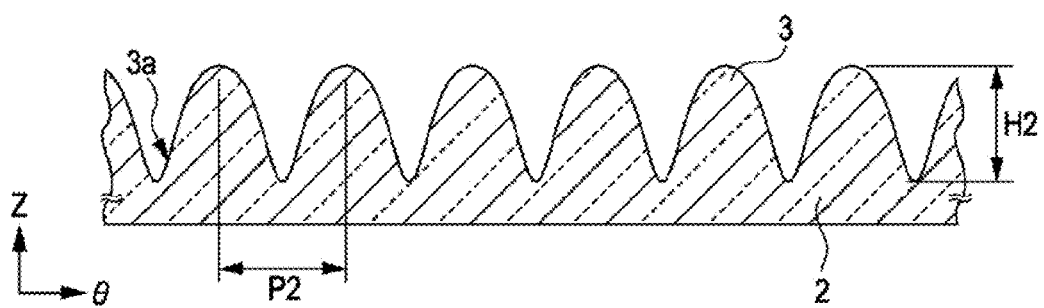
Figure 4:
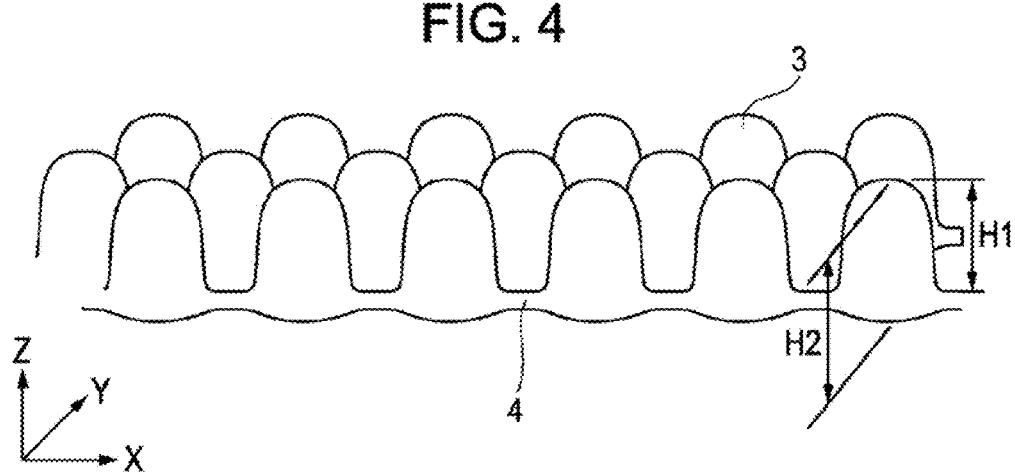
FIG. 4 is a magnified perspective view illustrating a part of the optical element shown in FIG. 1A.
Figure 5:
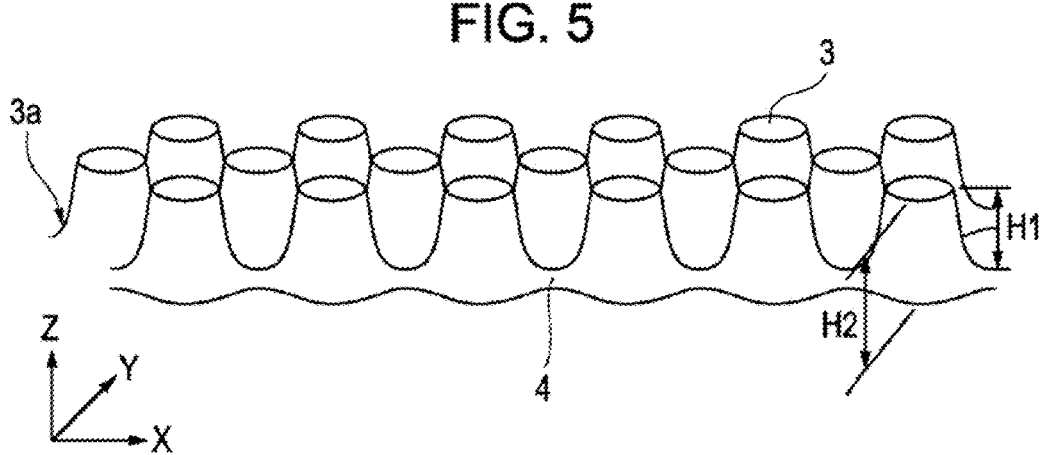
FIG. 5 is a magnified perspective view illustrating a part of the optical element shown in FIG. 1A.

As shown in FIG. 2 and FIG. 4, it is preferable that the structure 3 is in the shape of an elliptical cone, in which the bottom is in the shape of an ellipse, an oval, or an egg having a major axis and a minor axis and the top portion is a curved surface. Alternatively, as shown in FIG. 5, an elliptical truncated cone, in which the bottom is in the shape of an ellipse, an oval, or an egg having a major axis and a minor axis and the top portion is flat, is preferable. This is because in the case where the above-described shapes are employed, the filling factor in the direction of lines can be improved.

From the viewpoint of an improvement of the reflection characteristic, the shape of a cone, in which the slope of the top portion is gentle and the slope becomes sharp gradually from the central portion toward the bottom portion (refer to FIG. 4) is preferable. Alternatively, from the viewpoint of improvements of the reflection characteristic and the transmission characteristic, a cone shape, in which the slope of the central portion is sharper than the slopes of the bottom portion and the top portion (refer to FIG. 2) or the shape of a cone, in which the top portion is flat (refer to FIG. 5) is preferable. In the case where the structure 3 has the shape of an elliptical cone or the elliptical truncated cone, it is preferable that the major axis direction of the bottom thereof becomes parallel to the extension direction of the track. In FIG. 2 and the like, the individual structures 3 have the same shape. However, the shape of the structure 3 is not limited to this. The structures 3 in at least two types of shapes may be formed on the substrate surface. Furthermore, the structures 3 may be formed integrally with the substrate 2.

Figure 6:
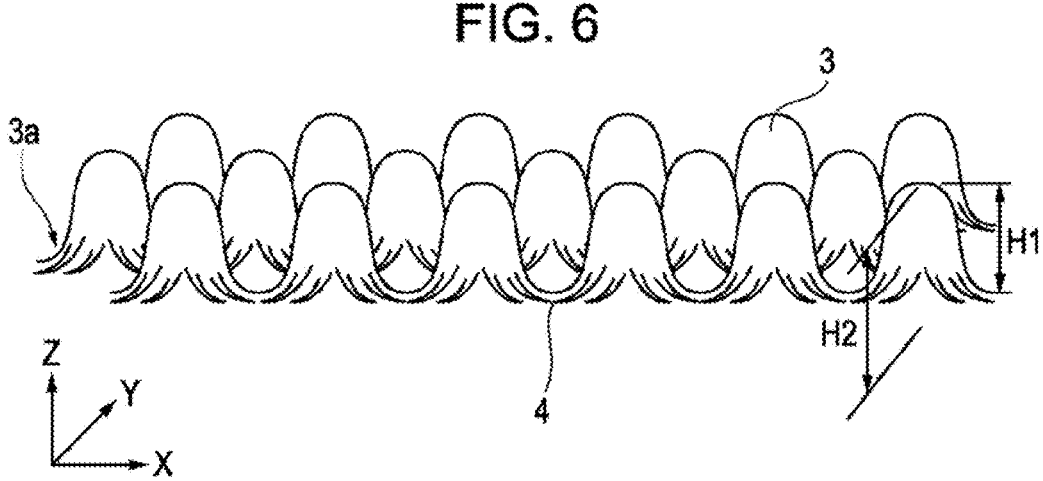
FIG. 6 is a magnified perspective view illustrating a part of the optical element shown in FIG. 1A.
Figure 8A:
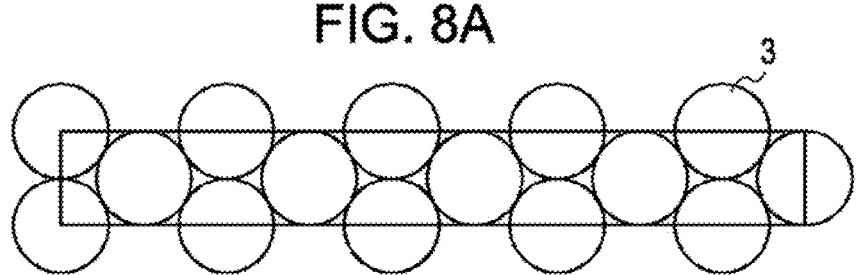
FIG. 8A to FIG. 8D are diagrams showing the bottom shapes, where the ellipticity of the bottom of the structure is changed.
Figure 8B:
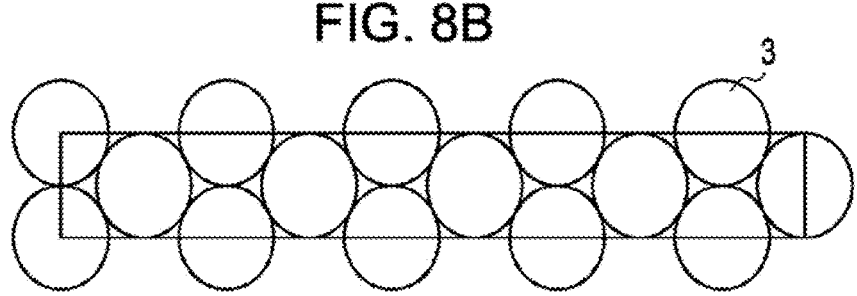
Figure 8C:
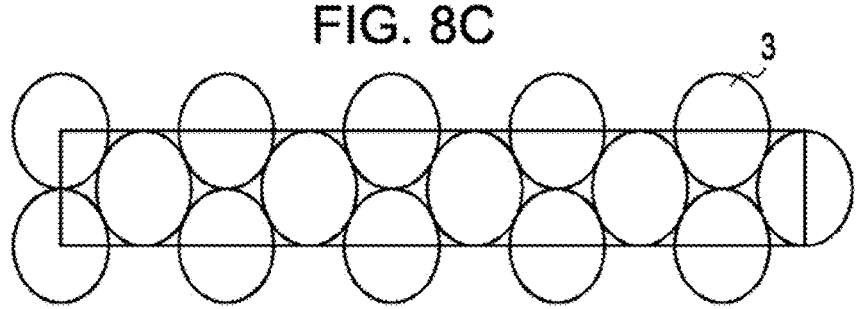
Figure 8D:
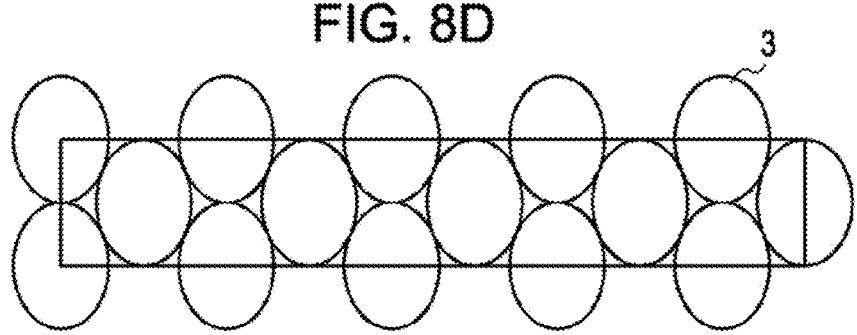

Moreover, as shown in FIG. 2 and FIG. 4 to FIG. 6, it is preferable that protruded portions 4 are disposed as a part of or all of the circumference of the structures 3. This is because the reflectance is controlled at a low level by employing the above-described manner even in the case where the filling factor of the structures 3 is low. Specifically, as shown in FIG. 2, FIG. 4, and FIG. 5, the protruded portions 4 are disposed between adjacent structures 3. Alternatively, as shown in FIG. 6, slender protruded portions 4 may be disposed as a part of or all of the circumference of the structures 3. The slender protruded portion 4 is extended, for example, from the top portion of the structure 3 toward the lower portion. Examples of sectional shapes of the protruded portion 4 include the shape of a triangle and the shape of a tetragon, although not specifically limited to these shapes. The shape is selected in consideration of the ease of formation and the like. In addition, the surface of a part of or all of the circumference of the structures 3 may be roughened, so as to form fine unevenness. Specifically, for example, the surfaces of adjacent structures 3 may be roughened, so as to form fine unevenness. Alternatively, small holes may be formed in the surfaces, for example, the top portions, of the structures 3.

The structures 3 are not limited to convex shapes shown in the drawing, and may be formed from concave portions disposed on the surface of the substrate 2. The height of the structure 3 is not specifically limited and is, for example, about 420 nm, and specifically 415 nm to 421 nm. In this regard, in the case where the structures 3 have concave shapes, the depth of the structures 3 is concerned.

It is preferable that the height H1 of the structures 3 in the track extension direction is smaller than the height H2 of the structures 3 in the direction of lines. That is, it is preferable that the heights H1 and H2 of the structures 3 satisfy the relationship represented by H1<H2. This is because if the structures 3 are arranged in such a way as to satisfy the relationship represented by H1≥H2, it becomes necessary to increase the arrangement pitch P1 in the extension direction of the track, so that the filling factor of the structures 3 in the extension direction of the track is reduced. If the filling factor is reduced, as described above, degradation in antireflection characteristic is invited.

In this regard, the aspect ratios of the structures 3 are not typically the same in all cases. The individual structures 3 may be configured to have certain height distribution (for example, the aspect ratio within the range of about 0.83 to 1.46). The wavelength dependence of the reflection characteristic can be reduced by disposing the structures 3 having the height distribution. Consequently, the optical element 1 having excellent antireflection characteristic can be realized.

Here, the height distribution refers to that the structures 3 having at least two types of heights (depths) are disposed on the surface of the substrate 2. That is, it is referred to that the structures 3 having the height serving as the reference and structures 3 having the heights different from the height of the above-described structures 3 are disposed on the surface of the substrate 2. For example, the structures 3 having the heights different from the reference are periodically or aperiodically (randomly) disposed on the surface of the substrate 2. Examples of directions of the periodicity include the extension direction of the track and the direction of lines.

It is preferable that a tail portion 3a is disposed on the circumference portion of the structure 3. This is because in the manufacturing step of the optical element, the optical element is easily pealed off a mold or the like. Here, the tail portion 3a refers to a protruded portion disposed on the circumference portion of the bottom portion of the structure 3. From the viewpoint of the above-described peeling characteristic, it is preferable that the tail portion 3a has a curved surface, the height of which is reduced gradually from the top portion of the structure 3 toward the lower portion. In this regard, the tail portion 3a may disposed on merely a part of the circumference portion of the structure 3. However, from the viewpoint of the above-described improvement in peeling characteristic, it is preferable that the tail portion 3a is disposed on all circumference portion of the structure 3. Furthermore, in the case where the structure 3 is a concave portion, the tail portion is a curved surface disposed on opening perimeter of the concave portion serving as the structure 3.

The height (depth) of the structure 3 is not specifically limited and is set appropriately in accordance with the wavelength region of the light to be transmitted. The height is set within the range of, for example, about 236 nm to 450 nm. The aspect ratio (height/arrangement pitch) of the structure 3 is within the range of 0.6 or more, and 1.5 or less, preferably 0.81 or more, and 1.46 or less, and more preferably 0.94 or more, and 1.28 or less. The reason is that if the aspect ratio is less than 0.6, the reflection characteristic and the transmission characteristic tend to be reduced, and if 1.5 is exceeded, the peeling characteristic of the structure 3 tends to be reduced in production of the optical element and a duplicate of a replica tends to become difficult to take off clearly.

Furthermore, it is preferable that the aspect ratio of the structure 3 is set within the range of 0.94 to 1.46 from the viewpoint of a further improvement of the reflection characteristic. Moreover, it is preferable that the aspect ratio of the structure 3 is set within the range of 0.81 to 1.28 from the viewpoint of a further improvement of the transmission characteristic.

Moreover, the aspect ratio (height/arrangement pitch) of the structure 3 is within the range of preferably 0.6 or more, and 5 or less, and more preferably 0.6 or more, and 4 or less. If the aspect ratio is less than 0.6, the reflection characteristic and the transmission characteristic tend to be reduced. On the other hand, if 5 is exceeded, the transferability tends to be reduced even when a treatment to improve the mold release property is performed by, for example, subjecting a stamper to fluorine coating and adding a silicone based additive, a fluorine based additive, or the like to a transfer resin. In this regard, in the case where the aspect ratio exceeds 4, the luminous reflectance is not changed to a great degree. Therefore, it is preferable that the aspect ratio is specified to be 4 or less in consideration of both an improvement in luminous reflectance and ease in mold release.

The modulus of elasticity of the material forming the structures 3 is 1 MPa or more, and 1,200 MPa or less. If the modulus of elasticity is less than 1 MPa, in a transfer step, adjacent structures are adhered to each other, the shape of the structures 3 becomes a shape different from the desired shape and, therefore, a desired reflection characteristic is not obtained. If 1,200 MPa is exceeded, adjacent structures do not easily come into contact with each other during wiping, so that stains and the like sunk between the structures are not pushed out.

By the way, the aspect ratio in the present application is defined by the following formula (1).

$$\text{aspect ratio} = H/P \qquad (1)$$

where, H: height of structure, P: average arrangement pitch (average period)

Here, the average arrangement pitch P is defined by the following formula (2).

$$\text{average arrangement pitch } P = (P1+P2+P2)/3 \qquad (2)$$

where, P1: arrangement pitch in extension direction of track (period in track extension direction), P2: arrangement pitch in $\pm\theta$ direction (where, $\theta=60°-\delta$, here, $\delta$ is preferably $0°<\delta\leq 11°$, and more preferably $3°\leq\delta\leq 6°$ with respect to extension direction of track (period in $\theta$ direction)

In this regard, the height H of the structures 3 is assumed to be the height in the direction of lines of the structures 3. The height of the structures 3 in the track extension direction (X direction) is smaller than the height in the direction of lines (Y direction) and the heights of the structures 3 in portions other than the track extension direction are nearly the same as the height in the direction of lines. Therefore, the height of the sub-wavelength structure is represented by the height in the direction of lines. However, in the case where the structures 3 are concave portions, the height H of the structure in the above-described formula (1) is specified to be the depth H of the structure.

It is preferable that the ratio P1/P2 satisfies the relationship represented by $1.00\leq P1/P2\leq 1.1$ or $1.00<P1/P2\leq 1.1$, where the arrangement pitch of the structures 3 in the same track is assumed to be P1 and the arrangement pitch of the structures 3 between adjacent two tracks is assumed to be P2. In the case where the above-described numerical range is employed, the filling factor of the structures 3 having the shape of an elliptical cone or an elliptical truncated cone is improved and, thereby, the antireflection characteristic is improved.

The filling factor of the structures 3 on the substrate surface is within the range of 65% or more, preferably 73% or more, and more preferably 86% or more, where the upper limit is 100%. In the case where the filling factor is specified to be within the above-described range, the antireflection characteristic is improved. In order to improve the filling factor, it is preferable that lower portions of adjacent structures 3 are mutually joined or distortion is given to the structures 3 through adjustment of the ellipticity of the structure bottom and the like.

Here, the filling factor (average filling factor) of the structures 3 is a value determined as described below.

Initially, a photograph of the surface of the optical element 1 is taken by using a scanning electron microscope (SEM) at Top View. Subsequently, a unit lattice Uc is selected at random from the resulting SEM photograph, and the arrangement pitch P1 of the unit lattice Uc and the track pitch Tp are measured (refer to FIG. 1B). Furthermore, the area S of the bottom of the structure 3 located at the center of the unit lattice Uc is measured on the basis of image processing. Next, the filling factor is determined by using the measured arrangement pitch P1, the track pitch Tp, and the area S of the bottom on the basis of the following formula (3).

$$\text{filling factor} = (S(\text{hex.})/S(\text{unit}))\times 100$$

$$\text{unit lattice area: } S(\text{unit}) = P1\times 2Tp$$

$$\text{area of bottom of structure present in unit lattice:}$$
$$S(\text{hex.}) = 2S \qquad (3)$$

The above-described processing for calculating the filling factor is performed with respect to 10 unit lattices selected at random from the resulting SEM photograph. Then, the measurement values are simply averaged (arithmetic average), so as to determine the average factor of the filling factors, and this is assumed to be the filling factor of the structures 3 on the substrate surface.

Regarding the filling factor in the case where the structures 3 are overlapped or auxiliary structures, e.g., protruded portions 4, are present between the structures 3, the filling factor can be determined by a method, in which a portion corresponding to 5% of height relative to the height of the structure 3 is assumed to be a threshold value and, thereby, the area ratio is decided.

FIG. 7 is a diagram for explaining a method for calculating a filling factor in the case where boundaries of structures 3 are not clear. In the case where boundaries of structures 3 are not clear, as shown in FIG. 7, a portion corresponding to 5% of height h ($=(d/h)\times 100$) of the structure 3 is assumed to be a threshold value on the basis of SEM observation of a cross-section, the diameter of the structure 3 is converted at that height d, and the filling factor is determined. In the case where the bottom of the structure 3 is elliptical, the same processing is performed with respect to the major axis and the minor axis.

FIGS. 8A to 8D are diagrams showing the bottom shapes, where the ellipticity of the bottom of the structure 3 is changed. The ellipticities of ellipses shown in FIG. 8A to FIG. 8D are 100%, 110%, 120%, and 141%, respectively. The filling factor of the structures 3 on the substrate surface can be changed by changing the ellipticity, as described above. In the case where the structures 3 constitute a quasi-hexagonal lattice pattern, it is preferable that the ellipticity e of the structure bottom satisfies 100%<e<150%. This is because the filling factor of the structures 3 is improved and an excellent antireflection characteristic is obtained by employing the above-described range.

Here, the ellipticity e is defined as $(a/b)\times 100$, where the diameter of the structure bottom in the track direction (X direction) is assumed to be a and the diameter in the direction of lines (Y direction), which is orthogonal to the track direction, is assumed to be b. In this regard, the diameters a and b of the structure 3 are values determined as described below. A photograph of the surface of the optical element 1 is taken by using a scanning electron microscope (SEM) at Top View, and 10 structures 3 are picked out at random from the resulting SEM photograph. Subsequently, the diameters a and b of the bottoms of the individual picked out structures 3 are measured. Then, the individual measurement values a and b are simply averaged (arithmetic average), so as to determine the average values of the diameters a and b. These are assumed to be the diameters a and b of the structures 3.

Figure 9A:
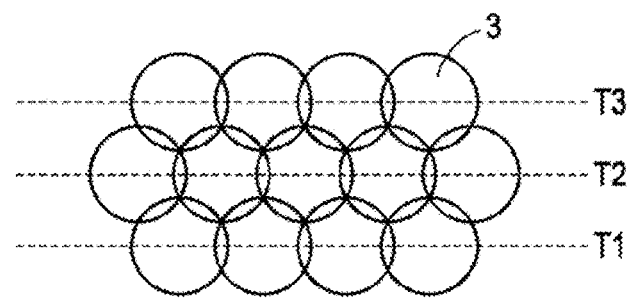
FIG. 9A is a diagram showing an example of the arrangement of structures having the shape of a circular cone or the shape of a circular truncated cone and FIG. 9B is a diagram showing an example of the arrangement of structures having the shape of an elliptical cone or the shape of an elliptical truncated cone.
Figure 9B:
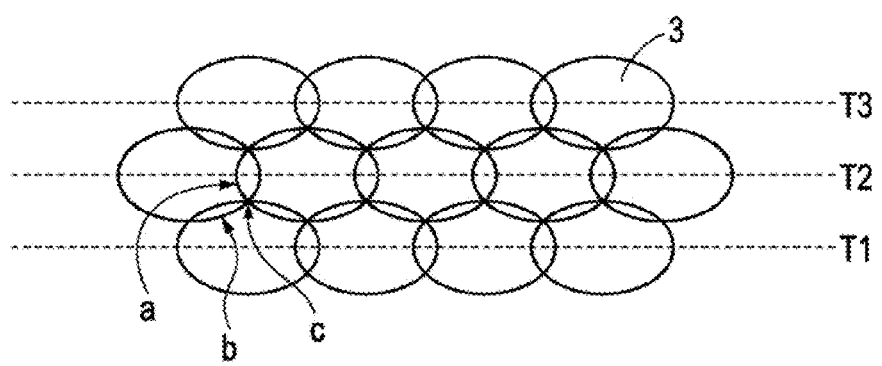

FIG. 9A shows an example of the arrangement of structures 3 having the shape of a circular cone or the shape of a circular truncated cone. FIG. 9B shows an example of the arrangement of structures 3 having the shape of an elliptical cone or the shape of an elliptical truncated cone. As shown in FIG. 9A and FIG. 9B, it is preferable that the structures 3 are joined in such a way that the lower portions thereof are overlapped with each other. Specifically, it is preferable that a lower portion of a structure 3 is joined to a part of or all of the lower portions of the structures 3 in the relationship of being adjacent to each other. More specifically, it is preferable that lower portions of the structures 3 are mutually joined in the track direction, in the θ direction, or in both of those directions. In FIG. 9A and FIG. 9B, examples, in which all of the lower portions of the structures 3 in the relationship of being adjacent to each other are joined, are shown. The filling factor of the structures 3 is improved by joining the structures 3, as described above. It is preferable that portions one-quarter or less of the structures, on a maximum value of optical path length in consideration of the refractive index in the wavelength band of the light in a use environment basis, are mutually joined. Consequently, an excellent antireflection characteristic is obtained.

As shown in FIG. 9B, in the case where lower portions of the structures 3 having the shape of an elliptical cone or the shape of an elliptical truncated cone are mutually joined, for example, the height of the joint portion is reduced in the order of the joint portions a, b, and c.

The ratio ((2r/P1)×100) of the diameter 2r to the arrangement pitch P1 is 85% or more, preferably 90% or more, and more preferably 95% or more. This is because the filling factor of the structures 3 is improved and an antireflection characteristic is improved by employing the above-described range. If the ratio ((2r/P1)×100) increases and overlapping of the structures 3 increases excessively, the antireflection characteristic tends to be degraded. Therefore, it is preferable to set the upper limit value of the ratio ((2r/P1)×100) in such a way that portions one-quarter or less of the structures, on a maximum value of optical path length in consideration of the refractive index in the wavelength band of the light in a use environment basis, are mutually joined. Here, the arrangement pitch P1 is the arrangement pitch of the structures 3 in the track direction and the diameter 2r is the diameter of the structure bottom in the track direction. In this regard, in the case where the structure bottom is in the shape of a circle, the diameter 2r refers to a diameter and in the case where the structure bottom is in the shape of an ellipse, the diameter 2r refers to a major axis.

Configuration of Roll Master

Figure 10A:
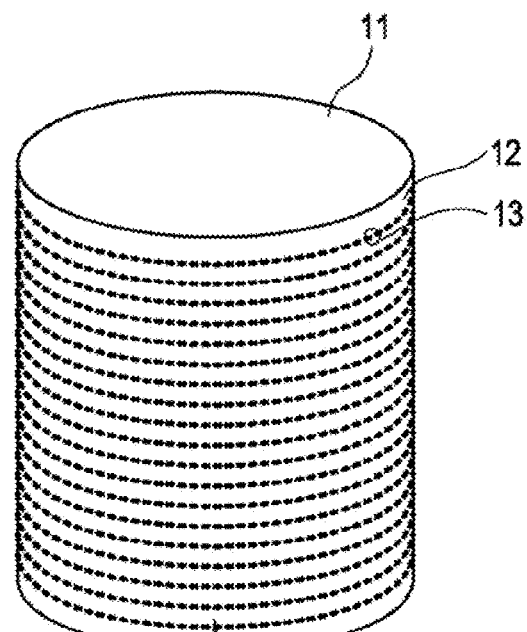
FIG. 10A is a perspective view showing an example of the configuration of a roll master for producing an optical element and FIG. 10B is a plan view showing an example of the configuration of a roll master for producing an optical element.

FIG. 10 shows an example of the configuration of a roll master for producing an optical element having the above-described configuration. As shown in FIG. 10, a roll master 11 has a configuration, in which, for example, structures 13 formed from concave portions are arranged in large numbers on the surface of a stamper 12 with the same level of pitch as the wavelength of light, e.g., the visible light. The stamper 12 has the shape of a circular column or a circular cylinder. As for the material for the stamper 12, for example, glass can be used, although not specifically limited to this material. A roll master exposing apparatus, as described later, is used, the two-dimensional patterns are linked spatially, a polarity inversion formatter signal and a rotation controller of a recording apparatus are synchronized to generate a signal on a track basis, and patterning is performed at CAV with an appropriate feed pitch. Consequently, a hexagonal lattice pattern or a quasi-hexagonal lattice pattern is recorded. A lattice pattern with a uniform spatial frequency is formed in a desired recording region by setting the frequency of the polarity inversion formatter signal and the number of revolutions of the roll appropriately.

Method for Manufacturing Optical Element

Next, a method for manufacturing an optical element 1 having the above-described configuration will be described with reference to FIG. 11 to FIG. 13C.

The method for manufacturing an optical element according to the first embodiment includes a resist film formation step to form a resist layer on a stamper, an exposure step to form a latent image of a moth-eye pattern on the resist layer by using a roll stamper exposing apparatus, and a development step to develop the resist layer provided with the latent image. Furthermore, an etching step to produce a roll master by using plasma etching and a duplicate step to produce a duplicate substrate from an ultraviolet curable resin are included.

(Configuration of Exposing Apparatus)

Figure 11:
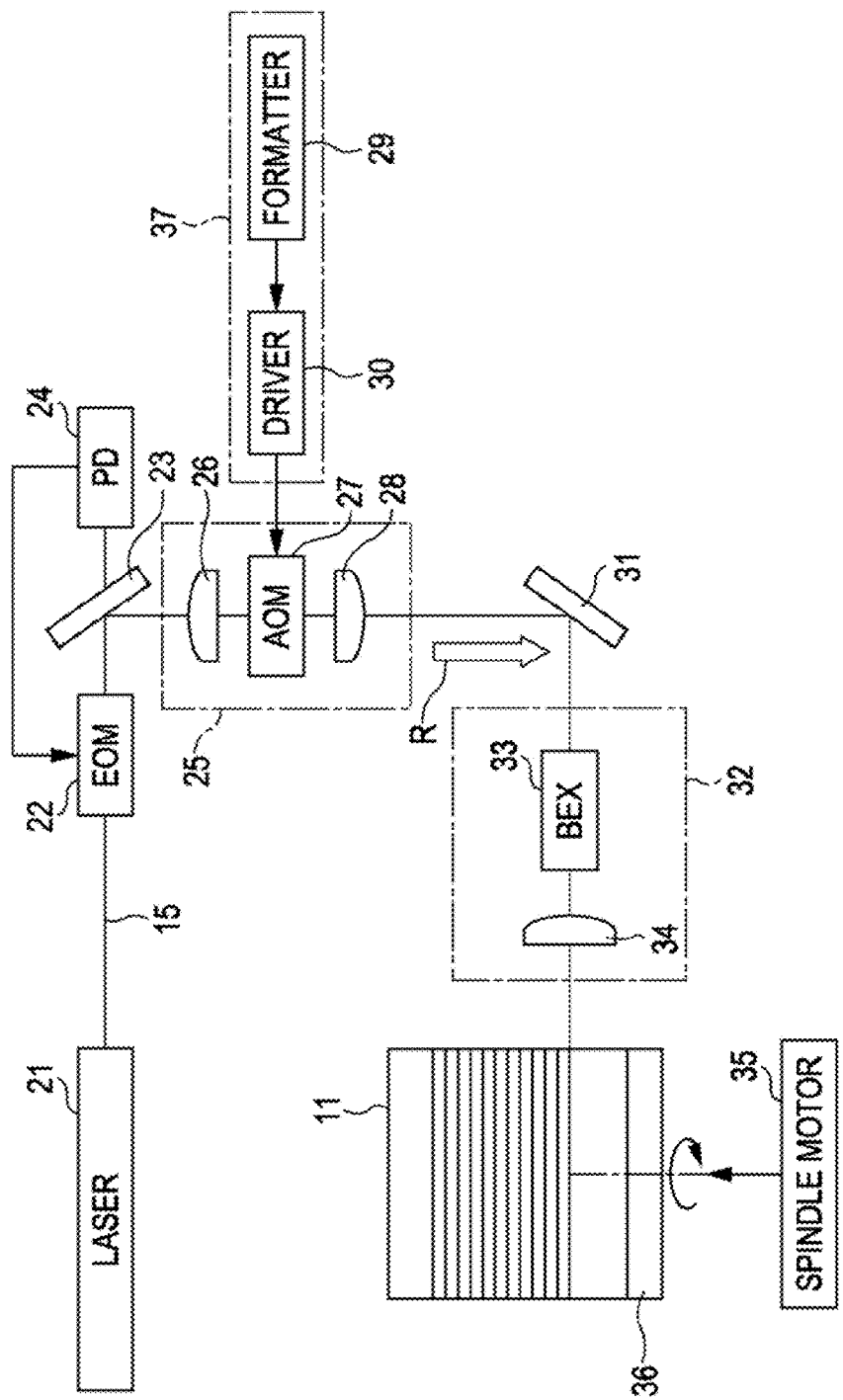
FIG. 11 is a schematic diagram showing an example of the configuration of a roll stamper exposing apparatus.

Initially, the configuration of a roll stamper exposing apparatus used for the exposure step of the moth-eye pattern will be described with reference to FIG. 11. This roll stamper exposing apparatus is formed on the basis of an optical disk recording apparatus.

A laser light source 21 is a light source to expose a resist applied as a film to the surface of the stamper 12 serving as a recording medium and is to laser the recording laser light 15 with a wavelength λ=266 nm, for example. The laser light 15 emitted from the laser light source 21 moves in a straight line while being in the state of a collimated beam and enters an electro optical modulator (EOM) 22. The laser light 15 passed through the electro optical modulator 22 is reflected at a mirror 23, and is led to a modulation optical system 25.

The mirror 23 is formed from a polarizing beam splitter, and has a function of reflecting one polarized component and transmitting the other polarized component. The polarized component passed through the mirror 23 is received with a photodiode 24, and the electro optical modulator 22 is controlled on the basis of the received light signal, so that phase modulation of the laser light 15 is performed.

In the modulation optical system 25, the laser light 15 is condensed on an acoust-optic modulator (AOM) 27, composed of glass (SiO2) or the like with a condenser lens 26. The laser light 15 is subjected to intensity modulation with the acoust-optic modulator 27, so as to diverge and, thereafter, is converted to a collimated beam with a collimator lens 28. The laser light 15 emitted from the modulation optical system 25 is reflected at a mirror 31 and is led on a moving optical table system 32 horizontally and in parallel.

The moving optical table system 32 is provided with a beam expander 33 and an objective lens 34. The laser light 15 led to the moving optical table system 32 is shaped into a desired beam shape with the beam expander 33 and, thereafter, is applied to the resist layer on the stamper 12 through the objective lens 34. The stamper 12 is placed on a turn table 36 connected to a spindle motor 35. Then, the laser light 15 is applied to the resist layer intermittently while the stamper 12 is rotated and, in addition, the laser light 15 is moved in the height direction of the stamper 12, so that an exposure step of the resist layer is performed. The formed latent image takes the shape of nearly an ellipse having a major axis in the circumferential direction. The movement of the laser light 15 is performed by movement of the moving optical table system 32 in the direction indicated by an arrow R.

The exposing apparatus is provided with a control mechanism 37 to form a latent image corresponding to the two-dimensional pattern of the hexagonal lattice or the quasi-hexagonal lattice shown in FIG. 1B on the resist layer. The control mechanism 37 is provided with a formatter 29 and a driver 30. The formatter 29 is provided with a polarity inversion portion. This polarity inversion portion controls the application timing of the laser light 15 to the resist layer. The driver 30 receives the output from the polarity inversion portion and controls the acoust-optic modulator 27.

Figure 10B:
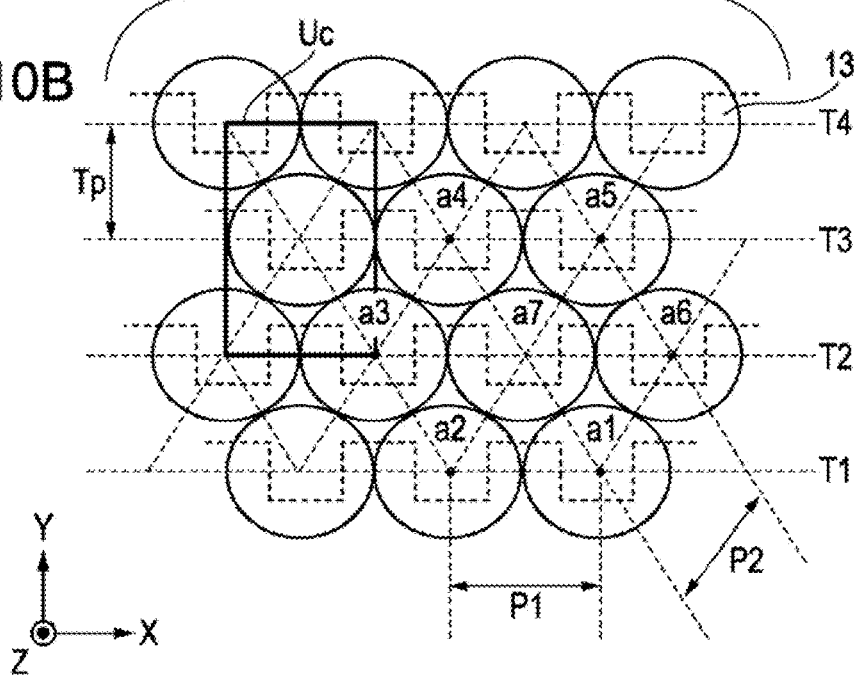

In this roll stamper exposing apparatus, a polarity inversion formatter signal and a rotation controller of the recording apparatus are synchronized to generate a signal and intensity modulation is performed with the acoust-optic modulator 27 on a track basis in such a way that the two-dimensional patterns are linked spatially. The hexagonal lattice or quasi-hexagonal lattice pattern can be recorded by performing patterning at a constant angular velocity (CAV) and the appropriate number of revolutions with an appropriate modulation frequency and an appropriate feed pitch. For example, as shown in FIG. 10B, in order to specify the period in the circumferential direction to be 315 nm and the period in an about 60 degree direction (about −60 degree direction) with respect to the circumferential direction to be 300 nm, it is enough that the feed pitch is specified to be 251 nm (Pythagorean theorem). The frequency of the polarity inversion formatter signal is changed by the number of revolutions of the roll (for example, 1,800 rpm, 900 rpm, 450 rpm, and 225 rpm). For example, the frequencies of the polarity inversion formatter signal corresponding to the number of revolutions of the roll of 1,800 rpm, 900 rpm, 450 rpm, and 225 rpm are 37.70 MHz, 18.85 MHz, 9.34 MHz, and 4.71 MHz, respectively. A quasi-hexagonal lattice pattern with a uniform spatial frequency (circumference 315 nm period, about 60 degree direction (about −60 degree direction) with respect to the circumferential direction 300 nm period) in a desired recording region is obtained by enlarging the beam diameter of the far-ultraviolet laser light by a factor of 5 with the beam expander (BEX) 33 in the moving optical table system 32, and applying the laser light to the resist layer on the stamper 12 through the objective lens 34 having a numerical aperture (NA) of 0.9, so as to form a fine latent image.

(Resist Film Formation Step)

Figure 12A:
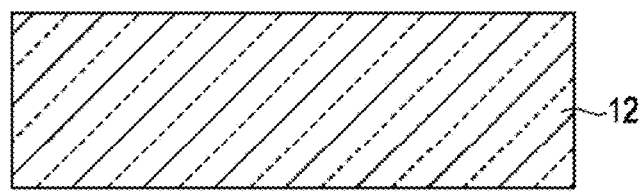
FIG. 12A to FIG. 12C are step diagrams for explaining a method for manufacturing an optical element according to a first embodiment.
Figure 12B:
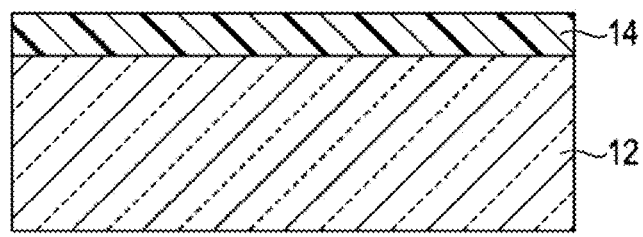

Initially, as shown in FIG. 12A, a stamper 12 in the shape of a circular column is prepared. This stamper 12 is, for example, a glass stamper. Subsequently, as shown in FIG. 12B, a resist layer 14 is formed on the surface of the stamper 12. As for the material for the resist layer 14, for example, any one of organic resists and inorganic resists may be used. As for the organic resist, for example, a novolac resist and a chemically amplified resist can be used.

(Exposure Step)

Figure 12C:
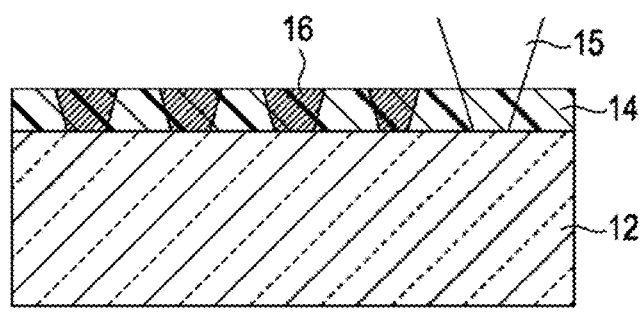

Then, as shown in FIG. 12C, the above-described roll stamper exposing apparatus is used, the stamper 12 is rotated and, in addition, the laser light (exposure beam) 15 is applied to the resist layer 14. At this time, the laser light 15 is applied intermittently while the laser light 15 is moved in the height direction of the stamper 12 (direction parallel to the center axis of the stamper 12 in the shape of a circular column or the shape of a circular cylinder) and, thereby, all over the surface of the resist layer 14 is exposed. In this manner, a latent image 16 in accordance with the locus of the laser light 15 is formed all over the resist layer 14 with, for example, the same level of pitch as the wavelength of the visible light.

For example, the latent image 16 is arranged in such a way as to constitute a plurality of lines of tracks on the stamper surface and, in addition, form a hexagonal lattice pattern or a quasi-hexagonal lattice pattern. For example, the latent image 16 is in the shape of an ellipse having a major axis direction in the extension direction of the track.

(Development Step)

Next, a developing solution is dropped on the resist layer 14 while the stamper 12 is rotated, so that the resist layer 14 is subjected to a developing treatment, as shown in FIG. 13A. As shown in the drawing, in the case where the resist layer 14 is formed from a positive type resist, the exposed portion exposed with the laser light 15 has an increased dissolution rate with respect to the developing solution as compared with that of the non-exposed portion. Therefore, a pattern in accordance with the latent image (exposed portion) 16 is formed on the resist layer 14.

(Etching Step)

Subsequently, the surface of the stamper 12 is subjected to an etching treatment while the pattern (resist pattern) of the resist layer 14 formed on the stamper 12 serves as a mask. In this manner, as shown in FIG. 13B, concave portions in the shape of an elliptical cone or the shape of an elliptical truncated cone having a major axis direction in the extension direction of the track, that is, structures 13, are obtained. As for the etching method, for example, dry etching is performed. At this time, for example, a pattern of the structures 13 in the shape of a cone can be formed by performing the etching treatment and an ashing treatment alternately. Furthermore, a glass master having a depth 3 times or more of the resist layer 14 (selection ratio of 3 or more) is produced, so that it is possible to achieve an increase in the aspect ratio of the structure 3.

Consequently, a roll master 11 having a hexagonal lattice pattern or a quasi-hexagonal lattice pattern in the concave shape having a depth of about 120 nm to about 350 nm is obtained.

(Duplicate Step)

Then, the roll master 11 and the substrate 2, e.g., a sheet coated with a transfer material are closely adhered. Thereafter, peeling is performed while ultraviolet rays are applied, so as to cure. In this manner, as shown in FIG. 13C, a plurality of structures composed of convex portions are formed on a first principal surface of the substrate 2 and, thereby, an optical element 1 composed of a moth-eye ultraviolet cured duplicate sheet or the like is produced.

The transfer material is formed from, for example, an ultraviolet curable material and an initiator and contains fillers, functional additives, and the like, as necessary.

The ultraviolet curable material is formed from, for example, a monofunctional monomer, a difunctional monomer, or a polyfunctional monomer and, specifically is composed of the following materials alone or a plurality of them in combination.

Examples of monofunctional monomers include carboxylic acids (acrylic acid), hydroxy monomers (2-hydroxyethyl acrylate, 2-hydroxypropyl acrylate, and 4-hydroxybutyl acrylate), alkyl, alicyclic monomers (isobutyl acrylate, t-butyl acrylate, isooctyl acrylate, lauryl acrylate, stearyl acrylate, isobonyl acrylate, and cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethylcarbitol acrylate, phenoxyethyl acrylate, N,N-dimethylaminoethyl acrylate, N,N-dimethylaminopropyl acrylamide, N,N-dimethyl acrylamide, acryloyl morpholine, N-isopropyl acrylamide, N,N-diethyl acrylamide, 2-vinylpyrrolidone, 2-(perfluorooctyl) ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate, and 2-ethylhexyl acrylate.

Examples of difunctional monomers include tri(propylene glycol) diacrylate, trimethylolpropane diallyl ether, and urethane acrylate.

Examples of polyfunctional monomers include trimethylolpropane triacrylate, dipentaerythritol penta and hexaacrylate, and ditrimethylolpropane tetraacrylate.

Examples of initiators include 2,2-dimethoxy-1,2-diphenylethan-1-one, 1-hydroxy-cyclohexyl phenyl ketone, and 2-hydroxy-2-methyl-1-phenylpropan-1-one.

As for the filler, for example, any one of inorganic fine particles and organic fine particles can be used. Examples of inorganic fine particles include metal oxide fine particles, e.g., $SiO_2$, $TiO_2$, $ZrO_2$, $SnO_2$, and $Al_2O_3$.

Examples of functional additives include leveling agents, surface regulators, and antifoaming agents. Examples of materials for the substrate 2 include methyl methacrylate (co)polymer, polycarbonate, styrene (co)polymer, methyl methacrylate-styrene copolymer, cellulose diacetate, cellulose triacetate, cellulose acetate butyrate, polyester, polyamide, polyimide, polyether sulfone, polysulfone, polypropylene, polymethylpentene, polyvinyl chloride, polyvinyl acetal, polyether ketone, polyurethane, and glass.

The method for molding the substrate 2 is not specifically limited. An injection-molded body, an extruded body, or a cast body may be employed. As necessary, the substrate surface may be subjected to a surface treatment, e.g., a corona treatment.

In the case where a structure 3 having a high aspect ratio (for example, a structure 3 having an aspect ratio of more than 1.5, and 5 or less) is produced, in order to improve the mold release property of the stamper, e.g., the roll master 11, it is preferable to apply a mold release agent, e.g., a silicone based mold release agent, a fluorine based mold release agent, or the like to the surface of the stamper, e.g., the roll master 11. Furthermore, it is preferable to add an additive, e.g., a fluorine based additive or a silicone based additive, to a transfer material.

Figure 14A:
FIG. 14A to FIG. 14C are schematic diagrams for explaining removal in the case where stains are adhered to a surface of an optical element.
Figure 14B:
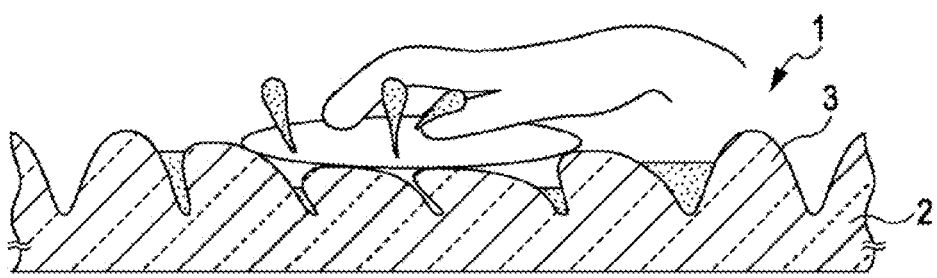
Figure 14C:

Here, removal in the case where stains are adhered on a surface of the optical element 1 produced as described above will be described. FIG. 14A to FIG. 14C are schematic diagrams for explaining removal in the case where stains are adhered to the surface of the optical element 1. As shown in FIG. 14A, when the surface of the optical element 1 is touched, stains due to fingerprints are adhered between the structures 3. If the surface of the optical element 1 in such a state is dry-cloth wiped, as shown in FIG. 14B, since the structures 3 have elasticity, the structures 3 are deformed elastically, so that adjacent structures 3 come into contact with each other. Consequently, stains adhered between the structures 3 are pushed out to the outside and, thereby, the stains due to fingerprints can be removed. Then, as shown in FIG. 14C, after the dry cloth wiping, the shapes of the structures 3 are restored to the original state because of an elastic force.

2. Second Embodiment

Configuration of Optical Element

Figure 15A:
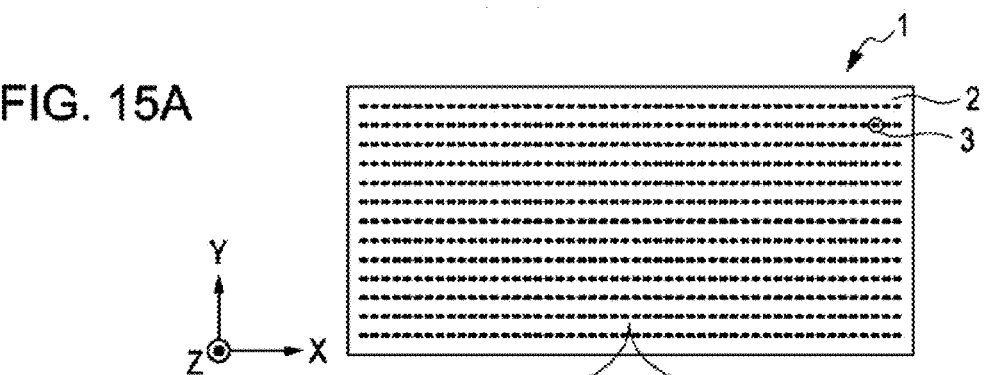
FIG. 15A is a schematic plan view showing an example of the configuration of an optical element according to a second embodiment.
Figure 15B:
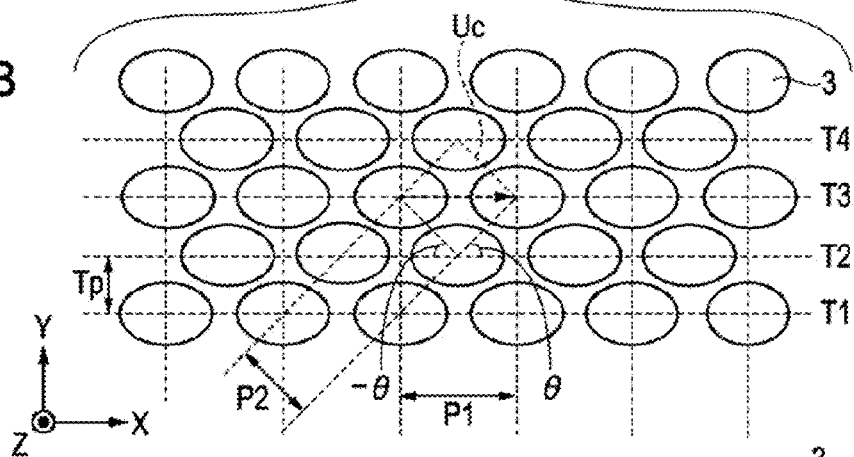
FIG. 15B is a magnified plan view illustrating a part of the optical element shown in FIG. 15A.
Figure 15C:
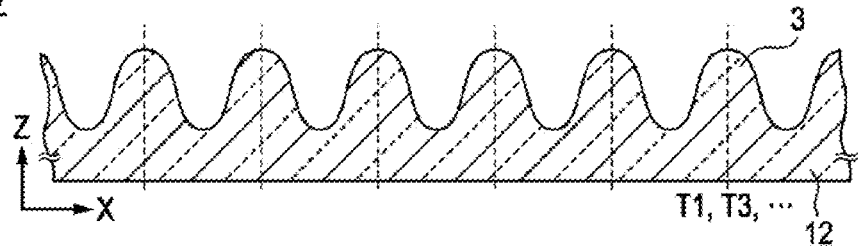
FIG. 15C is a sectional view along a track T1, T3, . . . shown in FIG. 15B.
Figure 15D:
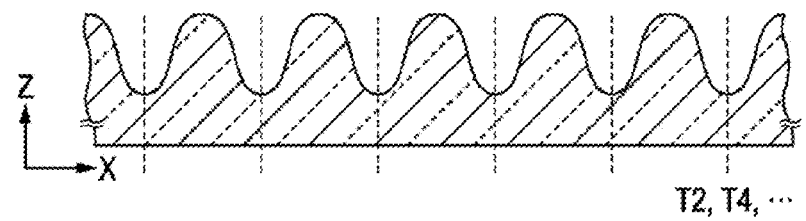
FIG. 15D is a sectional view along a track T2, T4, . . . shown in FIG. 15B.
Figure 15E:
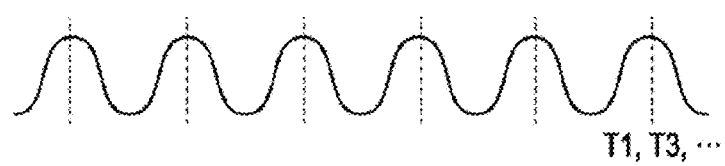
FIG. 15E is a schematic diagram showing a modulated waveform of the laser light used for forming a latent image corresponding to the tracks T1, T3, . . . shown in FIG. 15B, and FIG. 15 F is a schematic diagram showing a modulated waveform of the laser light used for forming a latent image corresponding to the tracks T2, T4, . . . shown in FIG. 15B.
Figure 15F:
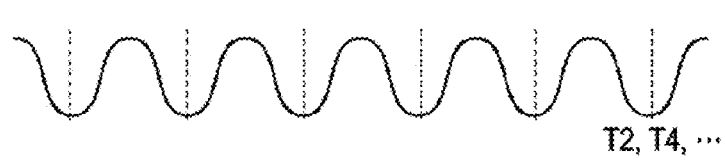

FIG. 15A is a schematic plan view showing an example of the configuration of an optical element according to a second embodiment. FIG. 15B is a magnified plan view illustrating a part of the optical element shown in FIG. 15A. FIG. 15C is a sectional view along a track T1, T3, . . . shown in FIG. 15B. FIG. 15D is a sectional view along a track T2, T4, . . . shown in FIG. 15B. FIG. 15E is a schematic diagram showing a modulated waveform of the laser light used for forming a latent image corresponding to the tracks T1, T3, . . . shown in FIG. 15B. FIG. 15F is a schematic diagram showing a modulated waveform of the laser light used for forming a latent image corresponding to the tracks T2, T4, . . . shown in FIG. 15B.

An optical element 1 according to the second embodiment is different from the optical element 1 of the first embodiment in that regarding the adjacent three lines of tracks, the individual structures 3 constitute a tetragonal lattice pattern or a quasi-tetragonal lattice pattern. In the present application, the quasi-tetragonal lattice pattern is different from the regular tetragonal lattice pattern and refers to a tetragonal lattice pattern stretched in the extension direction of the track (X direction), so as to distort.

The height or depth of the structure 3 is not specifically limited and is, for example, about 159 nm to 312 nm. The pitch P2 in a (about) 45 degree direction with respect to the track is, for example, about 275 nm to 297 nm. The aspect ratio (height/arrangement pitch) of the structures 3 is, for example, about 0.54 to 1.13. Furthermore, the aspect ratios of the structures 3 are not typically the same in all cases. The individual structures 3 may be configured to have certain height distribution.

It is preferable that the arrangement pitch P1 of the structures 3 in the same track is larger than the arrangement pitch P2 of the structures 3 between adjacent two tracks. Moreover, it is preferable that P1/P2 satisfies the relationship represented by $1.4 < P1/P2 \leq 1.5$, where the arrangement pitch of the structures 3 in the same track is assumed to be P1 and the arrangement pitch of the structures 3 between adjacent two tracks is assumed to be P2. In the case where the above-described numerical range is employed, the filling factor of the structures 3 having the shape of an elliptical cone or an elliptical truncated cone is improved and, thereby, the antireflection characteristic is improved. In addition, it is preferable that the height or the depth of the structures 3 in a 45 degree direction or an about 45 degree direction with respect to the track is smaller than the height or the depth of the structures 3 in the extension direction of the track.

It is preferable that the height H2 in the arrangement direction of the structures 3 (θ direction) slanting with respect to the extension direction of the track is smaller than the height H1 of the structures 3 in the extension direction of the track. That is, it is preferable that the heights H1 and H2 of the structures 3 satisfy the relationship represented by H1>H2.

Figure 16:
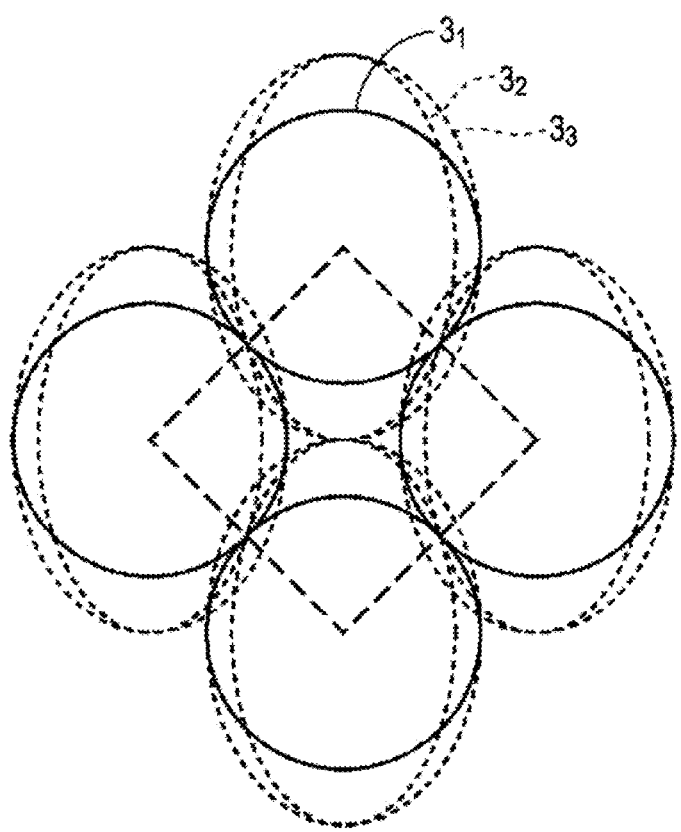
FIG. 16 is a diagram showing the bottom shapes, where the ellipticity of the bottom of the structure is changed.

FIG. 16 is a diagram showing the bottom shapes, where the ellipticity of the bottom of the structure 3 is changed. The ellipticities of ellipses 31, 32, and 33 are 100%, 163.3%, and 141%, respectively. The filling factor of the structures 3 on the substrate surface is changed by changing the ellipticity, as described above. In the case where the structures 3 constitute a tetragonal lattice or quasi-tetragonal lattice pattern, it is preferable that the ellipticity e of the structure bottom is $150\% \leq e \leq 180\%$. This is because the filling factor of the structures 3 is improved and an excellent antireflection characteristic is obtained by employing this range.

The filling factor of the structures 3 on the substrate surface is within the range of 65% or more, preferably 73% or more, and more preferably 86% or more, where the upper limit is 100%. In the case where the filling factor is specified to be within the above-described range, the antireflection characteristic is improved.

Here, the filling factor (average filling factor) of the structures 3 is a value determined as described below.

Initially, a photograph of the surface of the optical element 1 is taken by using a scanning electron microscope (SEM) at Top View. Subsequently, a unit lattice Uc is selected at random from the resulting SEM photograph, and the arrangement pitch P1 of the unit lattice Uc and the track pitch Tp are measured (refer to FIG. 15B). Furthermore, the area S of the bottom of any one of four structure 3 included in the unit lattice Uc is measured on the basis of image processing. Next, the filling factor is determined by using the measured arrangement pitch P1, the track pitch Tp, and the area S of the bottom on the basis of the following formula (4).

filling factor=($S$(tetra)/$S$(unit))×100 unit lattice area: $S$(unit)=2×(($P1 \times Tp$)×(½))=$P1 \times Tp$ area of bottom of structure present in unit lattice:
$S$(tetra)=$S$ (2)

The above-described processing for calculating the filling factor is performed with respect to 10 unit lattices selected at random from the resulting SEM photograph. Then, the measurement values are simply averaged (arithmetic average), so as to determine the average factor of the filling factors, and this is assumed to be the filling factor of the structures 3 on the substrate surface.

The ratio (($2r/P1$)×100) of the diameter $2r$ to the arrangement pitch P1 is 64% or more, preferably 69% or more, and more preferably 73% or more. This is because the filling factor of the structures 3 is improved and an antireflection characteristic is improved by employing the above-described range. Here, the arrangement pitch P1 is the arrangement pitch of the structures 3 in the track direction and the diameter $2r$ is the diameter of the structure bottom in the track direction. In this regard, in the case where the structure bottom is in the shape of a circle, the diameter $2r$ refers to a diameter and in the case where the structure bottom is in the shape of an ellipse, the diameter $2r$ refers to a major axis.

Figure 17A:
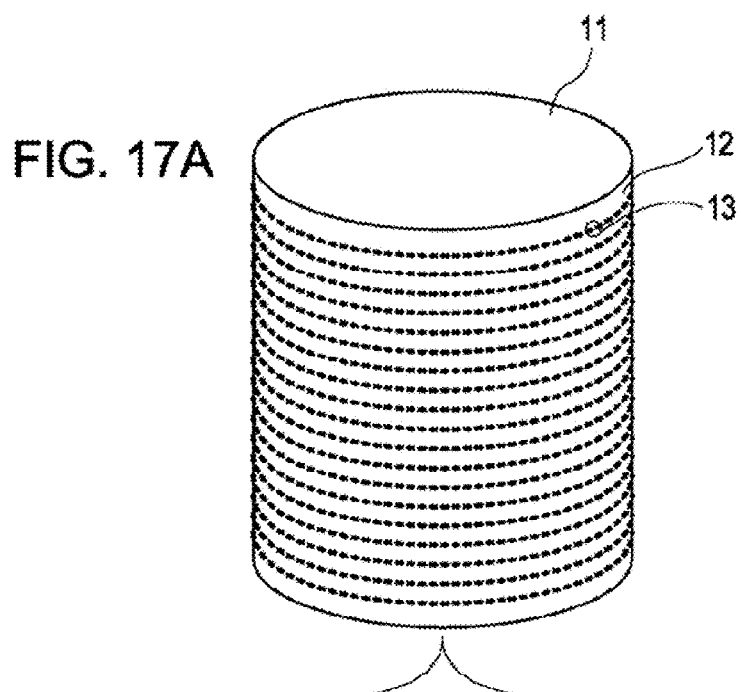
FIG. 17A is a perspective view showing an example of the configuration of a roll master for producing an optical element and FIG. 17B is a plan view showing an example of the configuration of a roll master for producing an optical element.
Figure 17B:
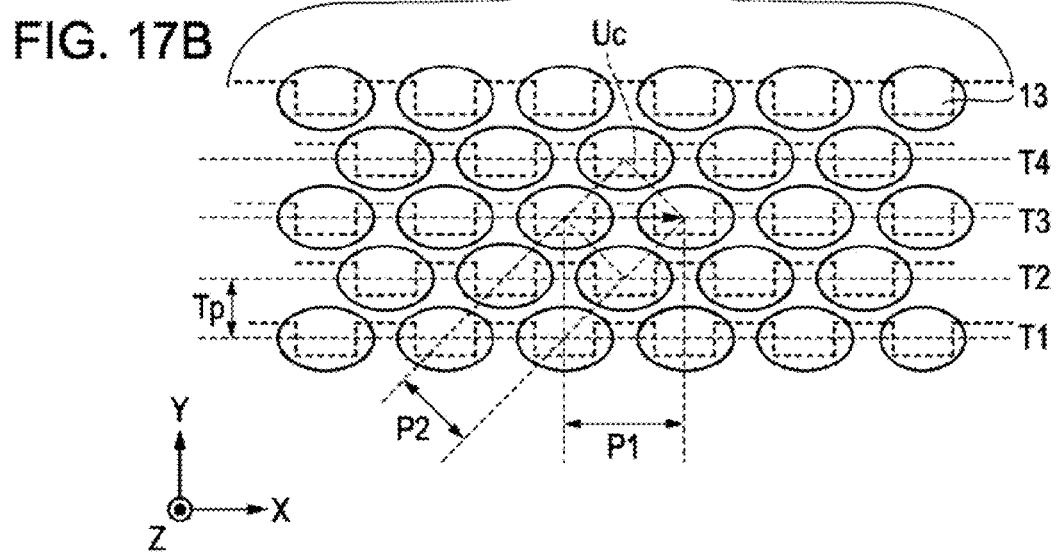

FIG. 17 shows an example of the configuration of a roll master for producing an optical element having the above-described configuration. This roll master is different from the master of the first embodiment in that concave structures 13 constitute a tetragonal lattice pattern or a quasi-tetragonal lattice pattern on the surface thereof Configuration of Roll Master A roll master exposing apparatus is used, the two-dimensional patterns are linked spatially, a polarity inversion formatter signal and a rotation controller of a recording apparatus are synchronized to generate a signal on a track basis, and patterning is performed at CAV with an appropriate feed pitch. Consequently, a tetragonal lattice pattern or a quasi-tetragonal lattice pattern can be recorded. It is preferable that a lattice pattern with a uniform spatial frequency is formed in a desired recording region on the resist on the stamper 12 through application of the laser light by setting the frequency of the polarity inversion formatter signal and the number of revolutions of the roll appropriately.

3. Third Embodiment

Configuration of Optical Element

Figure 18A:
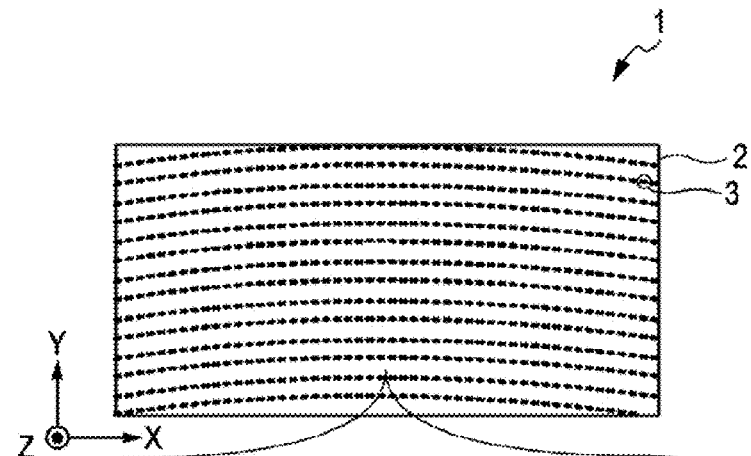
FIG. 18A is a schematic plan view showing an example of the configuration of an optical element according to a third embodiment.
Figure 18B:
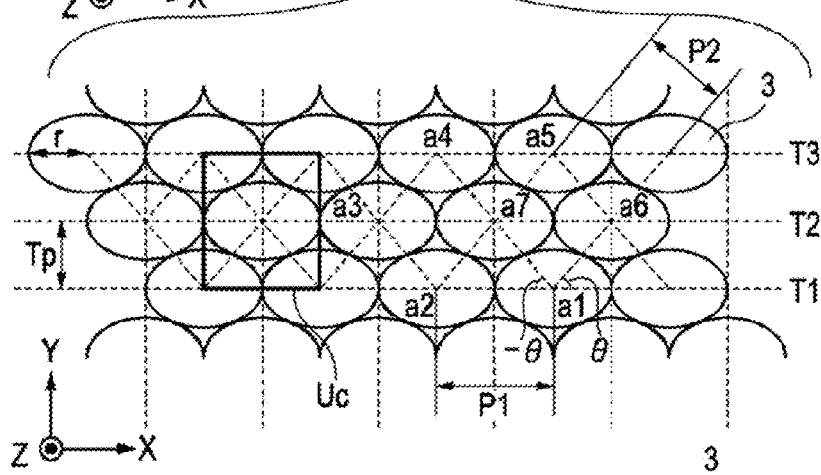
FIG. 18B is a magnified plan view illustrating a part of the optical element shown in FIG. 18A, FIG. 18 C is a sectional view along a track T1, T3, . . . shown in FIG. 18B, and FIG. 18 D is a sectional view along a track T2, T4, . . . shown in FIG. 18B.
Figure 18C:
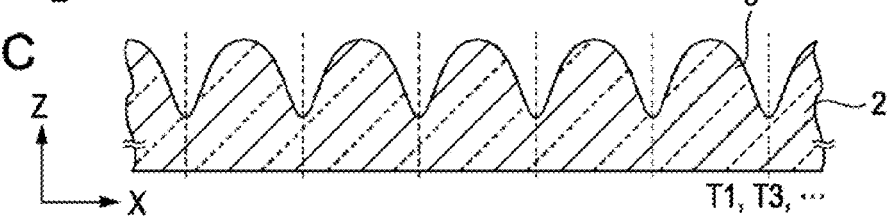
Figure 18D:
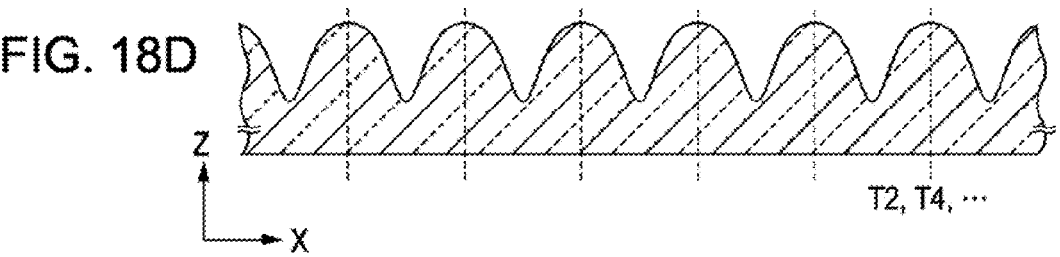

FIG. 18A is a schematic plan view showing an example of the configuration of an optical element according to a third embodiment. FIG. 18B is a magnified plan view illustrating a part of the optical element shown in FIG. 18A. FIG. 18C is a sectional view along a track T1, T3, . . . shown in FIG. 18B. FIG. 18D is a sectional view along a track T2, T4, . . . shown in FIG. 18B.

An optical element 1 according to the third embodiment is different from the optical element 1 of the first embodiment in that the track T has the shape of an arc and the structures 3 are arranged in the shape of an arc. As shown in FIG. 18B, regarding the adjacent three lines of tracks (T1 to T3), the structures 3 are arranged in such a way as to form a quasi-hexagonal lattice pattern, in which the centers of the structures 3 are located at individual points a1 to a7. Here, the quasi-hexagonal lattice pattern is different from the regular hexagonal lattice pattern and refers to a hexagonal lattice pattern distorted along the shape of an arc of the track T. Alternatively, it is different from the regular hexagonal lattice pattern and refers to a hexagonal lattice pattern distorted along the shape of an arc of the track T and, in addition, stretched in the extension direction of the track (X axis direction), so as to distort.

The configurations of the optical element 1 other than those described above are the same as the configurations in the first embodiment and, therefore, the explanations will be omitted.

Configuration of Disk Master

Figure 19A:
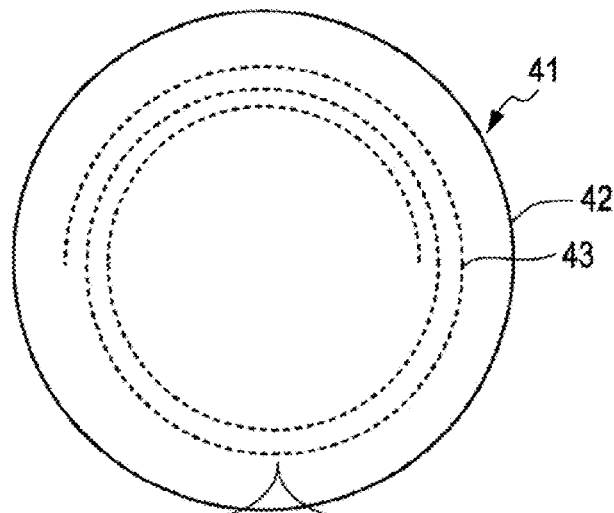
FIG. 19A is a plan view showing an example of the configuration of a disk master for producing an optical element and FIG. 19B is a magnified plan view illustrating a part of the disk master shown in FIG. 19A.
Figure 19B:
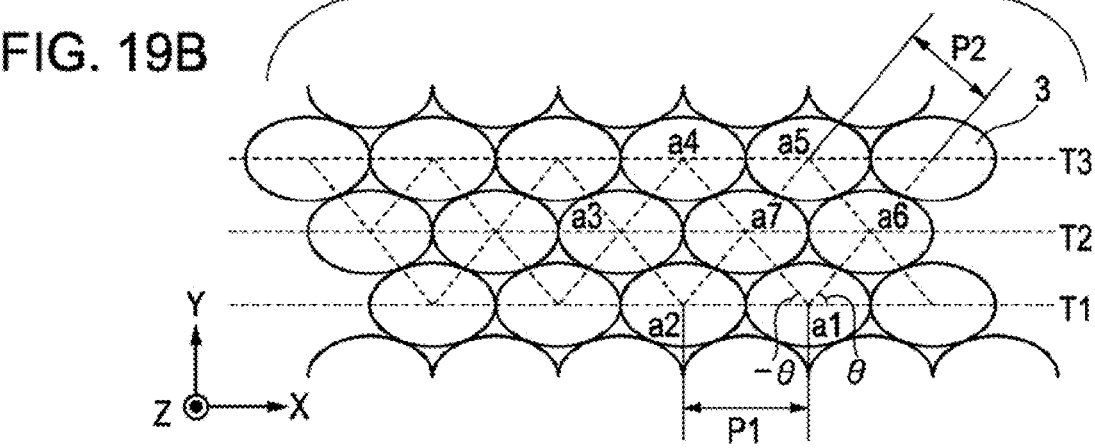

FIG. 19A and FIG. 19B show an example of the configuration of a disk master for producing an optical element having the above-described configuration. As shown in FIG. 19A and FIG. 19B, a disk master 41 has a configuration, in which structures 43 formed from concave portions are arranged in large numbers on the surface of a stamper 42 in the shape of a disk. These structures 43 are periodically two-dimensionally arranged with a pitch smaller than or equal to the wavelength band of the light in a use environment of the optical element 1, for example, with the same level of pitch as the wavelength of the visible light. The structures 43 are arranged on the track in the shape of concentric circles or the shape of a spiral.

The configurations of the disk master 41 other than those described above are the same as the configurations of the roll master 11 in the first embodiment and, therefore, the explanations will be omitted.

Method for Manufacturing Optical Element

Initially, an exposing apparatus for producing the disk master 41 having the above-described configuration will be described with reference to FIG. 20.

The moving optical table system 32 is provided with a beam expander 33, a mirror 38, and an objective lens 34. The laser light 15 led to the moving optical table system 32 is shaped into a desired beam shape with the beam expander 33 and, thereafter, is applied to the resist layer on the stamper 42 in the shape of a disk through the mirror 38 and the objective lens 34. The stamper 42 is placed on a turn table (not shown in the drawing) connected to a spindle motor 35. Then, the laser light is applied to the resist layer on the stamper 42 intermittently while the stamper 42 is rotated and, in addition, the laser light 15 is moved in the rotation radius direction of the stamper 42, so that an exposure step of the resist layer is performed. The formed latent image takes the shape of nearly an ellipse having a major axis in the circumferential direction. The movement of the laser light 15 is performed by movement of the moving optical table system 32 in the direction indicated by an arrow R.

The exposing apparatus shown in FIG. 20 is provided with a control mechanism 37 to form a latent image composed of the two-dimensional pattern of the hexagonal lattice or the quasi-hexagonal lattice shown in FIG. 18B on the resist layer. The control mechanism 37 is provided with a formatter 29 and a driver 30. The formatter 29 is provided with a polarity inversion portion. This polarity inversion portion controls the application timing of the laser light 15 to the resist layer. The driver 30 receives the output from the polarity inversion portion and controls the acoust-optic modulator 27.

The control mechanism 37 synchronizes the intensity modulation of the laser light 15 with the AOM 27, the driving rotation speed of the spindle motor 35, and the moving speed of the moving optical table system 32 with each other on a track basis. The stamper 42 is subjected to rotation control at a constant angular velocity (CAV). Then, patterning is performed at the appropriate number of revolutions of the stamper 42 with the spindle motor 35, appropriate frequency modulation of the laser intensity with the AOM 27, and an appropriate feed pitch of the laser light 15 with the moving optical table system 32. Consequently, a latent image of a hexagonal lattice pattern or a quasi-hexagonal lattice pattern is formed on the resist layer.

Furthermore, the control signal of the polarity inversion portion is changed gradually in such a way that the spatial frequency (which is a pattern density of a latent image, and P1: 330, P2: 300 nm, or P1: 315 nm, P2: 275 nm, or P1: 300 nm, P2: 265 nm) becomes uniform. More specifically, exposure is performed while an application period of the laser light 15 to the resist layer is changed on a track basis, and the frequency modulation of the laser light 15 is performed with the control mechanism 37 in such a way that P1 becomes about 330 nm (or 315 nm, 300 nm) in the individual tracks T. That is, modulation control is performed in such a way that the application period of the laser light is reduced as the track location moves away the center of the stamper 42 in the shape of a disk. Consequently, a nanopattern with a uniform special frequency is formed all over the substrate.

An example of a method for manufacturing an optical element according to the third embodiment will be described below.

Initially, a disk master 41 is produced in a manner similar to that in the first embodiment except that a resist layer formed on a stamper in the shape of a disk is exposed by using an exposure apparatus having the above-described configuration. Subsequently, this disk master 41 and a substrate 2, e.g., an acrylic sheet coated with an ultraviolet curable resin, are closely adhered, and ultraviolet rays are applied, so as to cure the ultraviolet curable resin. Thereafter, the substrate 2 is peeled off the disk master 41. In this manner, an optical element 1 in the shape of a disk is obtained, wherein a plurality of structures 3 are arranged on the surface. Then, an optical element 1 in the predetermined shape, e.g., a rectangle, is cut from this optical element 1 in the shape of a disk. Consequently, a desired optical element 1 is produced.

According to the present third embodiment, as in the case where the structures 3 are arranged in the shape of a straight line, an optical element 1 exhibiting high productivity and having an excellent antireflection characteristic is obtained.

4. Fourth Embodiment

Figure 21A:
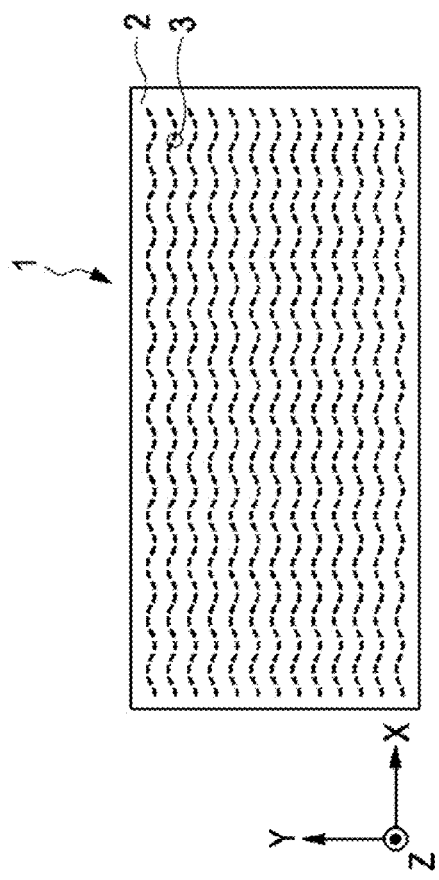
FIG. 21A is a schematic plan view showing an example of the configuration of an optical element according to a fourth embodiment and FIG. 21B is a magnified plan view illustrating a part of the optical element shown in FIG. 21A.
Figure 21B:
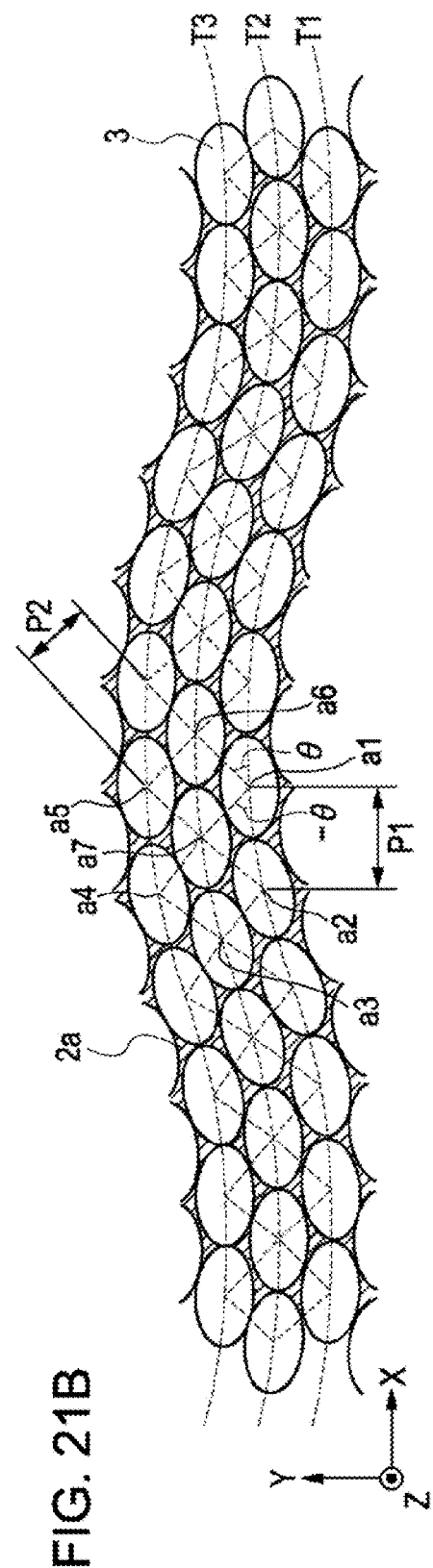

FIG. 21A is a schematic plan view showing an example of the configuration of an optical element according to a fourth embodiment. FIG. 21B is a magnified plan view illustrating a part of the optical element shown in FIG. 21A.

An optical element 1 according to the fourth embodiment is different from the optical element 1 of the first embodiment in that the structures 3 are arranged on a meandering track (hereafter referred to as a wobble track). It is preferable that wobbles of the individual tracks on the substrate 2 are synchronized. That is, it is preferable that the wobbles are synchronized wobbles. In the case where the wobbles are synchronized, the unit lattice shape of a hexagonal lattice or a quasi-hexagonal lattice is maintained and the filling factor is kept at a high level. Examples of waveforms of the wobble track include a sign wave and a triangular wave. The waveform of the wobble track is not limited to a periodic waveform, but may be an aperiodic waveform. For example, about ±10 μm is selected as the wobble amplitude of the wobble track.

Regarding the fourth embodiment, the items other than the above description are the same as those in the first embodiment.

According to the fourth embodiment, an occurrence of variations in outward appearance can be suppressed because the structures 3 are arranged on the wobble tracks.

5. Fifth Embodiment

Figure 22A:
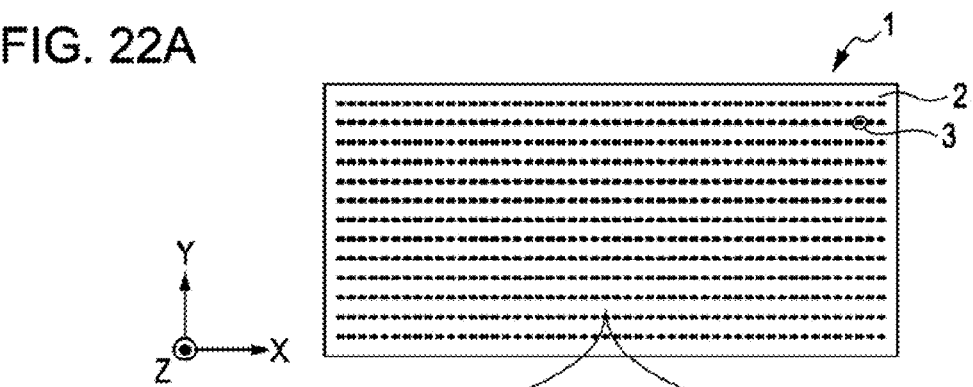
FIG. 22A is a schematic plan view showing an example of the configuration of an optical element according to a fifth embodiment.
Figure 22B:
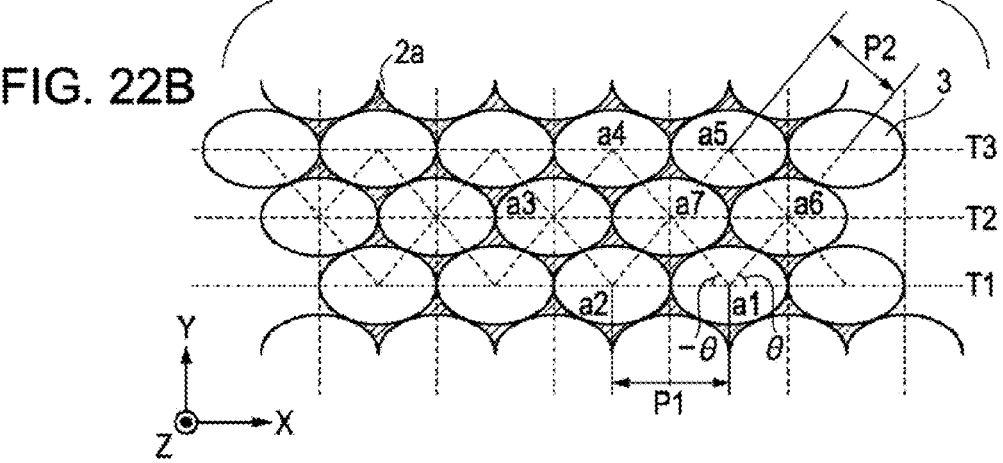
FIG. 22B is a magnified plan view illustrating a part of the optical element shown in FIG. 22A.
Figure 22C:
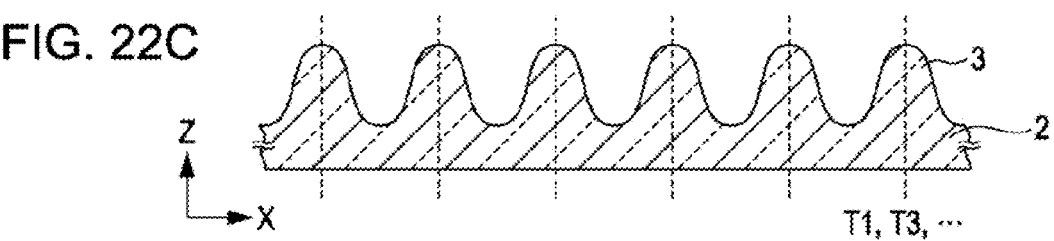
FIG. 22C is a sectional view along a track T1, T3, . . . shown in FIG. 22B.
Figure 22D:
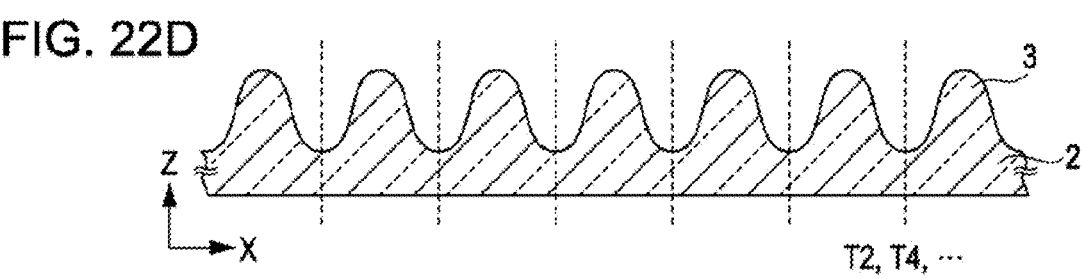
FIG. 22D is a sectional view along a track T2, T4, . . . shown in FIG. 22B.
Figure 23:
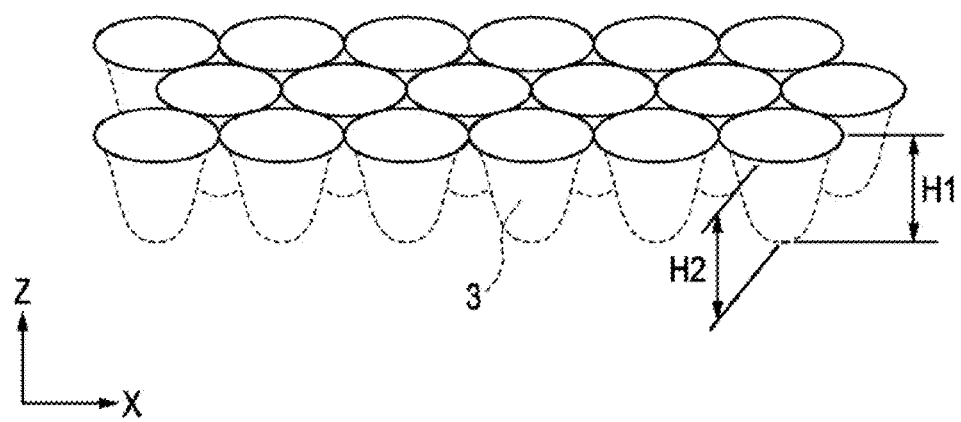
FIG. 23 is a magnified perspective view illustrating a part of the optical element shown in FIG. 22A.

FIG. 22A is a schematic plan view showing an example of the configuration of an optical element according to a fifth embodiment. FIG. 22B is a magnified plan view illustrating a part of the optical element shown in FIG. 22A. FIG. 22C is a sectional view along a track T1, T3, . . . shown in FIG. 22B. FIG. 22D is a sectional view along a track T2, T4, . . . shown in FIG. 22B. FIG. 23 is a magnified perspective view illustrating a part of the optical element shown in FIG. 22A.

An optical element 1 according to the fifth embodiment is different from the optical element 1 of the first embodiment in that structures 3 formed from concave portions are arranged in large numbers on the substrate surface. The shape of this structure 3 is a concave shape corresponding to inversion of the convex shape of the structure 3 in the first embodiment. In this regard, in the case where the structure 3 is specified to be a concave portion, as described above, the opening portion (inlet portion of the concave portion) of the structure 3 composed of the concave portion is defined as a lower portion and the lowermost portion (the deepest portion of the concave portion) of the substrate 2 in the depth direction is defined as a top portion. That is, the top portion and the lower portion are defined on the basis of the structure 3 composed of an unrealistic space. Furthermore, in the fifth embodiment, the structure 3 is a concave portion and, therefore, the height of the structure 3 in the formula (1) and the like is the depth H of the structure 3.

Regarding the present fifth embodiment, the items other than the above description are the same as those in the first embodiment.

In the present fifth embodiment, the convex shape of the structure 3 in the first embodiment is inverted, so as to form a concave shape. Consequently, the same effects as those in the first embodiment are obtained.

6. Sixth Embodiment

As the modulus of elasticity of the material forming the structure 3 is reduced, the sliding property during wiping tends to become poor and the wiping performance tends to be degraded. Therefore, in the sixth embodiment, at least one type of compound selected from fluorine based compounds and silicone based compounds is included in the structure surface and, thereby, the sliding property is improved, so as to improve the wiping performance.

The inclusion of these substances in the structure surface does not have an influence on whether fingerprints is wiped off, but suppress wetting and spreading of the fingerprints after the fingerprints are adhered. Consequently, antireflective structures 3 having an excellent antifouling property are made by maintaining the modulus of elasticity and the aspect ratio within a predetermined range and, in addition, increasing the contact angle of oleic acid.

Examples of methods for containing the fluorine based compound or the silicone based compound into the structure surface include a method, in which the fluorine based compound is added to a resin material for forming the structure and performing curing, and a method, in which a surface treated layer containing the fluorine based compound is formed on the structure surface after the structure is formed.

Figure 24:
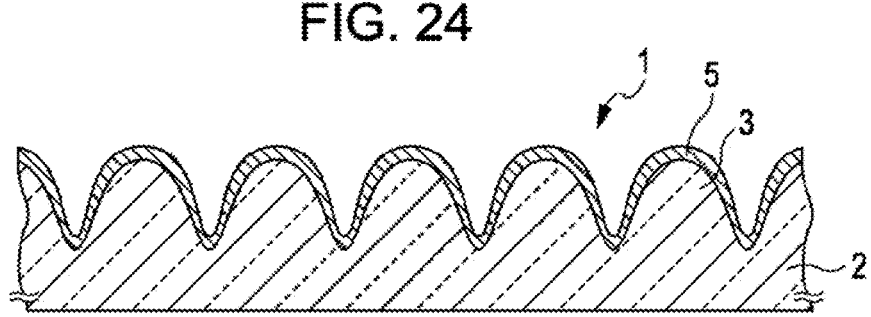
FIG. 24 is a sectional view showing an example of the configuration of an optical element according to a sixth embodiment.

FIG. 24 is a sectional view showing an example of the configuration of an optical element according to the sixth embodiment. As shown in FIG. 24, an optical element 1 according to the sixth embodiment is different from the optical element 1 of the first embodiment in that a surface treated layer 5 is further disposed on an uneven surface provided with the structures 3.

The oleic acid contact angle on the surface provided with the surface treated layer 5 is preferably 30 degrees or more, and more preferably 90 degrees or more. In the case where the contact angle is 90 degrees or more, wetting and spreading of stains, e.g., fingerprints, adhered to the optical element surface are suppressed. The surface treated layer 5 contains, for example, a fluorine-containing compound or a silicone based compound.

Silicone Based Compound

Examples of silicone based compounds include silicone oil and silicone surfactants. The silicone oil can be roughly divided into strait silicone oil and modified silicone oil depending on the type of organic group bonded to a silicon atom.

In the straight silicone oil, a methyl group, a phenyl group, or a hydrogen atom serving as a substituent is bonded to a silicon atom. Examples of the straight silicone oil include dimethyl silicone oil and methylphenyl silicone oil.

In the modified silicone oil, an organic substituent is introduced in the straight silicone oil, e.g., dimethyl silicone oil. The modified silicone oil is classified into non-reactive silicone oil and reactive silicone oil.

Non-reactive silicone oil include alkyl/aralkyl-modified silicone oil, polyether-modified silicone oil, higher fatty acid-modified silicone oil, amino-modified silicone oil, epoxy-modified silicone oil, carboxyl-modified silicone oil, and alcohol-modified silicone oil.

Examples of reactive silicone oil include amino-modified silicone oil, epoxy-modified silicone oil, carboxyl-modified silicone oil, and alcohol-modified silicone oil.

Specific examples of silicone oil include L-45, L-9300, FZ-3704, FZ-3703, FZ-3720, FZ-3786, FZ-3501, FZ-3504, FZ-3508, FZ-3705, FZ-3707, FZ-3710, FZ-3750, FZ-3760, FZ-3785, and Y-7499 of Nippon Unicar Company Limited and KF96L, KF96, KF96H, KF99, KF54, KF965, KF968, KF56, KF995, KF351, KF352, KF353, KF354, KF355, KF615, KF618, KF945, KF6004, and FL100 of Shin-Etsu Chemical Co., Ltd.

In the silicone surfactant, for example, a part of methyl groups of the silicone oil are substituted with hydrophilic groups. Examples of positions of substitution with the hydrophilic groups include a side chain, both ends, a single end, and both end side chains of the silicone oil. Examples of hydrophilic groups include polyethers, polyglycerins, pyrrolidone, betaines, sulfates, phosphates, and quaternary salts.

Among them, nonionic surfactants are preferable, in which the hydrophobic group is formed from dimethyl polysiloxane and the hydrophilic group is formed from polyoxyalkylene.

The nonionic surfactant is a generic name for surfactants having no group, which dissociates into ions in an aqueous solution, and having hydroxyl groups of polyhydric alcohols as the hydrophilic groups and, in addition, polyoxyalkylene chain (polyoxyethylene) and the like as the hydrophilic groups besides the hydrophobic groups. The hydrophilicity is enhanced as the number of alcoholic hydroxy groups increases or the length of the polyoxyalkylene chain (polyoxyethylene chain) increases.

Specific examples of these nonionic surfactants include silicone surfactants SILWET L-77, L-720, L-7001, L-7002, L-7604, Y-7006, FZ-2101, FZ-2104, FZ-2105, FZ-2110, FZ-2118, FZ-2120, FZ-2122, FZ-2123, FZ-2130, FZ-2154, FZ-2161, FZ-2162, FZ-2163, FZ-2164, FZ-2166, FZ-2191, and the like produced by Nippon Unicar Company Limited. Furthermore, SUPERSILWET SS-2801, SS-2802, SS-2803, SS-2804, SS-2805, and the like are included. Moreover, silicone surfactants ABN SILWET FZ-2203, FZ-2207, FZ-2208, and the like produced by Nippon Unicar Company Limited are included.

Fluorine-Containing Compound

As for the fluorine-containing compound, fluorine based resins are mentioned. Examples of fluorine based resins include alkoxysilane compounds having a perfluoropolyether group or a fluoroalkyl group.

The alkoxysilane compound having a perfluoropolyether group or a fluoroalkyl group has low surface energy, so as to exhibit an excellent antifouling-water-repellent effect and a lubricating effect is exhibited because the perfluoropolyether group is included.

Examples of alkoxysilane compounds having a perfluoropolyether group include alkoxysilane compounds having a perfluoropolyether group, represented by the following formula (1) or (2).

$$(R^3O)_3Si-R^2-R^1CO-Rf-COR^1-R^2-Si(OR^3)_3 \qquad (1)$$

where, in the formula, Rf represents a perfluoropolyether group, $R^1$ represents a divalent atom or group (for example, any one of O, NH, and S), $R^2$ represents a hydrocarbon group (for example, an alkylene group), and $R^3$ represents an alkyl group.

$$RfCOR^1-R^2-Si(OR^3)_3 \qquad (2)$$

where, in the formula, Rf represents a perfluoropolyether group, $R^1$ represents any one of O, NH, and S, $R^2$ represents an alkylene group, and $R^3$ represents an alkyl group.

Examples of alkoxysilane compounds having a fluoroalkyl group include alkoxysilane compounds having a fluoroalkyl group, represented by the following formula (3) or (4).

$$Rf-R^1-R^2-Si(OR^3)_3 \qquad (3)$$

where, in the formula, Rf' represents a fluoroalkyl group, $R^1$ represents a divalent atom or atomic group, $R^2$ represents an alkylene group, and $R^3$ represents an alkyl group.

$$Rf-R^1-Si-(OR^2)_3 \qquad (4)$$

where, in the formula, Rf represents a fluoroalkyl group, $R^1$ represents an alkyl group having the carbon number of less than 7, and $R^2$ represents an alkyl group.

In this regard, the molecular structure of the perfluoropolyether group as Rf shown in the general formula (1) is not specifically limited, and perfluoropolyether groups having various chain lengths are included. However, the groups having the molecular structure described below are preferable.

$$—CF_2—(OC_2F_4)_p—(OCF_2)_q—OCF_2— \qquad (5)$$

Among the perfluoropolyether groups represented by the general formula (5), it is preferable that p and q are within the range of 1 to 50.

The molecular weight of the alkoxysilane compound having a perfluoropolyether group represented by the general formula (5) is not specifically limited. However, from the viewpoint of the stability, ease of handling, and the like, the compounds having a number average molecular weight of 400 to 10,000 are used preferably, and the compounds having a number average molecular weight of 500 to 4,000 are used more preferably.

In the alkoxysilane compounds having a perfluoropolyether group represented by the general formula (5), $R^1$ represents a divalent atom or group and is a group bonding $R^2$ and the perfluoropolyether group, although not specifically limited. However, an atom or an atomic group, e.g., O, NH, or S, other than C is preferable. It is preferable that $R^2$ represents a hydrocarbon group and the carbon number is within the range of 2 to 10. Examples of $R^2$ include alkylene groups, e.g., a methylene group, an ethylene group, and a propylene group, and a phenylene group.

In the alkoxysilane compounds having a perfluoropolyether group represented by the general formula (5), R3 represents an alkyl group constituting an alkoxy group. The carbon number is usually 3 or less, that is, examples thereof include an isopropyl group, a propyl group, an ethyl group, and a methyl group, although the carbon number may be larger than or equal to this.

In this regard, the molecular structure of the perfluoropolyether group as Rf shown in the general formula (2) is not specifically limited, and perfluoropolyether groups having various chain lengths are included. However, the groups having the molecular structure described below are preferable.

Examples of Rf include those, in which hydrogen atoms of an alkyl group are substituted with fluorine atoms and which are represented by the following Chemical formulae (6) to (8). However, all hydrogen atoms of the alkyl group is not necessarily substituted with fluorine atoms, and hydrogen may be included partly.

$$F(CF_2CF_2CF_2)_n— \qquad (6)$$

where n represents an integer of 1 or more.

$$CF_3(OCF(CF_3)CF_2)_m(OCF_2)_l— \qquad (7)$$

where l and m are independently an integer of 1 or more.

$$F—(CF(CF_3)CF_2)_k— \qquad (8)$$

where k represents an integer of 1 or more.

In this regard, in the compound (8), it is preferable that m/l is within the range of 0.5 to 2.0.

The molecular weight of the alkoxysilane compound having a perfluoropolyether group is not specifically limited. However, from the viewpoint of the stability, ease of handling, and the like, the compound having a number average molecular weight of 400 to 10,000 is used preferably, and the compound having a number average molecular weight of 500 to 4,000 is used more preferably.

The molecular structure of the fluoroalkyl group as Rf is not specifically limited as well. Examples thereof include those, in which hydrogen atoms of an alkyl group are substituted with fluorine atoms, and fluoroalkyl groups having various chain lengths and various degrees of substitution with fluorine are included. However, those having the molecular structure described below are preferable.

$$F(CF_2)_s(CH_2)_t \qquad (9)$$

$$—(CH_2)_t(CF_2)_s(CH_2)_t— \qquad (10)$$

in these formulae, s represents an integer of 6 to 12, and t represents an integer of 20 or less.

(Method for Forming Surface-Treated Layer)

Examples of methods for forming the surface-treated layer include a method, in which a solution prepared by dissolving a silicon based compound and a fluorine-containing compound into a solvent is applied by a gravure coater, a dipping method, a spin coating method, or spraying and a method, in which a solution prepared by dissolving a silicon based compound and a fluorine-containing compound into a solvent is applied by rubbing and, thereafter, drying is performed. Furthermore, an LB method, a PVD method, a CVD method, a self-organization method, a sputtering method, and the like are mentioned. Moreover, a method, in which a silicone based compound and a fluorine-containing compound are mixed with an ultraviolet curable resin, application is performed and, thereafter, curing is performed through UV irradiation, and the like are mentioned.

7. Seventh Embodiment

Figure 29:
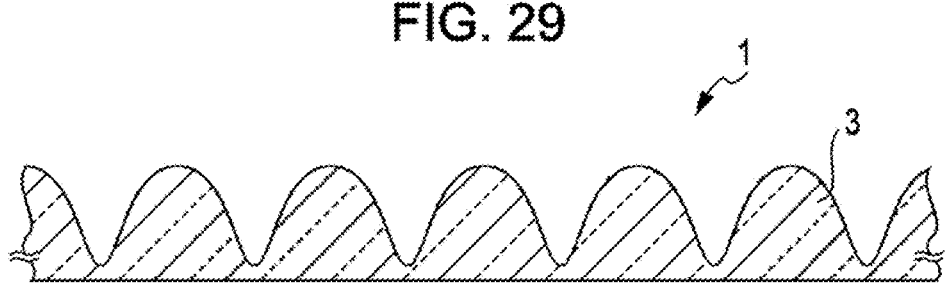
FIG. 29 is a sectional view showing an example of the configuration of an optical element according to a seventh embodiment.

FIG. 29 shows an example of the configuration of an optical element according to a seventh embodiment. As shown in FIG. 29, this optical element 1 is different from the optical element 1 of the first embodiment in that the substrate 2 is not provided. The optical element 1 is provided with structures 3 formed from convex portions and arranged in large numbers on a surface with a minute pitch smaller than or equal to the wavelength of the visible light, wherein lower portions of the adjacent structures are mutually joined. A plurality of structures, in which lower portions are mutually joined, may have the shape of a mesh as a whole.

According to the seventh embodiment, the optical element 1 can be stuck to an adherend without an adhesive. Furthermore, it is also possible to stick to a three-dimensionally curved surface.

8. Eighth Embodiment

Configuration of Liquid Crystal Display Device

Figure 25:
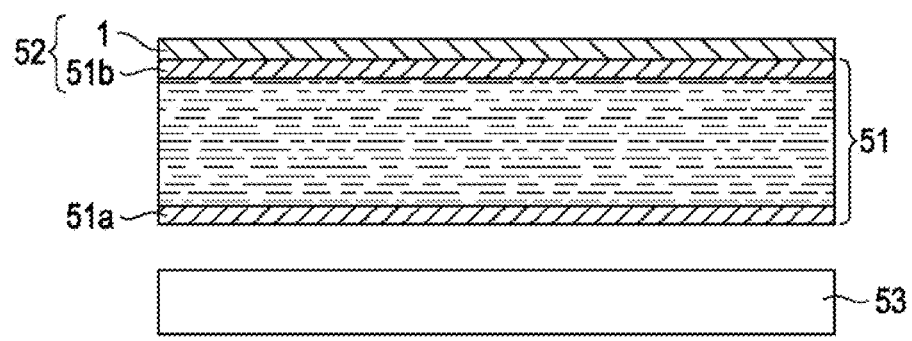
FIG. 25 shows an example of the configuration of a liquid crystal display device according to an eighth embodiment.

FIG. 25 shows an example of the configuration of a liquid crystal display device according to an eighth embodiment. As shown in FIG. 25, this liquid crystal display device is provided with a backlight 53 to emit light and a liquid crystal panel 51 to temporally spatially modulate the light emitted from the backlight 53 and display an image. Polarizers 51a and 51b serving as optical components are disposed on two surfaces of the liquid crystal panel 51, respectively. An optical element 1 is provided on the polarizer 51b disposed on the display surface side of the liquid crystal panel 51. Here, the polarizer 51b provided with the optical element 1 on one principal surface is referred to as a polarizer 52 with antireflection function. This polarizer 52 with antireflection function is an example of optical components with antireflection function.

The backlight 53, the liquid crystal panel 51, the polarizers 51a and 51b, and the optical element 1, which constitute the liquid crystal display device, will be sequentially described below.

(Backlight)

As for the backlight 53, for example, a direct backlight, an edge backlight, and a plane light source type backlight are used. The backlight 53 is provided with, for example, a light source, a reflection plate, and an optical film. As for the light source, for example, a cold cathode fluorescent lamp (CCFL), a hot cathode fluorescent lamp (HCFL), organic electroluminescence (OEL), inorganic electroluminescence (IEL), and a light emitting diode (LED) are used.

(Liquid Crystal Panel)

As for the liquid crystal panel 51, those having a display mode of, for example, twisted nematic (TN) mode, super twisted nematic (STN) mode, vertically aligned (VA) mode, in-plane switching (IPS) mode, optically compensated birefringence (OCB) mode, ferroelectric liquid crystal (FLC) mode, polymer dispersed liquid crystal (PDLC) mode, and phase change guest host (PCGH) mode are used.

(Polarizer)

On two surfaces of the liquid crystal panel 51, for example, polarizers 51a and 51b are disposed in such a way that transmission axes thereof become orthogonal to each other. The polarizers 51a and 51b transmit merely one of orthogonal polarized components in the incident light and interrupt the other through absorption. As for the polarizers 51a and 51b, for example, those produced by adsorbing dichroic materials, e.g., iodine or dichroic dyes, to hydrophilic polymer films, e.g., polyvinyl alcohol based films, partially formalized polyvinyl alcohol based films, and ethylene-vinyl acetate copolymer based partially saponified films, and performing uniaxial stretching are used. It is preferable that protective layers, e.g., triacetyl cellulose (TAC) films, are disposed on both surfaces of the polarizers 51a and 51b. In the case where the protective layer is disposed, as described above, it is preferable that a configuration, in which the substrate 2 of the optical element 1 doubles as a protective layer, is employed. The reason is that the thickness of a polarizer 52 with antireflection function is reduced by employing such a configuration.

(Optical Element)

The optical element 1 is the same as any one of the optical element 1 in the above-described first to fourth embodiments and, therefore, the explanation will be omitted.

According to the eighth embodiment, the optical element 1 is disposed on the display surface of the liquid crystal display device and, therefore, the antireflection function of the display surface of the liquid crystal display device is improved. Consequently, the visibility of the liquid crystal display device is improved.

9. Ninth Embodiment

Configuration of Liquid Crystal Display Device

Figure 26:
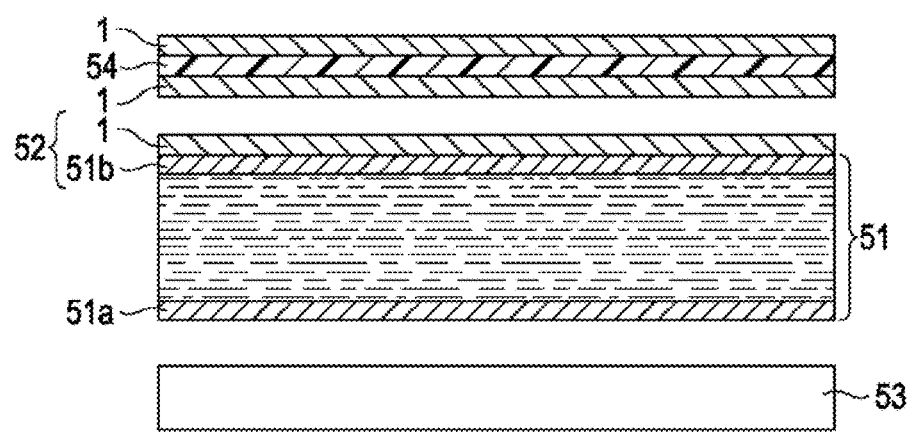
FIG. 26 shows an example of the configuration of a liquid crystal display device according to a ninth embodiment.

FIG. 26 shows an example of the configuration of a liquid crystal display device according to a ninth embodiment. This liquid crystal display device is different from the liquid crystal display device in the eighth embodiment in that a front member 54 is provided on the front side of a liquid crystal panel 51 and an optical element 1 is provided on at least one surface of the front of the liquid crystal panel 51 and the front and the back of the front member 54. In FIG. 26, an example, in which optical elements 1 are provided on all surfaces of the front of the liquid crystal panel 51 and the front and the back of the front member 54, is shown. For example, an air layer is disposed between the liquid crystal panel 51 and the front member 54. The same portions as those in the above-described eighth embodiment are indicated by the same reference numerals as those set forth above and explanations thereof will be omitted. In this regard, in the present application, the front refers to the surface on the side serving as a display surface, that is, the surface on the observer side, and the back refers to the surface on the side opposite to the display surface.

The front member 54 is, for example, a front panel used on the front (observer side) of the liquid crystal panel 51 for the purpose of mechanical, thermal, and weather-resistant protection and design. The front member 54 has, for example, the shape of a sheet, the shape of a film, or the shape of a plate. As for the materials for the front member 54, for example, glass, triacetyl cellulose (TAC), polyester (TPEE), polyethylene terephthalate (PET), polyimide (PI), polyamide (PA), aramid, polyethylene (PE), polyacrylate, polyether sulfone, polysulfone, polypropylene (PP), diacetyl cellulose, polyvinyl chloride, acrylic resin (PMMA), and polycarbonate (PC) are used, although not specifically limited to these materials. Any material can be used insofar as the material has transparency.

According to the ninth embodiment, the visibility of the liquid crystal display device is improved as in the eighth embodiment.

10. Tenth Embodiment

An optical element 1 according to a tenth embodiment is different from the optical element 1 of the first embodiment in that both a substrate 2 and structure 3 have flexibility. The modulus of elasticity of the material forming the structure 3 is 1 MPa or more, and 1,200 MPa or less, as described in the first embodiment. The substrate 2 has, for example, a single-layer structure or a multilayer structure including two layers or more.

The elongation percentage of the material forming the structures 3 is within the range of preferably 50% or more, and more preferably 50% or more, and 150% or less. If the elongation percentage is 50% or more, breakage of the structures 3 due to deformation of resin along with adhesion or contact does not occur and, therefore, a change in reflectance before and after wiping can be suppressed. In this regard, as the elongation percentage of the material forming the structures 3 increases, the sliding property during wiping tends to become poor and the wiping performance tends to be degraded. However, if the elongation percentage is 150% or less, degradation of the sliding property of the surface is suppressed easily.

The elongation percentage of the material forming the substrate 2 is within the range of preferably 20% or more, and more preferably 20% or more, and 800% or less. If the elongation percentage is 20% or more, plastic deformation is restrained. If the elongation percentage is 800% or less, the material can be selected relatively easily. For example, in the case of an urethane film, a non-yellowing grade is selected.

Figure 30A:
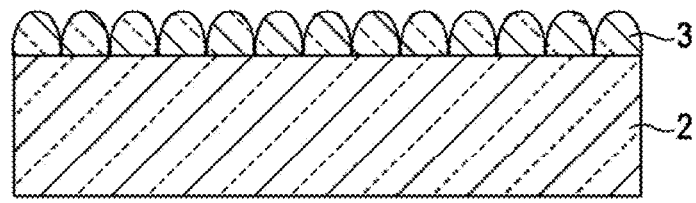
FIG. 30A is a sectional view showing a first example of an optical element according to a tenth embodiment.

FIG. 30A is a sectional view showing a first example of an optical element 1 according to the tenth embodiment. The optical element 1 is provided with structures 3 and a substrate 2 molded individually, and an interface is formed therebetween. Therefore, the materials forming the substrate 2 and the structures 3 can be different materials, as necessary. That is, the substrate 2 and the structures 3 can have different moduli of elasticity.

In the case where the substrate 2 has a single-layer configuration, the modulus of elasticity of the material forming the substrate 2 is within the range of preferably 1 MPa or more, and 3,000 MPa or less, more preferably 1 MPa or more, and 1,500 MPa or less, and further preferably 1 MPa or more, and 1,200 MPa or less. If the modulus of elasticity is less than 1 MPa, in general, a resin having a low modulus of elasticity is characterized by significant surface stickiness and, therefore, is not easy to handle. On the other hand, if the modulus of elasticity is 3,000 MPa or less, an occurrence of plastic deformation is suppressed and hardly visually recognized. Furthermore, it is preferable that the elongation percentages of the materials forming the substrate 2 and the structures 3 are allowed to agree or almost agree with each other. This is because peeling at the interface between the substrate 2 and the structures 3 can be suppressed. Here, the term "almost agree" of the elongation percentage refers to that a difference in modulus of elasticity between the materials forming the substrate 2 and the structures 3 is within the range of ±25%. Here, the moduli of elasticity of the substrate 2 and the structures 3 do not necessarily agree with each other. The moduli of elasticity of the two may be set at different values within the bounds of satisfying the above-described numerical range.

In the case where the modulus of elasticity of the material forming the substrate 2 is within the range of 1 MPa or more, and 3,000 MPa or less, the thickness of the substrate 2 is within the range of preferably 60 μm or more, and more preferably 60 μm or more, and 2,000 μm or less. If the thickness is 60 μm or more, occurrences of plastic deformation and cohesion failure are suppressed and hardly visually recognized. On the other hand, if the thickness is 2,000 μm or less, continuous transfer is performed by a roll-to-roll process.

Figure 30B:
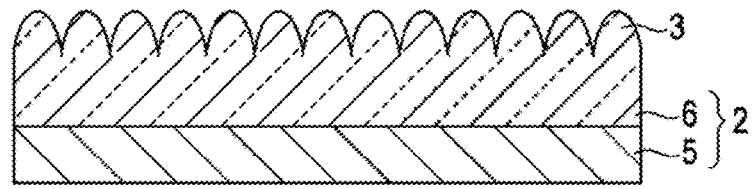
FIG. 30B is a sectional view showing a second example of the optical element according to the tenth embodiment.

FIG. 30B is a sectional view showing a second example of the optical element according to the tenth embodiment. The optical element 1 is provided with a substrate 2 having a two-layer structure composed of a base layer 6 disposed adjoining the structures 3 and a base member 5 disposed adjoining the base layer 6. The base layer 6 is, for example, a layer integrally molded with the structures 3 on the bottom side of the structures 3, and an interface is formed between the base layer 6 and the base member 5. As for the material for the base member 5, it is preferable that a material having stretchability and, in addition, elasticity is used. Examples of such materials include polyurethanes, transparent silicone resins, and polyvinyl chlorides. In this regard, the material for the base member 5 is not limited to transparent materials, but black or other color materials can also be used. Examples of the shapes of the base member 5 include the shape of a sheet, the shape of a plate, and the shape of a block, although not specifically limited to these shapes. Here, it is defined that the sheets include films.

The modulus of elasticity of the material forming the base layer 6 is within the range of preferably 1 MPa or more, and 3,000 MPa or less, more preferably 1 MPa or more, and 1,500 MPa or less, and further preferably 1 MPa or more, and 1,200 MPa or less. In the case where the structures 3 and the base layer 6 are transferred at the same time, if the modulus of elasticity is less than 1 MPa, in a transfer step, adjacent structures are adhered to each other, the shape of the structures 3 becomes a shape different from the desired shape and, therefore, a desired reflection characteristic is not obtained. Furthermore, the sliding property during wiping tends to become poor and the wiping performance tends to be degraded. On the other hand, if the modulus of elasticity is 3,000 MPa or less, an occurrence of plastic deformation is suppressed and hardly visually recognized.

In the case where the moduli of elasticity of the materials forming the base member 5 and the base layer 6 are within the range of 1 MPa or more, and 3,000 MPa or less, the total thickness of the base member 5 and the base layer 6 is within the range of preferably 60 μm or more, and more preferably 60 μm or more, and 2,000 μm or less. If the total thickness is 60 μm or more, occurrences of plastic deformation and cohesion failure are suppressed and hardly visually recognized. On the other hand, if the total thickness is 2,000 μm or less, continuous transfer can be performed by a roll-to-roll process. Here, the moduli of elasticity of the structures 3, the base member 5, and the base layer 6 do not necessarily agree with each other. The moduli of elasticity of them may be set at different values within the bounds of satisfying the above-described numerical range.

In the case where the modulus of elasticity of the material forming the base layer 6 is within the range of 1 MPa or more, and 3,000 MPa or less, whereas the modulus of elasticity of the material forming the base member 5 is out of the range of 1 MPa or more, and 3,000 MPa or less, the thickness of the base layer 6 is within the range of preferably 60 μm or more, and more preferably 60 μm or more, and 2,000 μm or less. If the thickness is 60 μm or more, occurrences of plastic deformation and cohesion failure are suppressed and hardly visually recognized regardless of the material for the base member 5, that is, the modulus of elasticity of the base member 5. On the other hand, if the thickness is 2,000 μm or less, an ultraviolet curable resin is cured efficiently.

Figure 30C:
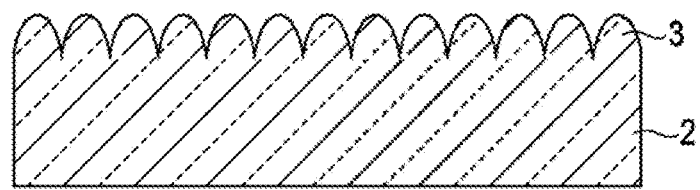
FIG. 30C is a sectional view showing a third example of the optical element according to the tenth embodiment.

FIG. 30C is a sectional view showing a third example of the optical element 1 according to the tenth embodiment. The optical element 1 is provided with integrally molded structures 3 and substrate 2. Since the structures 3 and the substrate 2 are integrally molded, as described above, no interface is present between the two.

The modulus of elasticity of the material forming the substrate 2 is within the range of preferably 1 MPa or more, and 3,000 MPa or less, more preferably 1 MPa or more, and 1,500 MPa or less, and further preferably 1 MPa or more, and 1,200 MPa or less. In the case where the structures 3 and the substrate 2 are transferred at the same time, if the modulus of elasticity is less than 1 MPa, in a transfer step, adjacent structures are adhered to each other, the shape of the structures 3 becomes a shape different from the desired shape and, therefore, a desired reflection characteristic is not obtained. Furthermore, the sliding property during wiping tends to become poor and the wiping performance tends to be degraded. On the other hand, if the modulus of elasticity is 3,000 MPa or less, an occurrence of plastic deformation is suppressed and hardly visually recognized.

In the case where the structures 3 and the substrate 2 are integrally molded, it is preferable that the moduli of elasticity of the materials for the two are set at the same value, specifically the same value within the range of 1 MPa or more, and 1,200 MPa or less from the viewpoint of facilitating production. It is also possible to integrally mold the structures 3 and the substrate 2 while the moduli of elasticity of the two are different values. Examples of methods for forming the above-described optical element 1 include the following method. That is, multilayer application of resins having different moduli of elasticity is performed. At this time, it is desirable that the resin has a high viscosity, and specifically, 50,000 mPa·s or more is preferable. This is because mixing of resins is at a low level and, thereby, gradation of the Young's modulus is obtained.

In the case where the modulus of elasticity of the material forming the substrate 2 is within the range of 1 MPa or more, and 3,000 MPa or less, the thickness of the substrate 2 is within the range of preferably 60 μm or more, and more preferably 60 μm or more, and 2,000 μm or less. If the thickness is 60 μm or more, occurrences of plastic deformation and cohesion failure are suppressed and hardly visually recognized. On the other hand, if the thickness is 2,000 μm or less, an ultraviolet curable resin is cured efficiently.

FIG. 31A to FIG. 32C are schematic diagrams for explaining differences in action between a flexible optical element and a nonflexible optical element from the viewpoint of plastic deformation. Here, the flexible optical element refers to an optical element in which both the structures 3 and the substrate 2 have the flexibility. The nonflexible optical element refers to an optical element in which the structures 3 have the flexibility, whereas the substrate 2 has no flexibility.

Figure 31A:
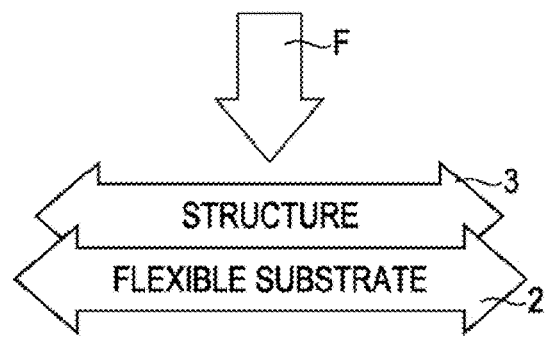
FIG. 31A to FIG. 31C are schematic diagrams for explaining the action of a flexible optical element.
Figure 31B:
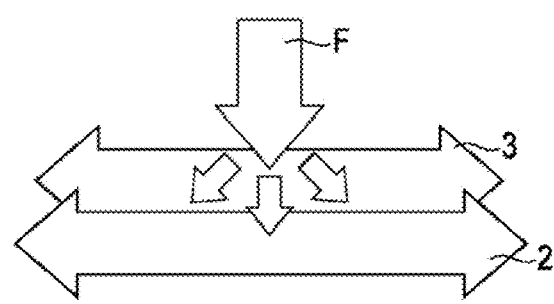
Figure 31C:
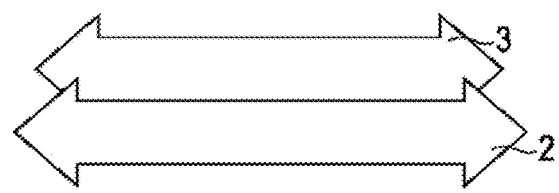

As shown in FIG. 31A, when a force F is applied to a surface of the flexible optical element, since the substrate 2 has the flexibility, the force F applied to the surface of the flexible optical element is distributed, as shown in FIG. 31B. Consequently, as shown in FIG. 31C, when the force F is released, the surface of the flexible optical element returns to the original flat state.

Figure 32A:
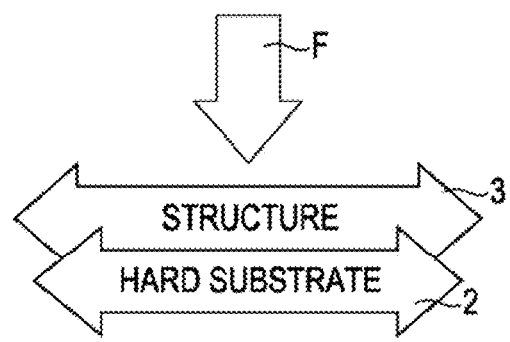
FIG. 32A to FIG. 32C are schematic diagrams for explaining the action of a nonflexible optical element.
Figure 32B:
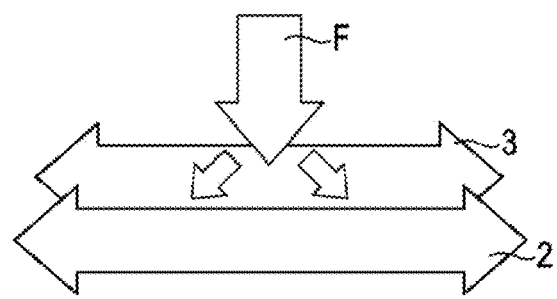
Figure 32C:
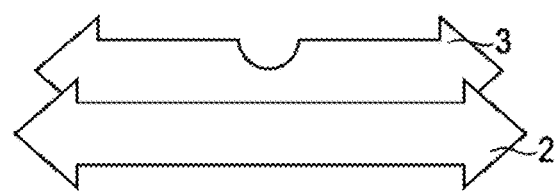

On the other hand, as shown in FIG. 32A, when a force F is applied to a surface of the nonflexible optical element, since the substrate 2 is hard, the force F applied to the surface of the nonflexible optical element is not distributed, as shown in FIG. 32B. Consequently, as shown in FIG. 32C, when the force F is released, plastic deformation or cohesion failure occurs on the surface of the flexible optical element.

EXAMPLES

The present application will be specifically described below with reference to the examples, although the present application is not limited to merely these examples.

(Sample 1-1)

Initially, a glass roll stamper having an outside diameter of 126 mm was prepared. A film of a resist was formed on the surface of this glass stamper in a manner as described below. That is, a photoresist was diluted by a factor of 10 with a thinner. A resist film having a thickness of about 130 nm was formed by applying the resulting diluted resist to a circular column surface of the glass roll stamper through dipping. Subsequently, the glass stamper serving as a recording medium was carried to the roll stamper exposing apparatus shown in FIG. 11, the resist was exposed and, thereby, latent images, which were aligned in the shape of a spiral and which constituted a quasi-hexagonal lattice pattern between adjacent three lines of tracks, were patterned on the resist.

Specifically, laser light with a power of 0.50 mW/m to expose up to the surface of the above-described glass roll stamper was applied to a region to be provided with a hexagonal lattice pattern, so that a quasi-hexagonal lattice pattern in the concave shape was formed. In this regard, the resist thickness in the direction of lines of the tracks was about 120 nm and the resist thickness in the extension direction of the track was about 100 nm.

Subsequently, the resist on the glass roll stamper was subjected to a developing treatment, in which development was performed by dissolving the exposed portion of the resist. Specifically, an undeveloped glass roll stamper was placed on a turn table of a developing machine, although not shown in the drawing, a developing solution was dropped on the surface of the glass roll stamper while rotation was performed on a turn table basis, so as to develop the resist on the surface. In this manner, a resist glass stamper, in which the resist layer had openings in the quasi-hexagonal lattice pattern, was obtained.

Then, an etching treatment and an ashing treatment were performed alternately through dry etching, so that concave portions in the shape of an elliptical cone were obtained. The amount of etching (depth) with the pattern at this time was changed on the basis of the etching time. Finally, the photoresist was removed completely through O2 ashing and, thereby, a moth-eye glass roll master with a quasi-hexagonal lattice pattern in the concave shape was obtained. The depth of the concave portion in the direction of lines was larger than the depth of the concave portion in the extension direction of the track.

The above-described moth-eye glass roll master and a polymethyl methacrylate resin (PMMA) sheet coated with a few micrometers in thickness of ultraviolet curable resin composition having the following composition were closely adhered, and an optical element was produced by performing peeling while ultraviolet rays were applied, so as to cure.

Next, the surface provided with the moth-eye pattern of the optical element was dip coated with a fluorine based treating agent (trade name OPTOOL DSX produced by DAIKIN CHEMICALS SALES. LTD.), so as to perform a fluorine treatment. In this manner, the optical element of Sample 1-1 was produced.

Ultraviolet Curable Resin Composition

| | |
|---|---|
| polyester acrylate oligomer (trade name CN2271E produced by Sartomer Company, Inc.) | 80 parts by mass |
| low viscosity monoacrylate oligomer (trade name CN152 produced by Sartomer Company, Inc.) | 20 parts by mass |
| photopolymerization initiator (trade name DAROCUR1173 produced by Ciba Specialty Chemicals) | 4 percent by weight |

(Sample 1-2)

A quasi-hexagonal lattice pattern having a pitch and an aspect ratio different from those of Sample 1-1 was recorded on a resist layer by patterning a resist layer while the frequency of the polarity inversion formatter signal, the number of revolutions of the roll, and the appropriate feed pitch were adjusted on a track basis. An optical element of Sample 1-2 was produced in a manner similar to that in Sample 1-1 except those described above.

(Sample 1-3)

A quasi-hexagonal lattice pattern having a pitch and an aspect ratio different from those of Sample 1-1 was recorded on a resist layer by patterning a resist layer while the frequency of the polarity inversion formatter signal, the number of revolutions of the roll, and the appropriate feed pitch were adjusted on a track basis. An optical element was produced in a manner similar to that in Sample 1-1 except those described above.

(Sample 2-1 to Sample 2-3)

Optical elements of Sample 2-1 to Sample 2-3 were produced in a manner similar to that in Sample 1-1 to Sample 1-3, respectively, except that an ultraviolet curable resin composition having the following composition was used.

Ultraviolet Curable Resin Composition

| polyester acrylate oligomer (trade name CN2271E produced by Sartomer Company, Inc.) | 30 parts by mass |
|---|---|
| difunctional acrylate (trade name Viscoat310HP produced by OSAKA ORGANIC CHEMICAL INDUSTRY LTD.) | 70 parts by mass |
| photopolymerization initiator (trade name DAROCUR1173 produced by Ciba Specialty Chemicals) | 4 percent by weight |

(Sample 3-1 to Sample 3-3)

Optical elements of Sample 3-1 to Sample 3-3 were produced in a manner similar to that in Sample 1-1 to Sample 1-3, respectively, except that an ultraviolet curable resin composition having the following composition was used.

Ultraviolet Curable Resin Composition

| polyester acrylate oligomer (trade name CN2271E produced by Sartomer Company, Inc.) | 15 parts by mass |
|---|---|
| difunctional acrylate (trade name Viscoat310HP produced by OSAKA ORGANIC CHEMICAL INDUSTRY LTD.) | 85 parts by mass |
| photopolymerization initiator (trade name DAROCUR1173 produced by Ciba Specialty Chemicals) | 4 percent by weight |

(Sample 4-1 to Sample 4-3)

Optical elements of Sample 4-1 to Sample 4-3 were produced in a manner similar to that in Sample 1-1 to Sample 1-3, respectively, except that an ultraviolet curable resin composition having the following composition was used.

Ultraviolet Curable Resin Composition

| polyester acrylate oligomer (trade name CN2271E produced by Sartomer Company, Inc.) | 5 parts by mass |
|---|---|
| difunctional acrylate (trade name Viscoat310HP produced by OSAKA ORGANIC CHEMICAL INDUSTRY LTD.) | 95 parts by mass |
| photopolymerization initiator (trade name DAROCUR1173 produced by Ciba Specialty Chemicals) | 4 percent by weight |

(Sample 5-1 to Sample 5-3)

Optical elements of Sample 5-1 to Sample 5-3 were produced in a manner similar to that in Sample 1-1 to Sample 1-3, respectively, except that an ultraviolet curable resin composition having the following composition was used.

Ultraviolet Curable Resin Composition

| difunctional acrylate (trade name Viscoat310HP produced by OSAKA ORGANIC CHEMICAL INDUSTRY LTD.) | 80 parts by mass |
|---|---|
| pentafunctional urethane acrylate (trade name UA510H produced by Kyoeisha Chemical Co., Ltd.) | 20 parts by mass |
| photopolymerization initiator (trade name DAROCUR1173 produced by Ciba Specialty Chemicals) | 4 percent by weight |

(Sample 6-1 to Sample 6-3)

Optical elements of Sample 6-1 to Sample 6-3 were produced in a manner similar to that in Sample 1-1 to Sample 1-3, respectively, except that the step to subject the surface provided with the moth-eye pattern of the optical element to the fluorine treatment was omitted.

(Evaluation of Shape)

The resulting optical elements of Sample 1-1 to Sample 6-3 were observed with an atomic force microscope (AFM). Then, the pitch and the aspect ratio of the structures of each Sample were determined from the sectional profile of ATM. The results thereof are shown in Table 1.

(Measurement of Contact Angle)

The contact angle of the surface provided with the moth-eye pattern of the optical element was measured with a contact angle meter (product name CA-XE Model produced by KYOWA INTERFACE SCIENCE CO., LTD.). As for the liquid to measure the contact angle, oleic acid was used.

(Evaluation of Wiping Performance)

After fingerprints were adhered to the surface provided with the moth-eye pattern of the optical element, COTTON CIEGAL (produced by Chiyoda Seisi K.K.) was used, and 10 reciprocating motions of dry cloth wiping was performed at a pressure of about 18 kPa for 5 seconds. The wiping performance was evaluated by comparing the reflectance before the fingerprints were adhered and the reflectance after the dry cloth wiping was performed. In the case where the reflectance before the fingerprints were adhered and that after the dry cloth wiping was performed were the same value, it was assumed to be that dry cloth wiping was performed. In this regard, in Table 1, a mark ○ indicates that dry cloth wiping is possible, and a mark x indicates that dry cloth wiping is not possible. Regarding the reflectance, an evaluation apparatus (trade name V-550 produced by JASCO Corporation) was used, and the reflectance of the visible light with a wavelength of 532 nm was measured. The results thereof are shown in Table 1.

(Measurement of Modulus of Elasticity)

(Measurement with Tensile Tester)

A flat film was produced (UV-cured) from the same material as that for the ultraviolet curable resin composition used for producing the optical element. A film sample in the shape of 14 mm in width, 50 mm in length, and about 200 µm in thickness was cut and used. The modulus of elasticity of the resulting film sample was measured on the basis of JIS K7127 by using a tensile tester (trade name AG-X produced by SHIMADZU CORPORATION). The results thereof are shown in Table 1.

Furthermore, the modulus of elasticity of the optical element provided with the moth-eye pattern was measured by using a surface coating property tester (FISCHERSCOPE HM-500: produced by Fischer Instruments K.K.). As a result, the value of the modulus of elasticity measured with a microhardness tester and the value of the modulus of elasticity, which was measured by using a tensile tester and which was inherent to the material, were nearly equal.

TABLE 1

| | Shape | | | Modulus of elasticity [MPa] | Fluorine coating | Oleic acid contact angle [degree] | Wiping performance | | | |
|---|---|---|---|---|---|---|---|---|---|---|
| | | | | | | | Reflectance | | | |
| | Arrangement of structure | Pitch [nm] | Aspect ratio | | | | Before adhesion of finger-prints | After wiping of finger-prints | Judge | Remarks |
| Sample 1-1 | q-hexa* | 300 | 0.33 | 29 | present | 105 | 1.9 | 1.9 | ○ | easy to slide, |
| Sample 1-2 | q-hexa* | 280 | 0.61 | | present | 123 | 0.2 | 0.2 | ○ | easy to wipe |
| Sample 1-3 | q-hexa* | 250 | 1.20 | | present | 127 | 0.5 | 0.5 | ○ | |
| Sample 2-1 | q-hexa* | 300 | 0.33 | 188 | present | 104 | 1.9 | 1.9 | ○ | — |
| Sample 2-2 | q-hexa* | 280 | 0.61 | | present | 120 | 0.2 | 0.2 | ○ | |
| Sample 2-3 | q-hexa* | 250 | 1.20 | | present | 122 | 0.5 | 0.5 | ○ | |
| Sample 3-1 | q-hexa* | 300 | 0.33 | 535 | present | 85 | 1.9 | 2.7 | X | — |
| Sample 3-2 | q-hexa* | 280 | 0.61 | | present | 105 | 0.2 | 0.2 | ○ | |
| Sample 3-3 | q-hexa* | 250 | 1.20 | | present | 114 | 0.5 | 0.5 | ○ | |
| Sample 4-1 | q-hexa* | 300 | 0.33 | 1140 | present | 75 | 1.9 | 3.1 | X | — |
| Sample 4-2 | q-hexa* | 280 | 0.61 | | present | 90 | 0.2 | 0.2 | ○ | |
| Sample 4-3 | q-hexa* | 250 | 1.20 | | present | 107 | 0.5 | 0.5 | ○ | |
| Sample 5-1 | q-hexa* | 300 | 0.33 | 1920 | present | 93 | 1.9 | 2.9 | X | — |
| Sample 5-2 | q-hexa* | 280 | 0.61 | | present | 104 | 0.2 | 2.7 | X | |
| Sample 5-3 | q-hexa* | 250 | 1.20 | | present | 107 | 0.5 | 2.6 | X | |
| Sample 6-1 | q-hexa* | 300 | 0.33 | 29 | none | 15 | 1.9 | 1.9 | ○ | not easy to slide, |
| Sample 6-2 | q-hexa* | 280 | 0.61 | | none | 15 | 0.2 | 0.2 | ○ | not easy to wipe. |
| Sample 6-3 | q-hexa* | 250 | 1.20 | | none | 12 | 0.5 | 0.5 | ○ | sink and spread* | q-hexa*: quasi-hexagonal lattice
sink and spread*: if fingerprints are adhered, sinking and spreading from the place of adhesion of fingerprints occurs to a large extent.

Evaluation

As shown in Table 1, regarding Sample 5-1 to Sample 5-3, dry cloth wiping was difficult in the evaluation of the wiping performance. This is because the moduli of elasticity of the optical elements are out of the range of 5 MPa to 1,200 MPa.

Furthermore, according to comparisons between Sample 1-1 to Sample 1-3 and Sample 6-1 to Sample 6-3, in the evaluation of the wiping performance, regarding Sample 1-1 to Sample 1-3, COTTON CIEGAL slid easily and fingerprints were wiped off easily. On the other hand, regarding Sample 6-1 to Sample 6-3, COTTON CIEGAL did not slide easily and if fingerprints were adhered, fingerprints sank and spread from the place of adhesion of the fingerprints to a large extent. This is because regarding Sample 1-1 to Sample 1-3, the surface provided with the moth-eye pattern of the optical element was subjected to fluorine coating and regarding Sample 6-1 to Sample 6-3, fluorine coating was not performed.

Next, the relationship between the ratio $((2r/P1) \times 100)$ and the antireflection characteristic was examined on the basis of the rigorous coupled wave analysis (RCWA) simulation.

Test Example 1

Figure 27A:
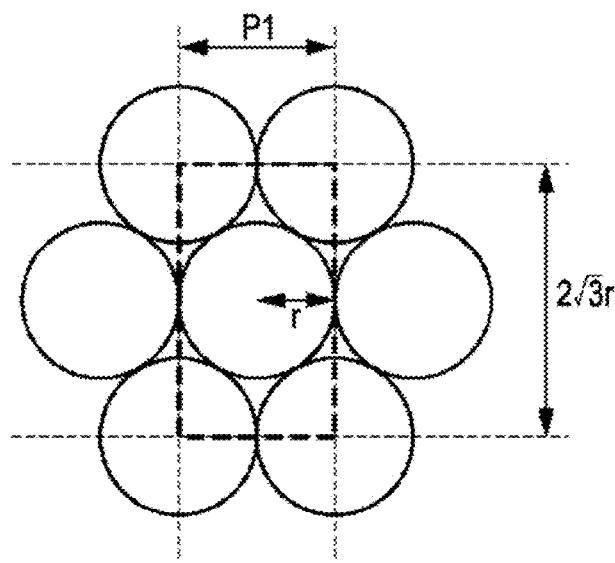
FIG. 27A is a diagram for explaining the filling factor in the case where structures are arranged in the shape of a hexagonal lattice and FIG. 27B is a diagram for explaining the filling factor in the case where structures are arranged in the shape of a tetragonal lattice.

FIG. 27A is a diagram for explaining the filling factor in the case where structures are arranged in the shape of a hexagonal lattice. As shown in FIG. 27A, in the case where structures are arranged in the shape of a hexagonal lattice, the filling factor was determined on the basis of the following formula (2), while the ratio $((2r/P1) \times 100)$ (where, P1: the arrangement pitch of structures in the same track, r: the radius of the structure bottom) was changed.

filling factor = $(S(\text{hex.})/S(\text{unit})) \times 100$ unit lattice area: $S(\text{unit}) = 2r \times (2\sqrt{3})r$ area of bottom of structure present in unit lattice:
$S(\text{hex.}) = 2 \times \pi r^2$ (2)

(where when 2r>P1, determination is performed on the basis of the construction.)

For example, in the case where arrangement pitch P1=2 and structure bottom radius r=1, S(unit), S(hex.), the ratio $((2r/P1) \times 100)$, and the filling factor become the values as described below.

S(unit) = 6.9282
S(hex.) = 6.28319

$(2r/P1) \times 100 = 100.0\%$ filling factor = $(S(\text{hex.})/S(\text{unit})) \times 100 = 90.7\%$ The relationship between the filling factor determined on the basis of the above-described formula (2) and the ratio $((2r/P1) \times 100)$ is shown in Table 2.

TABLE 2

| $(2r/P1) \times 100$ | Filling factor |
|---|---|
| 115.4% | 100.0% |
| 100.0% | 90.7% |
| 99.0% | 88.9% |
| 95.0% | 81.8% |
| 90.0% | 73.5% |
| 85.0% | 65.5% |
| 80.0% | 58.0% |
| 75.0% | 51.0% |

Test Example 2

Figure 27B:
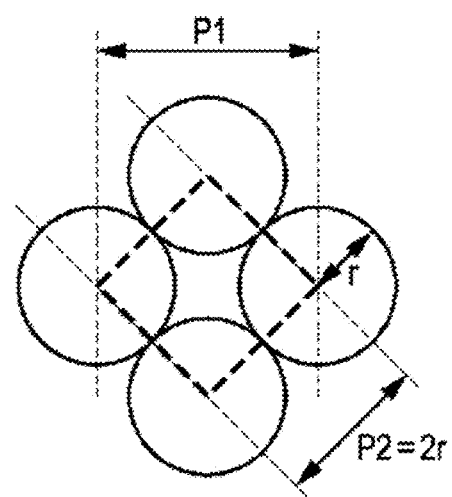

FIG. 27B is a diagram for explaining the filling factor in the case where structures are arranged in the shape of a tetragonal lattice. As shown in FIG. 27B, in the case where structures are arranged in the shape of a tetragonal lattice, the filling factor was determined on the basis of the following formula (3) while the ratio $((2r/P1) \times 100)$ and the ratio $((2r/P2) \times 100)$, (where, P1: the arrangement pitch of structures in the same track, P2: the arrangement pitch in a 45 degree direction relative to the track, r: the radius of the structure bottom) were changed.

filling factor = $(S(\text{tetra.})/S(\text{unit})) \times 100$ unit lattice area: $S(\text{unit}) = 2r \times 2r$ area of bottom of structure present in unit lattice:

$$S(\text{tetra}) = \pi r^2 \quad (3)$$

(where when 2r>P1, determination is performed on the basis of the construction.)

For example, in the case where arrangement pitch P2=2 and structure bottom radius r=1, S(unit), S(tetra), the ratio ((2r/P1)×100), the ratio ((2r/P2)×100), and the filling factor become the values as described below.

S(unit)=4
S(tetra)=3.14159

(2r/P1)×100=141.4%

(2r/P2)×100=100.0% filling factor=(S(tetra)/S(unit))×100=78.5%

The relationship between the filling factor determined on the basis of the above-described formula (3), the ratio ((2r/P1)×100), and the ratio ((2r/P2)×100) is shown in Table 3.

Furthermore, the relationship between the arrangement pitches P1 and P2 of the tetragonal lattice is represented by P1=√2×P2.

TABLE 3

| (2r/P1) × 100 | (2r/P2) × 100 | Filling factor |
|---|---|---|
| 100.0% | 141.4% | 100.0% |
| 84.9% | 120.0% | 95.1% |
| 81.3% | 115.0% | 92.4% |
| 77.8% | 110.0% | 88.9% |
| 74.2% | 105.0% | 84.4% |
| 70.7% | 100.0% | 78.5% |
| 70.0% | 99.0% | 77.0% |
| 67.2% | 95.0% | 70.9% |
| 63.6% | 90.0% | 63.6% |
| 60.1% | 85.0% | 56.7% |
| 56.6% | 80.0% | 50.3% |
| 53.0% | 75.0% | 44.2% |

Test Example 3

Figure 28:
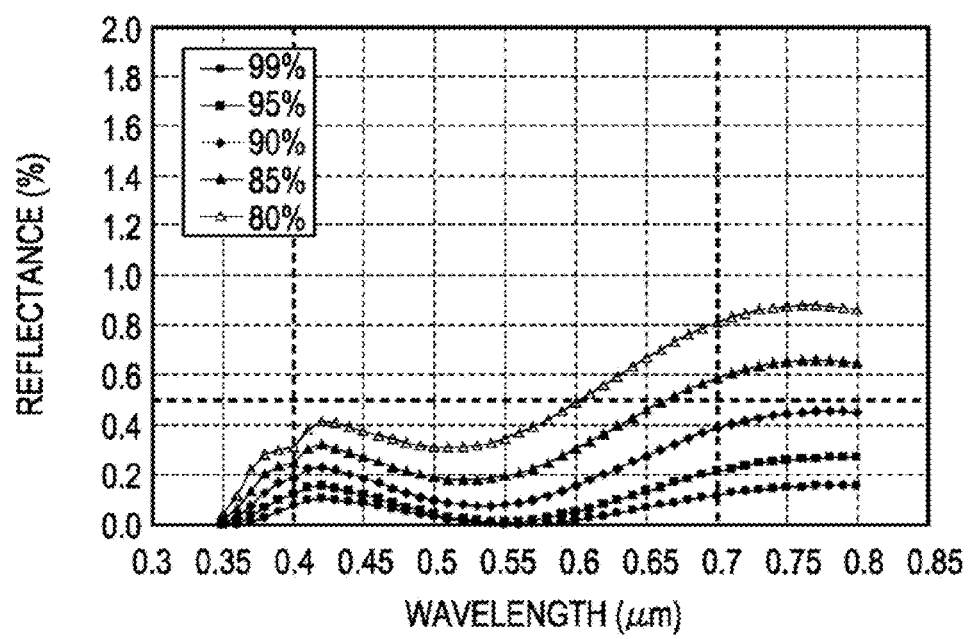
FIG. 28 is a graph showing the simulation result in Test examples 3.

The magnitude of the ratio ((2r/P1)×100) of the diameter 2r of the structure bottom to the arrangement pitch P1 was specified to be 80%, 85%, 90%, 95%, and 99% and the reflectance was determined on the basis of the simulation under the following condition. FIG. 28 shows a graph of the results thereof.

Structure shape: temple bell type
Polarization: unpolarized
Reflectance: 1.48
Arrangement pitch P1: 320 nm
Height of structure: 415 nm
Aspect ratio: 1.30
Arrangement of structures: hexagonal lattice As is clear from FIG. 28, in the case where the ratio ((2r/P1)×100) is 85% or more, in the wavelength range (0.4 to 0.7 μm) of the visible range, the average reflectance R becomes R<0.5%, and a sufficient antireflection effect is obtained. The filling factor of the bottom at this time is 65% or more. Furthermore, in the case where the ratio ((2r/P1)×100) is 90% or more, in the wavelength range of the visible range, the average reflectance R becomes R<0.3%, and a higher performance antireflection effect is obtained. The filling factor of the bottom at this time is 73% or more, and the performance becomes higher as the filling factor becomes higher, where the upper limit is 100%. In the case where the structures are mutually overlapped, the height of the structure is assumed to be the height from the lowest position. In this regard, it was ascertained that there was the same tendency regarding the filling factor and the reflectance of the tetragonal lattice.

Regarding the following samples, the thickness of the substrate, the base member, or the base layer was measured as described below.

The optical element was cut, a photograph of the cross-section was taken with a scanning electron microscope (SEM), and the thickness of the substrate, the base member, or the base layer was measured on the basis of the resulting SEM photograph.

Regarding the following samples, the modulus of elasticity of the substrate, the base member, or the base layer was measured as described below.

A dumbbell-shaped test piece (effective sample width 5 mm) specified in JIS K7311 was prepared, and a measurement was performed with a universal testing machine Autograph AG-5kNX produced by SHIMADZU CORPORATION. As for a small sample, from which the above-described sample is not obtained, it is also possible to perform the measurement by using a microhardness tester, for example, PICODENTOR HM-500 produced by Fischer Instruments K.K. Moreover, as for a still smaller sample, the measurement may be performed with AFM (refer to "Koubunshi Nano Zairyou (Polymer Nano-Material)" issued by KYORITSU SHUPPAN CO., LTD., P.81-P.111).

(Sample 7-1)

Initially, a glass roll stamper having an outside diameter of 126 mm was prepared. A film of a resist was formed on the surface of this glass stamper in a manner as described below. That is, a photoresist was diluted by a factor of 10 with a thinner. A resist film having a thickness of about 130 nm was formed by applying the resulting diluted resist to a circular column surface of the glass roll stamper through dipping. Subsequently, the glass stamper serving as a recording medium was carried to the roll stamper exposing apparatus shown in FIG. 11, the resist was exposed and, thereby, latent images, which were aligned in the shape of a spiral and which constituted a quasi-hexagonal lattice pattern between adjacent three lines of tracks, were patterned on the resist.

Specifically, laser light with a power of 0.50 mW/m to expose up to the surface of the above-described glass roll stamper was applied to a region to be provided with a hexagonal lattice pattern, so that a quasi-hexagonal lattice pattern in the concave shape was formed. In this regard, the resist thickness in the direction of lines of the tracks was about 120 nm and the resist thickness in the extension direction of the track was about 100 nm.

Subsequently, the resist on the glass roll stamper was subjected to a developing treatment, in which development was performed by dissolving the exposed portion of the resist. Specifically, an undeveloped glass roll stamper was placed on a turn table of a developing machine, although not shown in the drawing, a developing solution was dropped on the surface of the glass roll stamper while rotation was performed on a turn table basis, so as to develop the resist on the surface. In this manner, a resist glass stamper, in which the resist layer had openings in the quasi-hexagonal lattice pattern, was obtained.

Then, an etching treatment and an ashing treatment were performed alternately through dry etching, so that concave portions in the shape of an elliptical cone were obtained. The amount of etching (depth) with the pattern at this time was changed on the basis of the etching time. Finally, the photoresist was removed completely through O2 ashing and, thereby, a moth-eye glass roll master with a quasi-hexagonal lattice pattern in the concave shape was obtained. The depth of the concave portion in the direction of lines was larger than the depth of the concave portion in the extension direction of the track.

Next, an urethane film (produced by Sheedom Co., Ltd.) having a thickness of 400 μm was prepared as the base member. The modulus of elasticity of a resin forming this urethane film was 10 MPa. Subsequently, an ultraviolet curable resin composition having the following composition and having a thickness of a few micrometers was applied to the urethane film. Thereafter, a moth-eye glass roll master was closely adhered to the resulting coated surface, and an optical element was produced by performing peeling while ultraviolet rays were applied to cure. At this time, 20 nm of base layer was formed between the structure and the urethane film by adjusting the pressure of the moth-eye glass roll master against the coated surface. The modulus of elasticity of the resin forming the base layer after curing was 20 MPa.

Ultraviolet Curable Resin Composition

| | |
|---|---|
| polyester acrylate oligomer (trade name CN2271E produced by Sartomer Company, Inc.) | 80 parts by mass |
| low viscosity monoacrylate oligomer (trade name CN152 produced by Sartomer Company, Inc.) | 20 parts by mass |
| photopolymerization initiator (trade name DAROCUR1173 produced by Ciba Specialty Chemicals) | 4 percent by weight |

Then, a fluorine treatment were performed by dip-coating the surface provided with the moth-eye pattern of the optical element with a fluorine based treating agent (trade name OPTOOL DSX produced by Daikin Industries, Ltd.). In this manner, an optical element of Sample 7-1 having the following configuration was produced.

Moth-eye configuration
Arrangement of structure: quasi-hexagonal lattice
Height: 250
Pitch: 250
Aspect ratio: 1

(Sample 7-2)
An optical element of Sample 7-2 was produced in a manner similar to that in Sample 7-1 except that a base layer having a thickness of 60 μm was formed between the structure and the urethane film by adjusting the pressure of the moth-eye glass roll master against the coated surface of the urethane film.

(Sample 7-3)
An optical element of Sample 7-3 was produced in a manner similar to that in Sample 7-1 except that a base layer having a thickness of 120 μm was formed between the structure and the urethane film by adjusting the pressure of the moth-eye glass roll master against the coated surface of the urethane film.

(Sample 7-4)
An optical element of Sample 7-4 was produced in a manner similar to that in Sample 7-1 except that a base layer having a thickness of 150 μm was formed between the structure and the urethane film by adjusting the pressure of the moth-eye glass roll master against the coated surface of the urethane film.

(Sample 8-1)
An optical element of Sample 8-1 was produced in a manner similar to that in Sample 7-1 except that the thickness of the urethane film was specified to be 20 μm.

(Sample 8-2)
An optical element of Sample 8-2 was produced in a manner similar to that in Sample 8-1 except that the thickness of the urethane film was specified to be 40 μm.

(Sample 8-3)
An optical element of Sample 8-3 was produced in a manner similar to that in Sample 8-1 except that the thickness of the urethane film was specified to be 80 μm.

(Sample 8-4)
An optical element of Sample 8-4 was produced in a manner similar to that in Sample 8-1 except that the thickness of the urethane film was specified to be 120 μm.

(Sample 8-5)
An optical element of Sample 8-5 was produced in a manner similar to that in Sample 8-1 except that the thickness of the urethane film was specified to be 200 μm.

(Sample 8-6)
An optical element of Sample 8-6 was produced in a manner similar to that in Sample 8-1 except that the thickness of the urethane film was specified to be 400 μm.

Figure 33A:
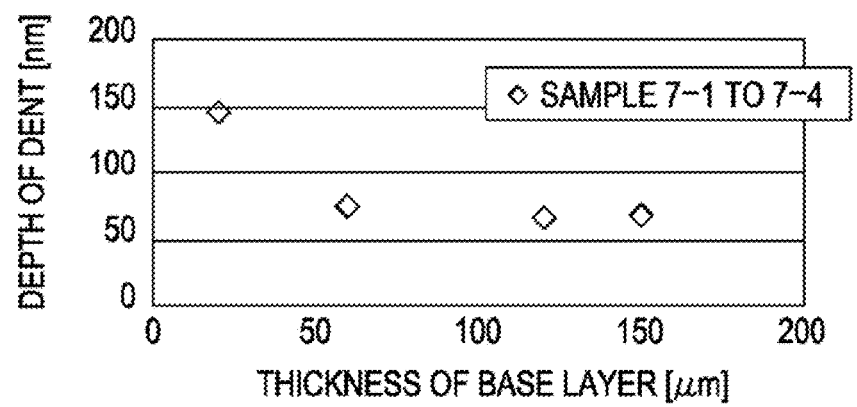
FIG. 33A is a graph showing the results of a scratch test of optical elements of Samples 7-1 to 7-4.
Figure 33B:
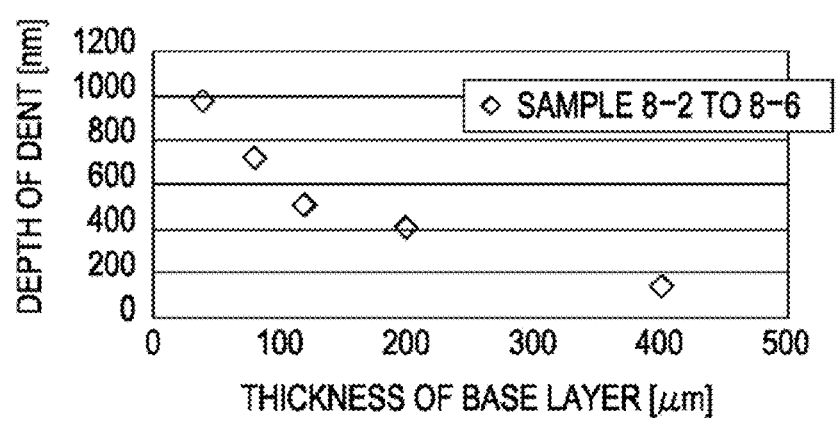
FIG. 33B is a graph showing the results of a scratch test of optical elements of Samples 8-2 to 8-6.

(Scratch Test)
Initially, regarding the resulting Samples 7-1 to 7-4 and 8-1 to 8-6, a scratch test was performed by the testing method on the basis of JIS K5600-5-4. Specifically, HAND PUSH PENCIL SCRATCH HARDNESS TESTER (trade name: No. 553-S produced by YASUDA SEIKI SEISAKUSHO, LTD.) was used, and a sample surface was scratched with a 2H pencil. Subsequently, a trace drawn with the pencil was wiped with a soft cloth so as to remove a powder of the pencil. Thereafter, the sample surface was observed visually. Then, the depth of plastic deformation was measured with a fine shape measuring apparatus (trade name Alpha-Step 500 produced by KLA-Tencor Japan Ltd.). The results thereof are shown in Table 4, Table 5, FIG. 33A, and FIG. 33B. In this regard, a symbol "⊙", a symbol "○", and a symbol "x" in columns "Plastic deformation" and "Cohesion failure" in Table 4 and Table 5 indicate the following evaluation results.

Plastic Deformation
⊙: The depth of plastic deformation is 0 nm or more, and less than 350 nm, there is no change in reflection performance, and no dent is observed visually.
○: The depth of plastic deformation is 350 nm or more, and less than 1,000 nm, there is no change in reflection performance, and almost no dent is observed visually.
x: The depth of plastic deformation is 1,000 nm or more, the reflection performance is degraded, and a dent is clearly visually observed.

(Cohesion Failure)
⊙: There is no change in reflection performance, and scratch and peeling are not visually observed at all.
○: There is no change in reflection performance, and scratch and peeling are hardly visually observed.
x: The reflection performance is degraded, and scratch and peeling are clearly visually observed.

Table 4 shows the results of the scratch test of Samples 7-1 to 7-4.

TABLE 4

| | | Sample 7-1 | Sample 7-2 | Sample 7-3 | Sample 7-4 |
|---|---|---|---|---|---|
| Element configuration | Thickness of base member (μm) | 400 | 400 | 400 | 400 |
| | Thickness of base layer (μm) | 20 | 60 | 120 | 150 |
| Evaluation | Depth of dent (nm) | 145 | 75 | 65 | 68 |
| | Plastic deformation | ⊙ | ⊙ | ⊙ | ⊙ |
| | Cohesion failure | ⊙ | ⊙ | ⊙ | ⊙ |

Table 5 shows the results of the scratch test of Samples 8-1 to 8-6. In this regard, the depth of dent of plastic deformation of Sample 8-1 was out of the measurement range and, therefore, the measurement value is not described.

TABLE 5

|  |  | Sample 8-1 | Sample 8-2 | Sample 8-3 | Sample 8-4 | Sample 8-5 | Sample 8-6 |
|---|---|---|---|---|---|---|---|
| Element configuration | Thickness of base member (μm) | 20 | 40 | 80 | 120 | 200 | 400 |
|  | Thickness of base layer (μm) | 20 | 20 | 20 | 20 | 20 | 20 |
| Evaluation | Depth of dent (nm) | — | 980 | 721 | 512 | 403 | 145 |
|  | Plastic deformation | X | ◯ | ◯ | ◯ | ◯ | ⊙ |
|  | Cohesion failure | X | ◯ | ⊙ | ⊙ | ⊙ | ⊙ |

Figure 34A:
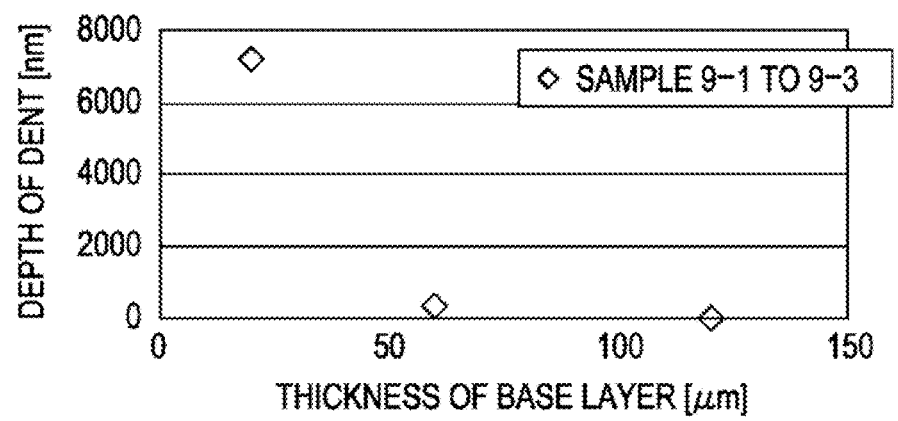
FIG. 34A is a graph showing the results of a scratch test of optical elements of Samples 9-1 to 9-3.
Figure 34B:
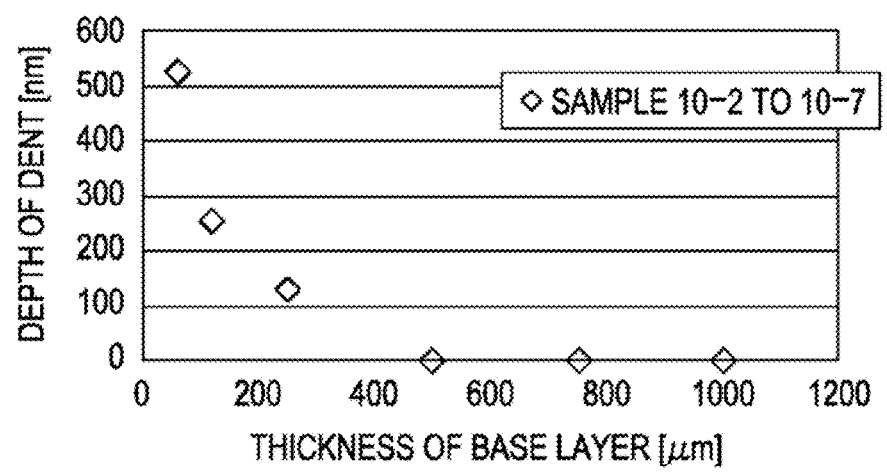
FIG. 34B is a graph showing the results of a scratch test of optical elements of Samples 10-2 to 10-7.

The following are clear from Table 4, Table 5, FIG. 34A, and FIG. 34B.

Visually identified plastic deformation and cohesion failure are reduced by specifying the total thickness of the base member and the base layer to be 60 μm or more.

(Sample 9-1)

An optical element of Sample 9-1 was produced in a manner similar to that in Sample 7-1 except that a polymethyl methacrylate (PMMA) film having a thickness of 150 μm was used as the base member in place of the urethane film having a thickness of 400 μm. In this regard, the modulus of elasticity of the material for the PMMA film was 3,300 MPa.

(Sample 9-2)

An optical element of Sample 9-2 was produced in a manner similar to that in Sample 9-1 except that a base layer having a thickness of 60 μm was formed between the structure and the PMMA film by adjusting the pressure of the moth-eye glass roll master against the coated surface of the urethane film.

(Sample 9-3)

An optical element of Sample 9-3 was produced in a manner similar to that in Sample 9-1 except that a base layer having a thickness of 120 μm was formed between the structure and the PMMA film by adjusting the pressure of the moth-eye glass roll master against the coated surface of the urethane film.

(Scratch Test)

Regarding the resulting Samples 9-1 to 9-3, a scratch test was performed as in Samples 7-1 to 7-4 described above, so that the sample surface was observed and the depth of plastic deformation was measured. The results thereof are shown in Table 6 and FIG. 34A.

Table 6 shows the results of the scratch test of Samples 9-1 to 9-3.

TABLE 6

|  |  | Sample 9-1 | Sample 9-2 | Sample 9-3 |
|---|---|---|---|---|
| Element configuration | Thickness of base member (μm) | 150 | 150 | 150 |
|  | Thickness of base layer (μm) | 20 | 60 | 120 |
| Evaluation | Depth of dent (nm) | 7205 | 324 | 19 |
|  | Plastic deformation | X | ◯ | ⊙ |
|  | Cohesion failure | X | ◯ | ⊙ |

The following are clear from Table 6 and FIG. 34A.

In the case where a base member having a modulus of elasticity out of the range of 1 MPa or more, and 3,000 MPa or less is used, occurrences of plastic deformation and cohesion failure are suppressed by specifying the thickness of the base layer to be 60 μm or more.

(Sample 10-1)

Initially, a glass roll stamper, in which a region serving as a molding surface is dented uniformly, having an outside diameter of 126 mm was prepared. Subsequently, a moth-eye glass roll master with a quasi-hexagonal lattice pattern was obtained in a manner similar to that in Sample 7-1 except that the resulting glass roll stamper was used. Subsequently, an ultraviolet curable resin composition having the following composition was applied to a cycloolefin based film. Thereafter, a moth-eye glass roll master was closely adhered to the resulting coated surface, and an optical element was produced by performing peeling while ultraviolet rays were applied to cure. At this time, 20 μm of base layer serving as a substrate was formed between the structure and the cycloolefin based film by adjusting the pressure of the moth-eye glass roll master against the coated surface.

Ultraviolet Curable Resin Composition

| polyester acrylate oligomer (trade name CN2271E produced by Sartomer Company, Inc.) | 80 parts by mass |
| low viscosity monoacrylate oligomer (trade name CN152 produced by Sartomer Company, Inc.) | 20 parts by mass |
| photopolymerization initiator (trade name DAROCUR1173 produced by Ciba Specialty Chemicals) | 4 percent by weight |

Then, an optical element was obtained by peeling the cycloolefin based film from the resin layer. Next, a fluorine treatment was performed by dip-coating the surface provided with the moth-eye pattern of the optical element with a fluorine based treating agent (trade name OPTOOL DSX produced by Daikin Industries, Ltd.). In this manner, an optical element of Sample 10-1 was produced, in which many structures were formed on the substrate having a thickness of 20 μm.

(Sample 10-2)

An optical element of Sample 10-2 was produced in a manner similar to that in Sample 10-1 except that a substrate and structures were integrally molded and the thickness of the substrate was specified to be 60 μm.

(Sample 10-3)

An optical element of Sample 10-3 was produced in a manner similar to that in Sample 10-1 except that a substrate and structures were integrally molded and the thickness of the substrate was specified to be 120 μm.

(Sample 10-4)

An optical element of Sample 10-4 was produced in a manner similar to that in Sample 10-1 except that a substrate and structures were integrally molded and the thickness of the substrate was specified to be 250 μm.

(Sample 10-5)

An optical element of Sample 10-5 was produced in a manner similar to that in Sample 10-1 except that a substrate and structures were integrally molded and the thickness of the substrate was specified to be 500 μm.

(Sample 10-6)

An optical element of Sample 10-6 was produced in a manner similar to that in Sample 10-1 except that a substrate and structures were integrally molded and the thickness of the substrate was specified to be 750 μm.

(Sample 10-7)

An optical element of Sample 10-7 was produced in a manner similar to that in Sample 10-1 except that a substrate and structures were integrally molded and the thickness of the substrate was specified to be 1,000 μm.

(Scratch Test)

Regarding the resulting Samples 10-1 to 10-7, a scratch test was performed as in Samples 7-1 to 7-4 described above, so that the sample surface was observed and the depth of plastic deformation was measured. The results thereof are shown in Table 7 and FIG. 34B.

Table 7 shows the results of the scratch test of Samples 10-1 to 10-7. In this regard, the depth of dent of plastic deformation of Sample 10-1 was out of the measurement range and, therefore, the measurement value is not described.

Thickness d: 20 μm

Modulus of elasticity: 20 MPa

Subsequently, the depth of plastic deformation region when a diagonally shaded region shown in FIG. 35 was pressed with a pencil was determined. The pressing conditions were as described below.

Load of pressing: 0.75 kg

Area of pressing (area of diagonally shaded region): 2 mm×0.5 mm

Figure 36A:
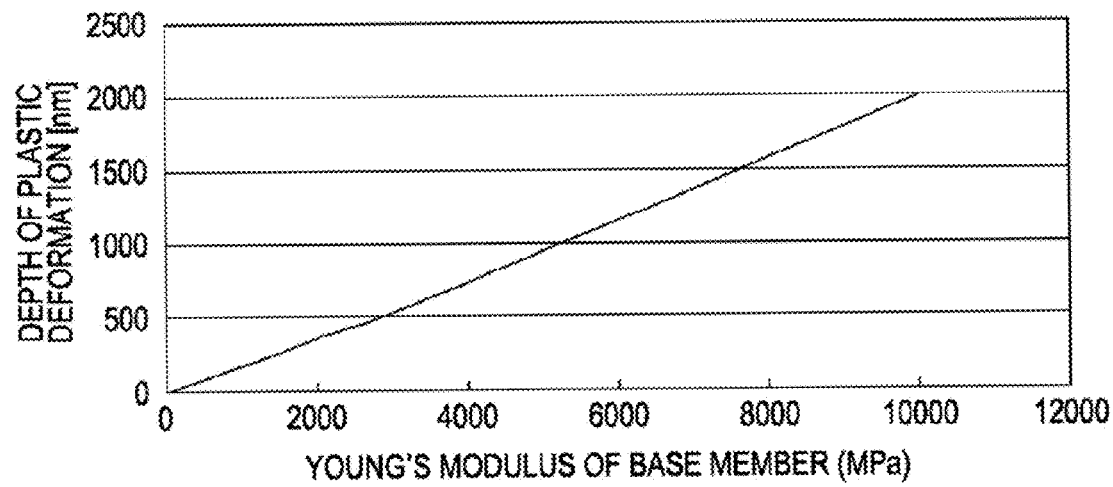
FIG. 36A is a graph showing the results of simulation in Test examples 3-1 to 3-10.

FIG. 36A is a graph showing the results of simulation in Test examples 3-1 to 3-10. Table 8 shows the results of simulation in Test examples 3-1 to 3-10. In this regard, a symbol "⊙", a symbol "○", and a symbol "x" in columns "Plastic deformation" and "Cohesion failure" in Table 8 indicate the following evaluation results.

(Plastic Deformation)

⊙: The depth of plastic deformation is 0 nm or more, and less than 350 nm. In this regard, there is no change in reflection performance and no dent is observed visually in the case where the depth of plastic deformation is specified to be within this range.

○: The depth of plastic deformation is 350 nm or more, and less than 1,000 nm. In this regard, there is no change in

TABLE 7

| | | Sample 10-1 | Sample 10-2 | Sample 10-3 | Sample 10-4 | Sample 10-5 | Sample 10-6 | Sample 10-7 |
|---|---|---|---|---|---|---|---|---|
| Element configuration | Thickness of base member (μm) | 20 | 60 | 120 | 250 | 500 | 750 | 1000 |
| Evaluation | Depth of dent (nm) | — | 523 | 255 | 128 | 0 | 0 | 0 |
| | Plastic deformation | X | ○ | ⊙ | ⊙ | ⊙ | ⊙ | ⊙ |
| | Cohesion failure | X | ○ | ○ | ⊙ | ⊙ | ⊙ | ⊙ |

The following are clear from Table 7 and FIG. 34B.

In the case where the structures and the substrate are integrally molded, occurrences of plastic deformation and cohesion failure are suppressed by specifying the thickness of the substrate to be 60 μm or more.

Test Examples 3-1 to 3-10

The depth of plastic deformation region when the optical film surface was pressed with a pencil was determined by simulation as described below.

reflection performance, and almost no dent is observed visually in the case where the depth of plastic deformation is specified to be within this range.

x: The depth of plastic deformation is 1,000 nm or more. In this regard, the reflection performance is degraded, and a dent is visually observed in the case where the depth of plastic deformation is within this range.

TABLE 8

| | Test example 3-1 | Test example 3-2 | Test example 3-3 | Test example 3-4 | Test example 3-5 | Test example 3-6 | Test example 3-7 | Test example 3-8 | Test example 3-9 | Test example 3-10 |
|---|---|---|---|---|---|---|---|---|---|---|
| Young's modulus (MPa) | 0 | 10 | 20 | 100 | 500 | 1000 | 1500 | 2000 | 3000 | 10000 |
| Depth of plastic deformation (nm) | 0 | 0.23732 | 0.48464 | 13.0768 | 82.9515 | 170.595 | 258.261 | 359.36 | 523.197 | 1987.9 |
| Evaluation | ⊙ | ⊙ | ⊙ | ⊙ | ⊙ | ⊙ | ⊙ | ○ | ○ | X |

Figure 35:
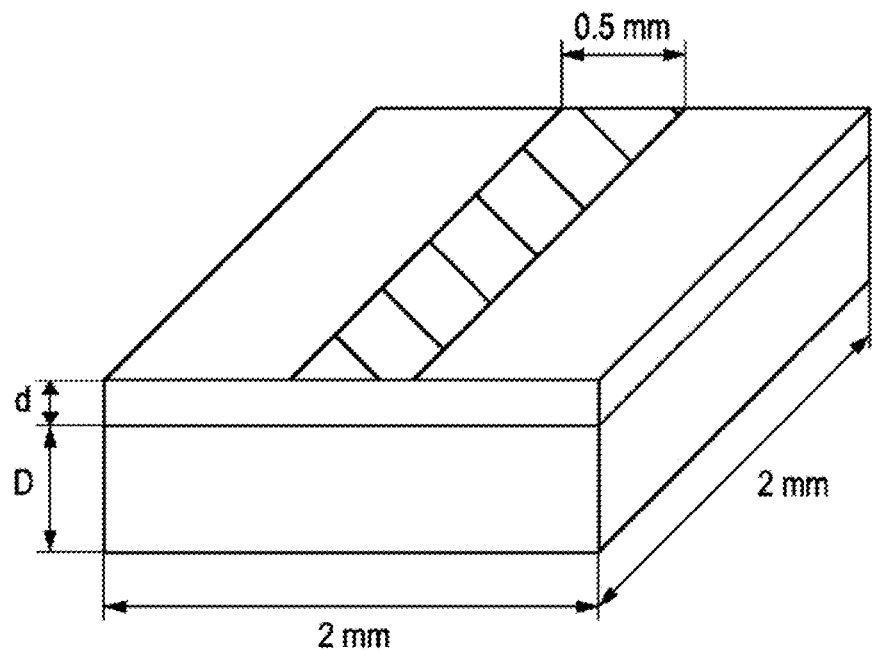
FIG. 35 is a schematic diagram for explaining the setting condition of an optical film for simulation.

Initially, an optical film having a two-layer structure as shown in FIG. 35 was set. The setting conditions of the property values of this optical film were as described below. In this regard, ANSYS Structural (produced by ANSYS INC.) was used as a program.

Base member

Thickness D: 40 μm

Modulus of elasticity: 0 to 10,000 MPa

Surface layer

In this regard, since the height of the moth-eye structure is sufficiently small as compared with the thickness of the base layer, in the above-described simulation, the surface of the optical film is approximated by a flat surface. The result of the simulation on the basis of approximation by the flat surface nearly agrees with the result of actual measurement of plastic deformation of the optical film provided with a moth-eye structure.

The following are clear from Table 8 and FIG. 36A.

The depth of plastic deformation is specified to be within the range of 350 nm or more, and less than 1,000 nm by specifying the modulus of elasticity of the base member to be 3,000 MPa or less. That is, degradation of the reflection performance is suppressed and an occurrence of visually observed dent is prevented.

Furthermore, the depth of plastic deformation is specified to be within the range of 0 nm or more, and less than 350 nm by specifying the modulus of elasticity of the base member to be 1,500 MPa or less. That is, degradation of the reflection performance is suppressed and an occurrence of visually observed dent is further prevented.

Test Examples 4-1 to 4-4

The depth of plastic deformation region when the optical film surface was pressed with a pencil was determined by simulation as described below.

Initially, an optical film having a two-layer structure as shown in FIG. 35 was set. The setting conditions of the property values of this optical film were as described below. In this regard, ANSYS Structural (produced by ANSYS INC.) was used as a program.
  Base member
    Thickness D: 400 µm
    Modulus of elasticity: 20 MPa
  Surface layer
    Thickness d: 20 µm, 60 µm, 120 µm, and 200 µm
    Modulus of elasticity: 20 MPa Subsequently, the depth of plastic deformation region when a diagonally shaded region shown in FIG. 35 was pressed with a pencil was determined. The pressing conditions were as described below.
  Load of pressing: 0.75 kg
  Area of pressing (area of diagonally shaded region): 2 mm×0.5 mm Test Examples 5-1 to 5-4

The simulation was performed as in Test examples 4-1 to 4-4 except that the setting conditions of the property values of the optical film were as described below.
  Base member
    Thickness D: 400 µm
    Modulus of elasticity: 40 MPa
  Surface layer
    Thickness d: 20 µm, 60 µm, 120 µm, and 200 µm
    Modulus of elasticity: 20 MPa Test Examples 6-1 to 6-4

Figure 36B:
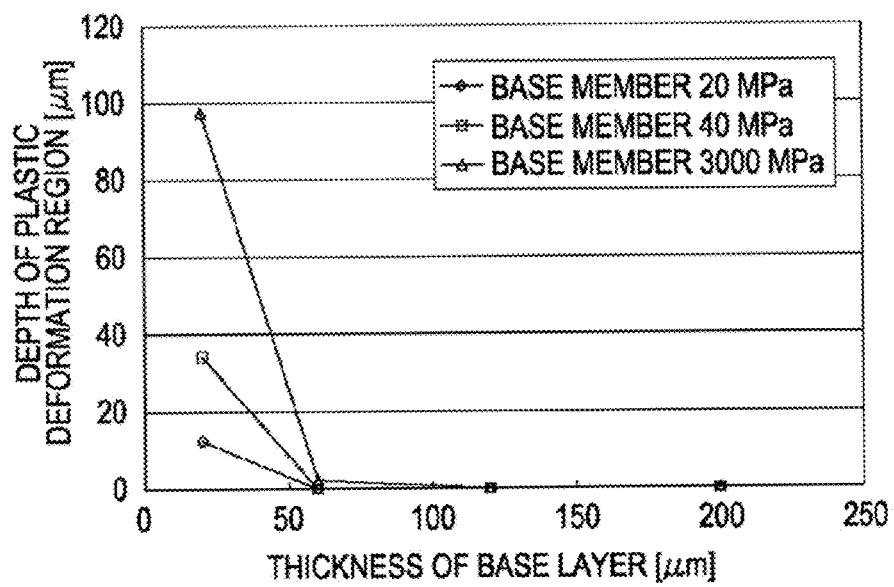
FIG. 36B is a graph showing the results of simulation in Test examples 4-1 to 4-4, Test examples 5-1 to 5-4, and Test examples 6-1 to 6-4.

The simulation was performed as in Test examples 4-1 to 4-4 except that the setting conditions of the property values of the optical film were as described below.
  Base member
    Thickness D: 135 µm
    Modulus of elasticity: 3000 MPa
  Surface layer
    Thickness d: 20 µm, 60 µm, 120 µm, and 200 µm
    Modulus of elasticity: 20 MPa FIG. 36B is a graph showing the results of simulation in Test examples 4-1 to 4-4, Test examples 5-1 to 5-4, and Test examples 6-1 to 6-4. In this regard, since the height of the moth-eye structure is sufficiently small as compared with the thickness of the base layer, in the above-described simulation, the surface of the optical film is approximated by a flat surface. The result of the simulation on the basis of approximation by the flat surface nearly agrees with the result of actual measurement of plastic deformation of the optical film provided with a moth-eye structure.

The following are clear from FIG. 36B.

An occurrence of plastic deformation is suppressed regardless of the modulus of elasticity of the base member by specifying the thickness of the surface layer to be 60 µm or more. Therefore, an occurrence of plastic deformation is suppressed by specifying the thickness of the base layer of the optical element (moth-eye film).

Test Example 7

The elongation percentage when the optical film surface was pressed with a pencil was determined by simulation, as described below.

Initially, an optical film having a two-layer structure as shown in FIG. 35 was set. The setting conditions of the property values of this optical film were as described below. In this regard, ANSYS Structural (produced by ANSYS INC.) was used as a program.
  Base member
    Thickness D: 400 µm
    Modulus of elasticity: 1 MPa
  Surface layer
    Thickness d: 20 µm
    Modulus of elasticity: 1 MPa Subsequently, the elongation percentage of the optical film when a diagonally shaded region shown in FIG. 35 was pressed with a pencil was determined. The pressing conditions were as described below.
  Load of pressing: 0.75 kg
  Area of pressing (area of diagonally shaded region): 2 mm×0.5 mm As is clear from the results of the above-described simulation, the elongation percentages of the base member and the surface layer resulting from the deformation due to pressing with the pencil are within the range of less than 20%. Therefore, in order to prevent breakage of the base member, it is preferable that the elongation percentages of the materials forming the base member and the surface layer are specified to be 20% or more.

Test Example 8

The elongation percentage required for adhering the structures to each other was determined by simulation as described below.

Figure 37:
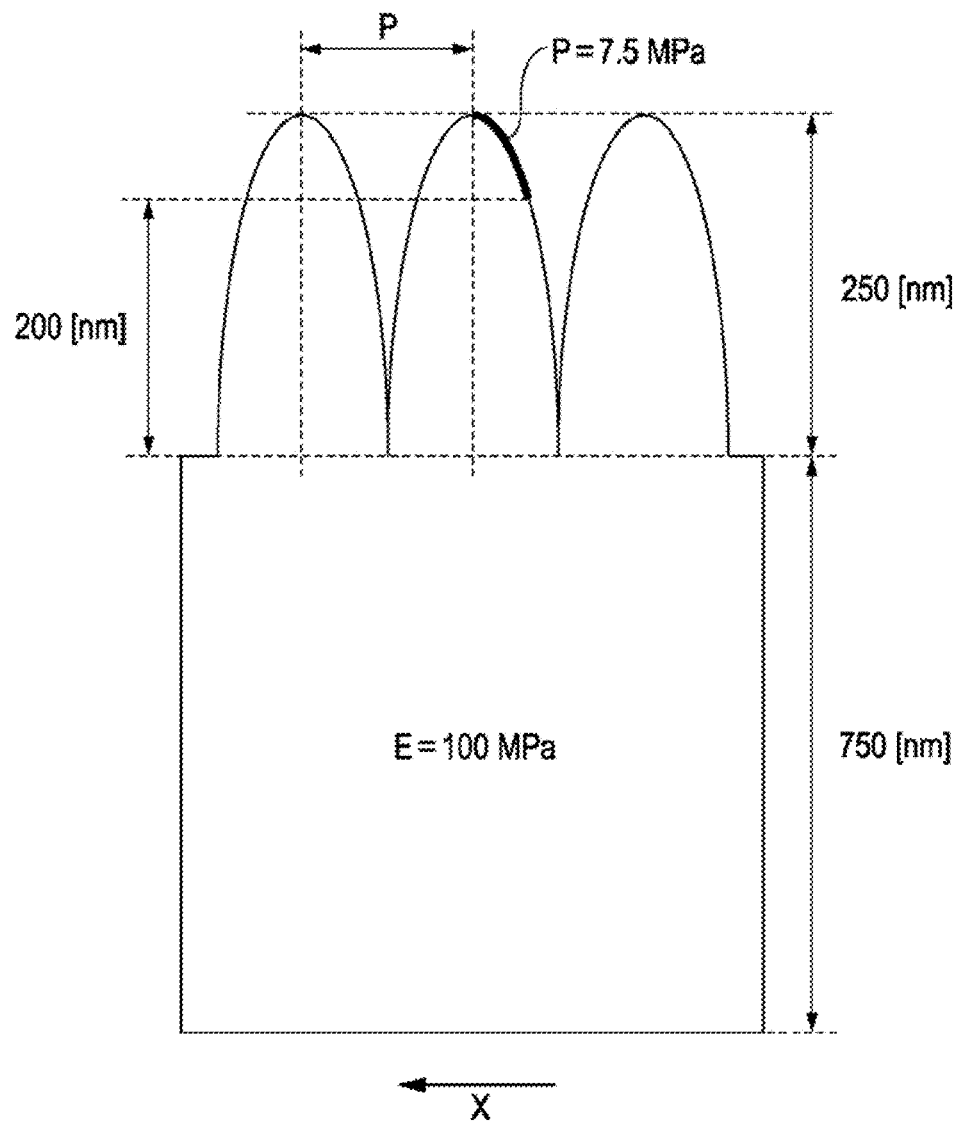
FIG. 37 is a schematic diagram for explaining the setting condition of an optical film for simulation.

Initially, an optical element as shown in FIG. 37 was set. The setting conditions of this optical film were as described below. In this regard, ANSYS Structural (produced by ANSYS INC.) was used as a program.
  Substrate
    Thickness: 750 nm
    Modulus of elasticity: 100 MPa
  Nanostructure
    Shape: the shape of a paraboloid
    Height: 250 nm
    Pitch: 200 nm
    Aspect ratio: 1.25
    The number of structures: 3

Subsequently, a load was applied to a structure located at the center, among three structures shown in FIG. 37, and the elongation percentage when the top portion of this structure was brought into contact with a side surface of an adjacent structure was determined. The load was adjusted in such a way that a pressure of 7.5 MPa was applied to a region within the range of a height of 200 nm to 250 nm in one side surface of the central structure. At this time, the bottom surface was fixed.

Figure 38A:
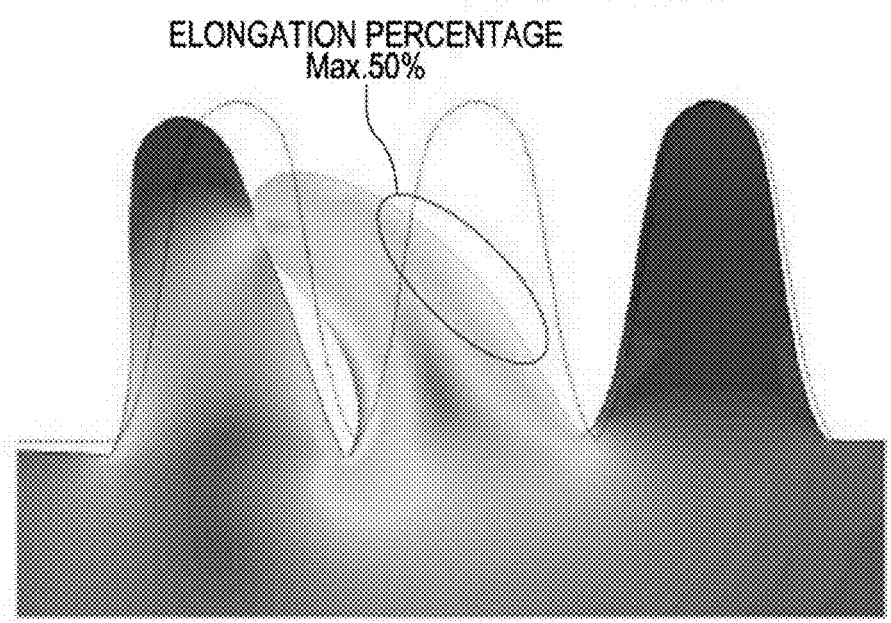
FIG. 38A is a diagram showing the results of simulation in Test example 8.

FIG. 38A is a diagram showing the results of simulation in Test example 8.

As is clear from the results of the simulation, the maximum value of the elongation percentage when the top portion of this structure was brought into contact with a side surface of an adjacent structure was 50%.

Therefore, it is preferable to specify the elongation percentage of the material for the structure to be 50% or more in order to bring into contact or adhere the adjacent structures to each other.

Test Example 9

The rate of change (($\Delta X/P$)×100) (%) in the displacement $\Delta X$ of the structure top relative to the pitch P was determined by simulation as described below.

Initially, an optical element as shown in FIG. 37 was set. The setting conditions of this optical film were as described below. In this regard, ANSYS Structural (produced by ANSYS INC.) was used as a program.

Substrate
Thickness D: 750 nm
Modulus of elasticity: 100 MPa
Nanostructure
Height: 250 nm
Pitch: 125 nm to 312.5 nm
Aspect ratio: 0.8 to 2.0
The number of structures: 3

Subsequently, a load was applied to a structure located at the center, among three structures shown in FIG. 37. Specifically, a pressure of 7.5 MPa was applied to a region within the range of a height of 200 nm to 250 nm in one side surface of the central structure, and the rate of change (($\Delta X/P$)×100) (%) in the displacement of the structure top relative to the pitch P was determined. At this time, the bottom surface was fixed. Here, the displacement $\Delta X$ of the structure refers to a displacement of the structure top in the X axis direction (refer to FIG. 37.)

Figure 38B:
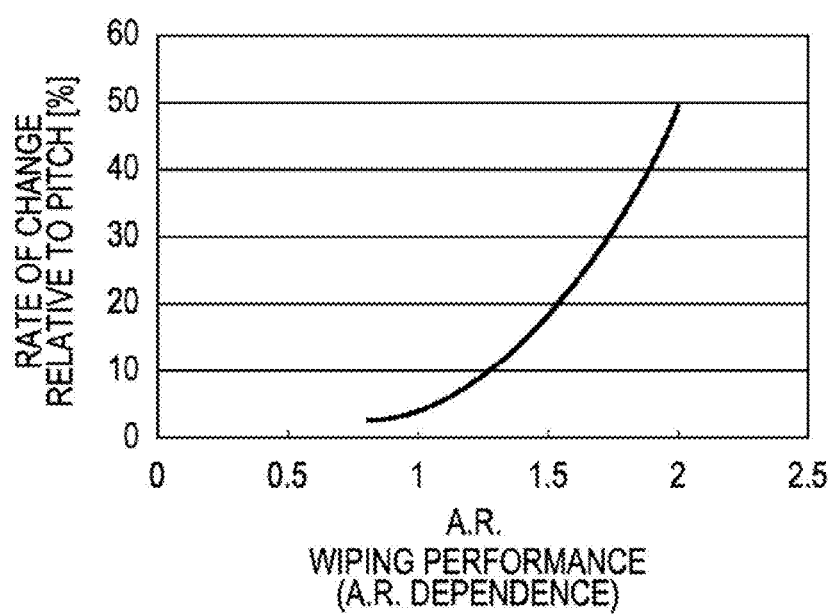
FIG. 38B is a graph showing the results of simulation in Test example 9.

FIG. 38B is a graph showing the results of simulation in Test example 9. In FIG. 38B, the horizontal axis indicates the wiping performance (aspect ratio (A.R.) dependence), and the vertical axis indicates the rate of change in the displacement $\Delta X$ of the structure top relative to the pitch P.

As is clear from FIG. 38B, the wiping performance is improved as the rate of change in the displacement $\Delta X$ of the structure top relative to the pitch P increases. For example, at A.R.=1.2, the wiping performance is improved by a factor of 1.6 as compared with that at A.R.=0.8.

It is believed that the causes of the above-described improvement in wiping performance are as described below.

(1) It is believed that the pitch width of the structures relative to the height of the structures became relatively small because of an increase in aspect ratio, the oil was effectively pushed out by even a low degree of deformation of the nanostructure and, thereby, the wiping performance was improved.

(2) It is believed that the nanostructure was deformed by a smaller force because of an increase in aspect ratio and, thereby, the wiping performance was improved.

Test Examples 10-1 to 10-8

The luminous reflectance of the optical element was determined by optical simulation on the basis of an RCWA method. The conditions of the simulation were as described below.

Shape of structure: the shape of a paraboloid
Arrangement pattern of structures: quasi-hexagonal lattice
Height of structure: 125 to 1250 nm
Arrangement pitch of structures: 250 nm
Aspect ratio of structure: 0.5 to 5

Figure 39:
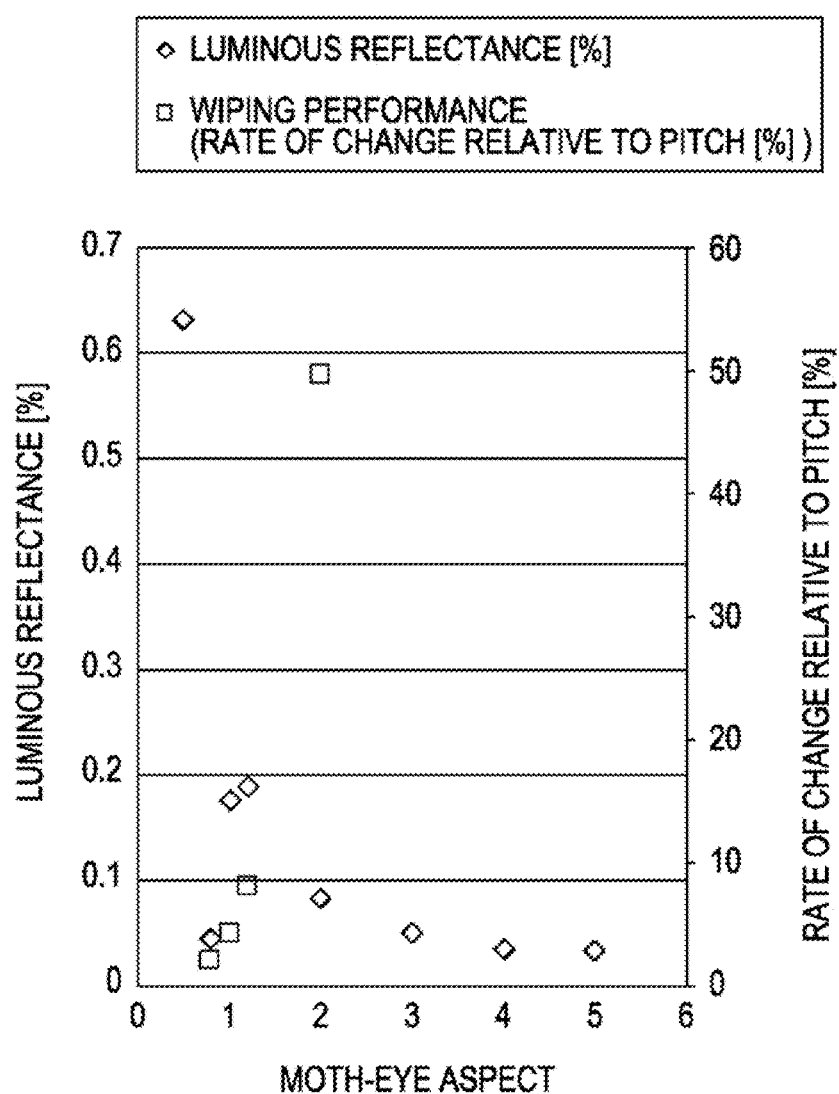
FIG. 39 is a graph showing the results of simulation in Test examples 10-1 to 10-8.

FIG. 39 is a graph showing the results of simulation in Test examples 10-1 to 10-8. Table 9 shows the results of simulation in Test examples 10-1 to 10-8. In this regard, the results of the simulation (wiping performance) in Test example 9 are also shown in FIG. 39 and Table 9.

TABLE 9

| | Test example 10-1 | Test example 10-2 | Test example 10-3 | Test example 10-4 | Test example 10-5 | Test example 10-6 | Test example 10-7 | Test example 10-8 |
|---|---|---|---|---|---|---|---|---|
| Aspect ratio | 0.50 | 0.80 | 1.00 | 1.20 | 2.00 | 3.00 | 4.00 | 5.00 |
| Luminous reflectance (%) | 0.63 | 0.04 | 0.18 | 0.19 | 0.08 | 0.05 | 0.04 | 0.03 |
| Wiping performance | — | 2.04 | 4.28 | 8.06 | 49.68 | — | — | — |

As is clear from FIG. 39 and Table 9, the reflection characteristic and the transmission characteristic tend to be degraded when the aspect ratio is less than 0.6 and, therefore, it is preferable that the aspect ratio is specified to be 0.6 or more in order to improve the optical characteristics and the wiping performance. In this regard, according to the findings obtained by the present inventors on the basis of the experiments, it is preferable that the aspect ratio is specified to be 5 or less in consideration of the mold release property in transfer in the state in which the mold release property is improved by performing fluorine coating on the stamper and adding a silicone based additive or fluorine based additive to the transfer resin. Furthermore, in the case where the aspect ratio exceeds 4, there is no large change in the luminous reflectance. Therefore, it is preferable that the aspect ratio is specified to be within the range of 0.6 or more, and 4 or less.

Up to this point, the examples of the present application have been explained with reference to the antireflection substrate. However, the above-described examples may be variously modified on the basis of the technical idea of the present application.

Up to this point, the embodiments and the examples of the present application have been specifically explained. However, the present application is not limited to the above-described embodiments and the examples, and various modifications on the basis of the technical idea of the present application may be made.

For example, the configurations, the methods, the shapes, the materials, the numerical values, and the like mentioned in the above-described embodiments and examples are no more than examples, and as necessary, configurations, methods, shapes, materials, numerical values, and the like different from them may be employed.

Furthermore, the individual configurations of the above-described embodiments may be combined with each other within the bounds of not departing from the gist of the present application.

Moreover, in the above-described embodiments, examples of application of the present application to the liquid crystal display devices are described, although the present application may also be applied to various display devices other than the liquid crystal display device. For example, the present application may be applied to various display devices, e.g., cathode ray tube (CRT) displays, plasma display panels (PDP), electro luminescence (EL) displays, and surface-conduction electron-emitter displays (SED). In addition, the present application may be applied to touch panels. Specifically, for example, the optical element according to the above-described embodiment may be used as a substrate provided on a touch panel and the like.

Furthermore, in the above-described embodiments, a peeping prevention function may be given to the optical element by changing the pitch of the structures appropriately, so as to generate diffracted light in the slanting direction with respect to the front.

Moreover, in the above-described embodiments, a low-refractive index layer may be further disposed on the substrate surface provided with the structures. It is preferable that the primary component of the low-refractive index layer is a material having a refractive index lower than those of the materials constituting the substrate and the structures. Examples of materials for such a low-refractive index layer include organic materials, e.g., fluorine based resins, and inorganic low-refractive index materials, e.g., LiF and $MgF_2$.

In addition, in the above-described embodiments, examples of production of the optical element from the photosensitive resin are described, although the method for manufacturing the optical element is not limited to these examples. For example, the optical element may be produced through thermal transfer or injection molding.

Furthermore, in the above-described embodiments, examples of production of the concave or convex structures on the outer perimeter surface of the stamper in the shape of a circular column or a circular cylinder are described. However, in the case where the stamper is in the shape of a circular cylinder, concave or convex structures may be disposed on an inner perimeter of the stamper.

Furthermore, in the above-described embodiments, the modulus of elasticity of the material constituting the structures may be specified to be 1 MPa or more, and 200 MPa or less and the aspect ratio of the structures may be specified to be 0.2 or more, or less than 0.6. In this case as well, stains, e.g., fingerprints, adhered to the optical element surface are wiped off.

Moreover, in the above-described embodiments, examples of application of the present application to the optical elements were explained. However, the present application is not limited to these examples and the present application is applied to fine structures other than the optical elements. As for the fine structures other than the optical elements, the present application is applied to, for example, cell culture scaffolds and water-repellent glass through the use of lotus effect.

In addition, in the above-described embodiments, the moduli of elasticity of the base member, the base layer, and the structure may be changed in the inside of them. For example, those moduli of elasticity may have distribution in the thickness direction of the base member, in the thickness direction of the base layer, or in the height direction of the structure. In this case, the change in modulus of elasticity is specified to be continuous or discontinuous.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An optical element with an antireflection function, the optical element comprising:
    a substrate having a surface;
    a plurality of elongate structures formed from convex portions or concave portions, arranged in large numbers on the surface of the substrate with a minute pitch less than or equal to a wavelength of the visible light, and arranged in offset tracks, each track extending in a first direction corresponding to a direction of elongation of the elongate structures; and
    a surface-treated layer disposed on the elongate structures, the surface-treated layer including a compound containing a silicon-based compound and a fluorine-containing compound,
    wherein elongate structures in adjacent tracks form lines that extend in a second direction transverse to the first direction,
    each of the elongate structures has a first height at a cross-section in the first direction and a second height at a cross-section in the second direction,
    the first height is less than the second height,
    the modulus of elasticity of the material forming the elongate structures is 1 MPa or more, and 1,200 MPa or less,
    an aspect ratio of the elongate structures is 0.6 or more, and 1.5 or less, and
    a filling factor of the elongate structures is 65% or more.

2. The optical element according to claim 1, wherein a contact angle of oleic acid on the surface of the substrate provided with the surface-treated layer is 30 degrees or more.

3. The optical element according to claim 2, wherein the contact angle of oleic acid on the surface of the substrate provided with the surface-treated layer is 50 degrees or more.

4. The optical element according to claim 1, wherein the tracks form a hexagonal lattice pattern, a quasi-hexagonal lattice pattern, a tetragonal lattice pattern, or a quasi-tetragonal lattice pattern, and
    the elongate structures are in the shape of an elliptical cone or an elliptical truncated cone, which have a major axis direction in an extension direction of the tracks.

5. The optical element according to claim 4, wherein the tracks have the shape of a straight line or the shape of an arc.

6. The optical element according to claim 4, wherein the tracks meander.

7. The optical element according to claim 1, wherein the tracks form a quasi-hexagonal lattice pattern, and
    a height or depth of the elongate structures in an extension direction of the tracks is smaller than a height or depth of the elongate structures in a direction of lines of the tracks.

8. The optical element according to claim 1, wherein the tracks form a tetragonal lattice pattern or a quasi-tetragonal lattice pattern, and a height or depth of the structures in an arrangement direction slanting with respect to an extension direction of the tracks is smaller than a height or depth of the structures in the extension direction of the tracks.

9. The optical element according to claim 1, wherein an arrangement pitch PI of the elongate structures in the same track is larger than an arrangement pitch P2 of the elongate structures between adjacent two tracks.

10. The optical element according to claim 1, wherein the optical element is included in a display device.

11. The optical element according to claim 1, wherein a ratio of a diameter of bottoms of the elongate structures to an arrangement pitch of the bottoms of the elongate structures is 85% or more.

12. An optical element with an antireflection function, the optical element comprising:
- a plurality of elongate structures formed from convex portions, arranged in large numbers with a minute pitch less than or equal to a wavelength of the visible light, and arranged in offset tracks, each track extending in a first direction corresponding to a direction of elongation of the structures; and
- a surface-treated layer disposed on the elongate structures, the surface-treated layer including a compound containing a silicon-based compound and a fluorine-containing compound,
- wherein elongate structures in adjacent tracks form lines that extend in a second direction transverse to the first direction,
- each of the elongate structures has a first height at a cross-section in the first direction and a second height at a cross-section in the second direction,
- the first height is less than the second height,
- lower portions of adjacent elongate structures are mutually joined,
- the modulus of elasticity of the material forming the elongate structures is 1 MPa or more, and 1,200 MPa or less,
- an aspect ratio of the elongate structures is 0.6 or more, and 1.5 or less, and
- a filling factor of the elongate structures is 65% or more.

13. An optical element with an antireflection function, the optical element comprising:
- a substrate having a surface;
- a plurality of elongate structures formed from convex portions or concave portions, arranged in large numbers on the surface of the substrate with a minute pitch less than or equal to a wavelength of the visible light, arranged in offset tracks, each track extending in a first direction corresponding to a direction of elongation of the structures; and
- a surface-treated layer disposed on the elongate structures, the surface-treated layer including a compound containing a silicon-based compound and a fluorine-containing compound,
- wherein elongate structures in adjacent tracks form lines that extend in a second direction transverse to the first direction,
- each of the elongate structures has a first height at a cross-section in the first direction and a second height at a cross-section in the second direction,
- the first height is less than the second height,
- the modulus of elasticity of the material forming the elongate structures is 1 MPa or more, and 1,200 MPa or less,
- an aspect ratio of the elongate structures is 0.6 or more, and 5 or less, and
- a filling factor of the elongate structures is 65% or more.

14. The optical element according to claim 13, wherein the modulus of elasticity of the material forming the substrate is 1 MPa or more, and 3,000 MPa or less.

15. The optical element according to claim 14, wherein the thickness of the substrate is 60 μm or more.

16. The optical element according to claim 13,
- wherein the substrate has a layer structure composed of at least two layers, and
- the modulus of elasticity of a base layer disposed adjoining to the elongate structures is 1 MPa or more, and 3,000 MPa or less, among the layer structure composed of at least two layers.

17. The optical element according to claim 16, wherein the thickness of the base layer is 60 μm or more.

18. The optical element according to claim 13, wherein the substrate comprises a base layer disposed adjoining to the elongate structures and a base member disposed adjoining to the base layer, and
- the moduli of elasticity of the base layer and the base member are 1 MPa or more, and 3,000 MPa or less.

19. The optical element according to claim 18, wherein the total thickness of the base layer and the base member is 60 μm or more.

20. The optical element according to claim 13, wherein an elongation percentage of the material forming the elongate structures is 50% or more.

21. The optical element according to claim 13, wherein an elongation percentage of the material forming the elongate structures is 20% or more.

* * * * *